United States Patent
Ohta et al.

(10) Patent No.: US 10,098,147 B2
(45) Date of Patent: Oct. 9, 2018

(54) WIRELESS COMMUNICATION SYSTEM, RECEIVING DEVICE, TRANSMITTING DEVICE, AND WIRELESS COMMUNICATION METHOD

(71) Applicant: FUJITSU LIMITED, Kawasaki-shi, Kanagawa (JP)

(72) Inventors: Yoshiaki Ohta, Yokohama (JP); Yoshinori Tanaka, Yokohama (JP); Yoshiharu Tajima, Yokohama (JP); Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 325 days.

(21) Appl. No.: 13/912,974

(22) Filed: Jun. 7, 2013

(65) Prior Publication Data
US 2013/0272241 A1 Oct. 17, 2013

Related U.S. Application Data

(63) Continuation of application No. PCT/JP2010/072278, filed on Dec. 10, 2010.

(51) Int. Cl.
*H04W 74/00* (2009.01)
*H04W 72/12* (2009.01)
*H04W 74/08* (2009.01)

(52) U.S. Cl.
CPC ..... *H04W 74/006* (2013.01); *H04W 72/1284* (2013.01); *H04W 74/0833* (2013.01)

(58) Field of Classification Search
CPC ........... H04W 74/006; H04W 74/0841; H04W 74/002; H04W 74/0833; H04W 74/004;
(Continued)

(56) References Cited

U.S. PATENT DOCUMENTS

| 8,085,738 B2* | 12/2011 | Park | H04W 28/06 370/336 |
| 2007/0206531 A1* | 9/2007 | Pajukoski | H04W 74/0866 370/329 |

(Continued)

FOREIGN PATENT DOCUMENTS

| EP | 2 230 875 A2 | 9/2010 |
| WO | WO 2007/139188 A1 | 12/2007 |

(Continued)

OTHER PUBLICATIONS

3GPP TS 36.300 V10.0.0, "Evolved Universal Terrestrial Radio Access (E-UTRA) and Evolved Universal Terrestrial Radio Access Network (E-UTRAN)," Release 10, Jun. 2010, 183 pages.

(Continued)

*Primary Examiner* — Kwang B Yao
*Assistant Examiner* — Ricardo Castaneyra
(74) *Attorney, Agent, or Firm* — Arent Fox LLP

(57) ABSTRACT

Provided is a wireless communication system in which high-speed communication is implemented. A receiving device includes an RA managing unit that transmits Msg1 through a PRACH over an SCELL and a D-SR managing unit that transmits a D-SR through a PUCCH over a PCELL before or after the PRACH. A transmitting device includes an RA managing unit that receives Msg1 and a D-SR managing unit that receives the D-SR. The RA managing unit associates a scheduling request with a preamble, and identifies a receiving device.

14 Claims, 47 Drawing Sheets

(58) Field of Classification Search
CPC ............. H04W 74/04; H04W 72/0413; H04W 72/0406; H04W 28/044; H04W 28/042; H04W 76/027; H04W 52/48; H04W 56/00; H04W 56/005; H04W 72/1284; H04W 72/042
USPC ........................................................ 370/329
See application file for complete search history.

(56) References Cited

U.S. PATENT DOCUMENTS

| | | | |
|---|---|---|---|
| 2009/0041246 A1* | 2/2009 | Kitazoe | H04W 12/02 380/270 |
| 2009/0201865 A1 | 8/2009 | Uemura et al. | |
| 2009/0209248 A1* | 8/2009 | Lee | H04W 74/002 455/422.1 |
| 2009/0316641 A1* | 12/2009 | Yamada | H04W 56/0005 370/329 |
| 2009/0316645 A1 | 12/2009 | Uemura et al. | |
| 2010/0002630 A1* | 1/2010 | Park et al. | 370/328 |
| 2010/0067495 A1* | 3/2010 | Lee et al. | 370/335 |

FOREIGN PATENT DOCUMENTS

| | | |
|---|---|---|
| WO | WO 2009/147709 A1 | 12/2009 |
| WO | WO 2010/064858 A2 | 6/2010 |

OTHER PUBLICATIONS

3GPP TS 36.321, V9.3.0, "Medium Access Control (MAC) protocol specification," Release 9, Jun. 2010, 48 pages.
Fujitsu, "RACH for connected mode in carrier aggregation", 3GPP TSG-RAN WG2 Meeting #69 R2-101541, Feb. 26, 2010, [retrieved on Jan. 5, 2011]. Retrieved from the Internet:http://ftp.3gpp.org/ftp/tsg_ran/WG2_RL2/TSGR2_69/docs/R2-101541.zip, 2 pages.
International Search Report issued in PCT/JP2010/072278, dated Jan. 18, 2011, 4 pages.
3GPP Draft R2-101539, Fujitsu: "Principles for UL access methods", Feb. 16, 2010.
Supplementary European Search Report of related European Patent Application No. 10860514.8 dated Jan. 31, 2017.

* cited by examiner

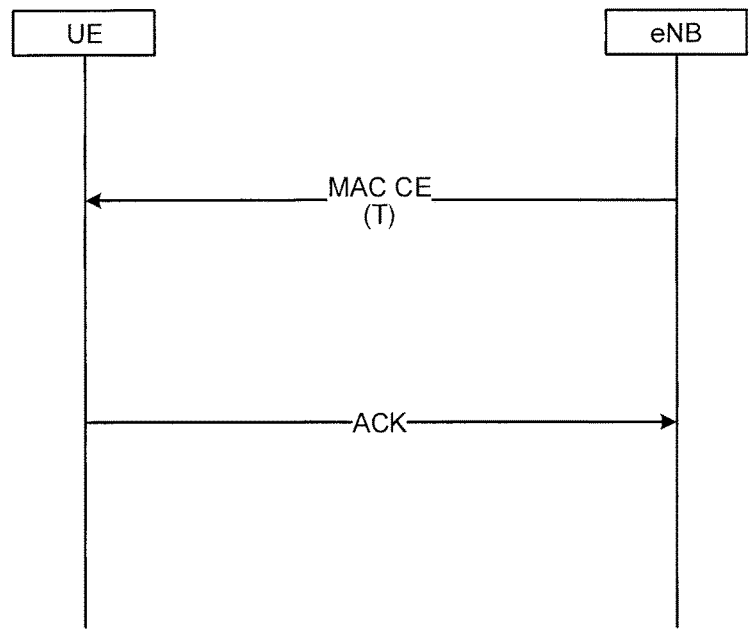
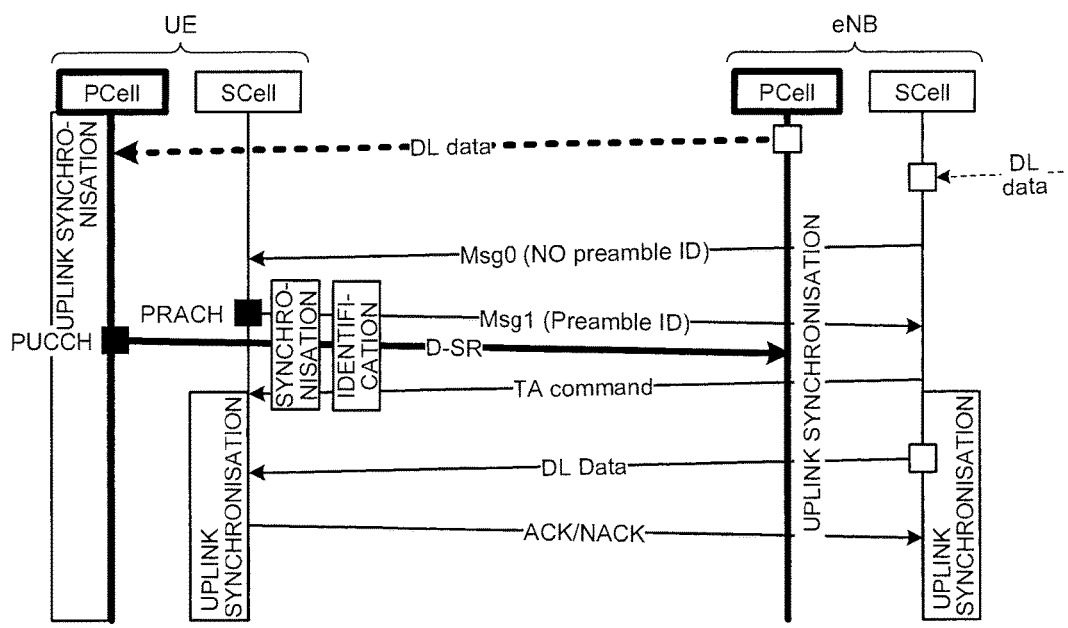

US 10,098,147 B2

WIRELESS COMMUNICATION SYSTEM, RECEIVING DEVICE, TRANSMITTING DEVICE, AND WIRELESS COMMUNICATION METHOD

CROSS-REFERENCE TO RELATED APPLICATION

This application is a continuation application of International Application PCT/JP2010/072278, filed on Dec. 10, 2010, and designating the U.S., the entire contents of which are incorporated herein by reference.

FIELD

The present invention relates to a wireless communication system in which communication can be performed using a plurality of frequency carriers.

BACKGROUND

As one of wireless communication methods according to a related art, there is data transmission based on random access. For example, in the mobile communication system, when uplink data is generated, a mobile station performs random access using a physical random access channel (PRACH), and requests a base station to permit uplink transmission. In the random access, when a plurality of mobile stations transmit the same preamble ID through the same PRACH, contention occurs. When contention occurs, the base station has a problem in detecting the PRACH, and it is finally difficult to detect whether or not the mobile station has performed the random access. Hereinafter, this random access is referred to as "contention-based random access."

Here, an operation of the contention-based random access according to a related art will be briefly described. For example, when uplink data is generated, the mobile station starts random access, and transmits a randomly selected preamble ID to the base station through Msg1 that is transmitted through the PRACH. Here, a plurality of mobile stations are assumed to transmit the same preamble ID through the same PRACH, and in this case, contention occurs. Then, the base station transmits a response to Msg1 through Msg2 together with, for example, a synchronisation signal or transmission grant for uplink communication. The mobile station acquires an uplink synchronisation timing through Msg2. Then, the mobile station transmits its own identifier through Msg3. Thereafter, the base station resolves the contention through Msg4. In other words, when an identifier of a mobile station is detected, Msg4 is transmitted to the corresponding mobile station to notify of the fact that the mobile station has won the contention. Then, after exchanging Msg1 to Msg4, the mobile station performs transmission and reception of data with the base station.

Besides the contention-based random access, as a random access, there is contention-free random access. When downlink data directed to a certain mobile station is generated, the base station performs the contention-free random access to adjust an uplink synchronisation timing in order to obtain uplink synchronisation when uplink synchronisation with the mobile station is made.

Specifically, first of all, the base station assigns a dedicated preamble ID to the certain mobile station through Msg0. Then, the mobile station starts the random access using the assigned dedicated preamble ID through Msg1 which is transmitted through the PRACH. Then, the base station transmits a response to Msg1 through Msg2 together with, for example, a synchronisation signal or transmission grant for uplink communication. The mobile station acquires an uplink synchronisation timing through Msg2. Then, after exchanging Msg1 and Msg2, the base station starts transmission and reception of data with the mobile station. Further, Msg1 is specified to be transmitted through a most recent PRACH of a subframe in which Msg0 has been received.

Non-Patent Document 1: 3GPP T536.300, "Evolved Universal Terrestrial Radio Access (E-UTRA) and Evolved Universal Terrestrial Radio Access Network (E-UTRAN)", V10.0.0, Release 10, June 2010.

Non-Patent Document 2: 3GPP T536.321, "Medium Access Control (MAC) protocol specification", V9.3.0, Release 9, June 2010.

However, in the contention-free random access, there may be a lack of dedicated preamble IDs used in Msg0. For example, it happens when many mobile stations are executing the handover in a cell of a base station. In the handover, a dedicated preamble ID is assigned through Msg0, the random access is performed in a target base station, and an uplink synchronisation timing is fastly obtained. For this reason, when many mobile stations are executing the handover, many dedicated preamble IDs are used. In this case, since it is difficult for the base station to trigger the mobile station to perform the contention-free random access due to a lack of dedicated preamble IDs, a null preamble ID (specifically, "000000") is transmitted through Msg0. For this reason, thereafter, the mobile station that has received Msg0 performs the "contention-based random access (Msg1 to Msg4)" rather than the contention-free random access (Msg1 and Msg2) using the dedicated preamble ID.

In other words, when there is a lack of dedicated preamble IDs in the base station, there is a problem in that a processing time increases by a time required to transmit and receive Msg3 and Msg4 compared to the contention-free random access method.

SUMMARY

According to an aspect, in a wireless communication system that performs wireless communication using a plurality of radio carriers, a receiving device includes a first random access managing unit that transmits a preamble through a random access channel of a first radio channel, and a first scheduling request managing unit that transmits a scheduling request through a control channel of a second radio channel before or after the random access channel, and a transmitting device includes a second random access managing unit that receives the preamble, and a second scheduling request managing unit that receives the scheduling request, wherein the second random access managing unit associates the received scheduling request with the preamble, and identifies a receiving device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 is a diagram illustrating an example of dedicated signaling.

FIG. 14 is a diagram illustrating an example in which a TA command is transmitted instead of Msg2.

DESCRIPTION OF EMBODIMENTS

Hereinafter, exemplary embodiments of a wireless communication system according to the present disclosure will be described in detail with reference to the accompanying drawings. The invention is not limited to the following embodiments.

First Embodiment

Figure 1:
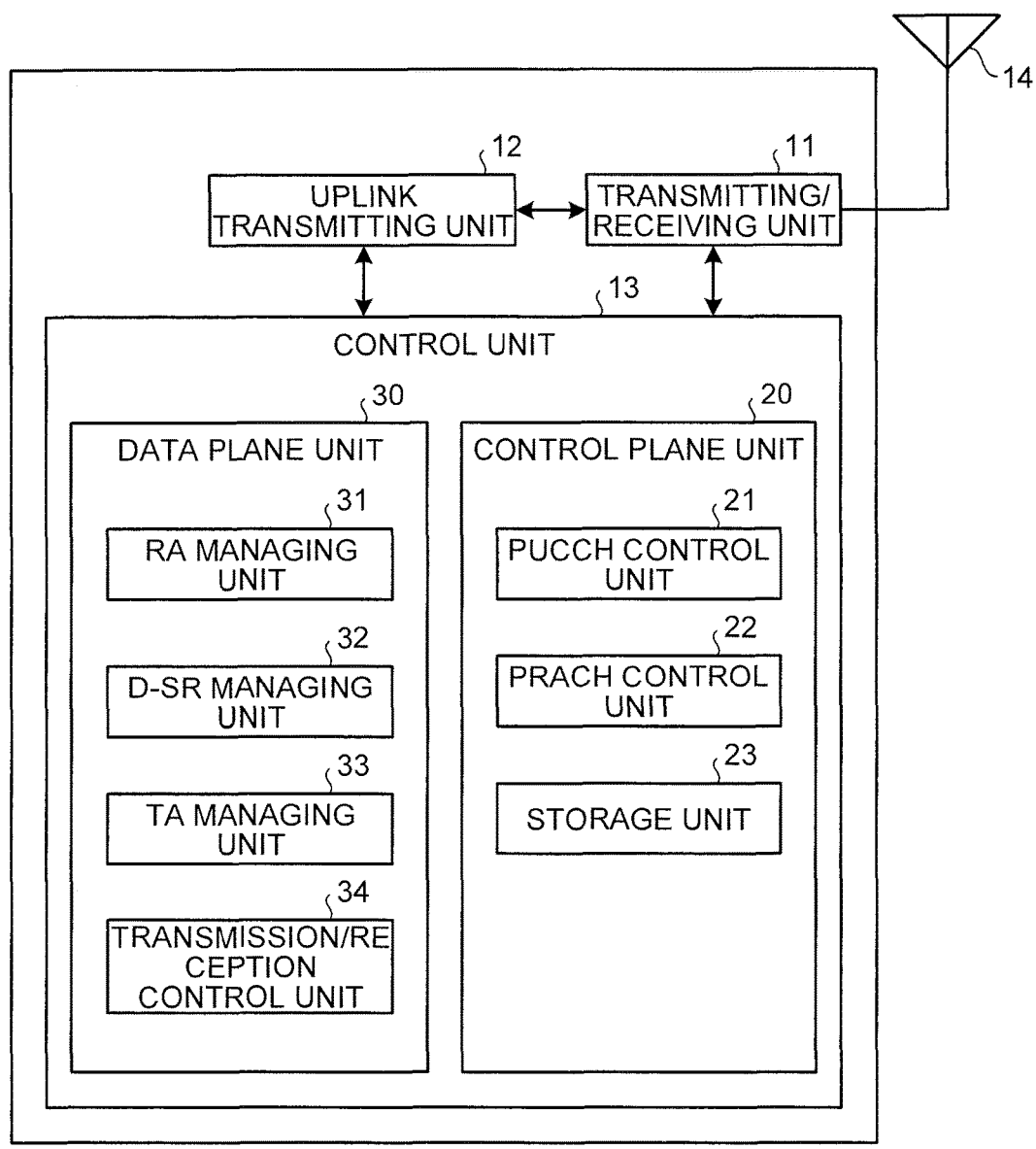
FIG. 1 is a diagram illustrating a configuration example of a mobile station (a receiving device) in a wireless communication system.
Figure 2:
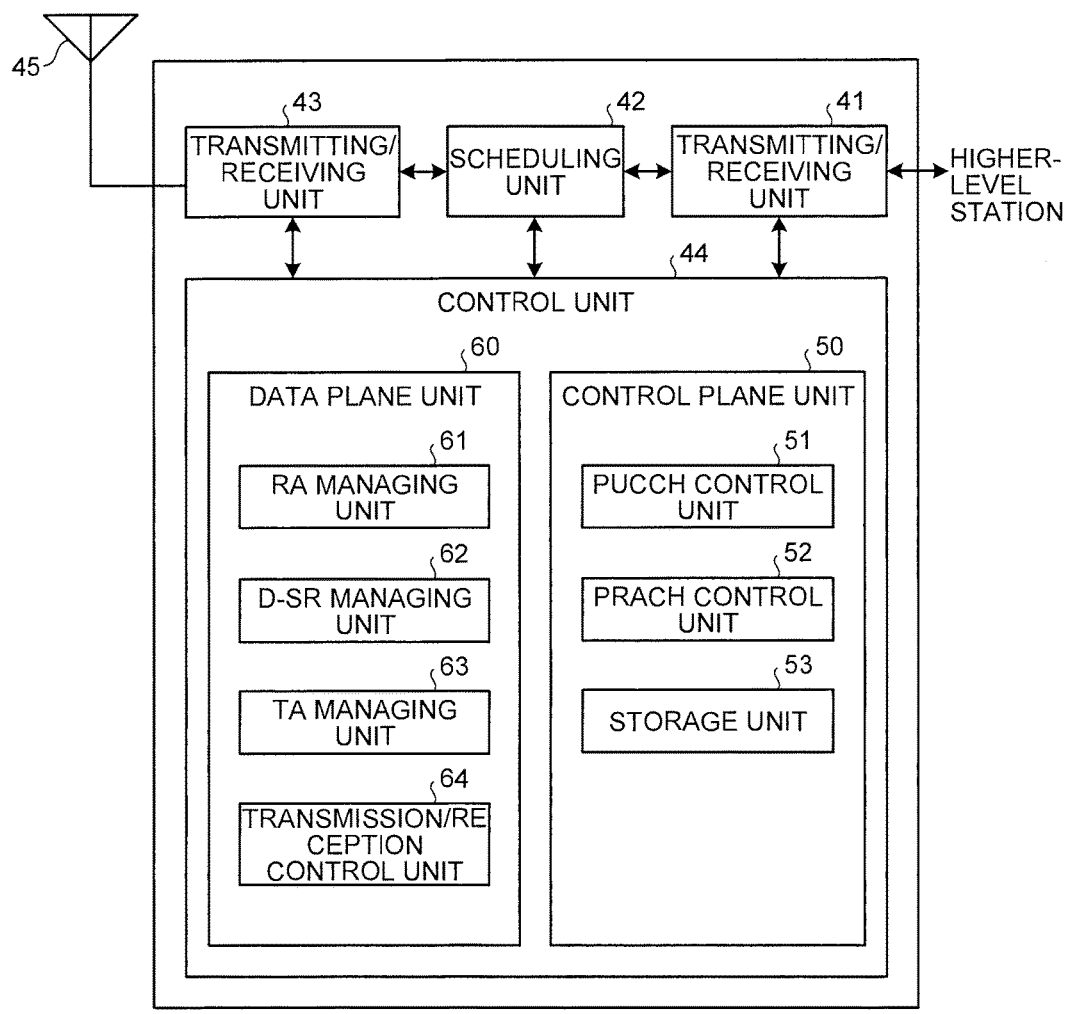
FIG. 2 is a diagram illustrating a configuration example of a base station (a transmitting device) in a wireless communication system.

FIG. 1 is a diagram illustrating a configuration example of a mobile station (a receiving device) in a wireless communication system, and FIG. 2 is a diagram illustrating a configuration example of a base station (a transmitting device) in a wireless communication system.

Referring to FIG. 1, the mobile station includes a transmitting/receiving unit 11, an uplink transmitting unit 12, a control unit 13 including a control plane unit 20 and a data plane unit 30, and an antenna 14. The transmitting/receiving unit 11 transmits or receives a wirelessly transmitted signal through the antenna 14. The uplink transmitting unit 12 performs a process of transmitting uplink transmission data (data, an acknowledgment response (ACK/NACK), or the like) based on control from the control unit 13.

Further, the control plane unit 20 of the control unit 13 is a radio resource control (RRC) layer, and controls all layers. Specifically, the control plane unit 20 includes a physical uplink control channel (PUCCH) control unit 21, a PRACH control unit 22, and a storage unit 23. The PUCCH control unit 21 performs timing control and resource control of the PUCCH, and the PRACH control unit 22 performs timing control and resource control of the PRACH. The storage unit 23 stores a parameter T representing a range of a transmission timing of a D-SR (an dedicated scheduling request).

The data plane unit 30 of the control unit 13 controls a physical (PHY) layer, a media access control (MAC) layer, a radio link control (RLC) layer, and a Packet Data Convergence Protocol (PDCP) layer. Specifically, the data plane unit 30 includes a random access (RA) managing unit 31, a D-SR managing unit 32, a timing adjustment (TA) managing unit 33, and a transmission/reception control unit 34. The RA managing unit 31 controls a process related to a random access method. The D-SR managing unit 32 controls a process related to a scheduling request method. The TA managing unit 33 manages an uplink synchronisation timing. The transmission/reception control unit 34 controls transmission and reception of data, acknowledgment response (ACK/NACK), and the like.

Meanwhile, referring to FIG. 2, the base station includes a transmitting/receiving unit 41, a scheduling unit 42, a transmitting/receiving unit 43, a control unit 44 including a control plane unit 50 and a data plane unit 60, and an antenna 45. The transmitting/receiving unit 41 performs transmission and reception of data with a higher-level station. The scheduling unit 42 performs scheduling of wireless transmission. The transmitting/receiving unit 43 transmits or receives a wirelessly transmitted signal through the antenna 45.

The control plane unit 50 of the control unit 44 is an RRC layer, and controls all layers. Specifically, the control plane unit 50 includes a PUCCH control unit 51, a PRACH control unit 52, and a storage unit 53. The PUCCH control unit 51 performs timing control and resource control of the PUCCH, and the PRACH control unit 52 performs timing control and resource control of the PRACH. The storage unit 53 stores the parameter T representing the range of transmission timing of the D-SR.

The data plane unit 60 of the control unit 44 controls PHY, MAC, RLC, and PDCP layers. Specifically, the data plane unit 60 includes an RA managing unit 61, a D-SR managing unit 62, a TA managing unit 63, and a transmission/reception control unit 64. The RA managing unit 61 controls a process related to a random access method. The D-SR managing unit 62 controls a process related to a scheduling request method. The TA managing unit 63 manages an uplink synchronisation timing. The transmission/reception control unit 64 controls transmission and reception of data, acknowledgment response (ACK/NACK), and the like.

The present embodiment will be described in connection with a wireless communication method of a wireless communication system including the mobile station (receiving device) and the base station (transmitting device) as an example, but a relation between the receiving device and the transmitting device is not limited to this example. For example, the wireless communication method according to the present embodiment can be similarly applied to a system including a relay station (receiving device) and a base station (transmitting device) or a system including a mobile station (receiving device) and a relay station (transmitting device). For the sake of convenience, the configuration examples of the mobile station and the base station include the components related to the process according to the present embodiment, and do not illustrate all functions of the mobile station and the base station. For example, the components of the mobile station and the base station may be implemented by a central processing unit (CPU), a field programmable gate array (FPGA), memory, and the like.

Here, before describing a wireless communication method in a wireless communication system according to the present embodiment, a system and a wireless communication method serving the basis thereof will be first described.

In the Long Term Evolution (LTE) which is a next generation mobile communication system, a scheme based on the orthogonal frequency division multiplexing (OFDM) is specified as a wireless access method. In LTE, high-speed wireless packet communication in which the downlink peak transmission rate is 100 Mb/s or more and the uplink peak transmission rate is 50 Mb/s or more can be implemented. In the 3rd Generation Partnership Project (3GPP) which is an international standardization organization, a wireless communication system LTE-advanced (LTE-A) based on the LTE to implement higher-speed communication is currently under review. In the LTE-A, a target downlink peak transmission rate is 1 Gb/s, and a target uplink peak transmission rate is 500 Mb/s, and various new method such as a wireless access scheme and network architecture have been being received. Meanwhile, since the LTE-A is based on the LIE, it is important for the LTE-A to maintain backward compatibility.

Figure 3:
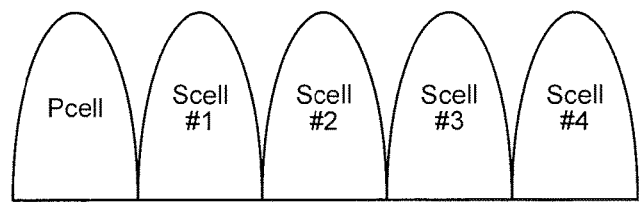
FIG. 3 is a diagram illustrating carrier aggregation.
Figure 4:
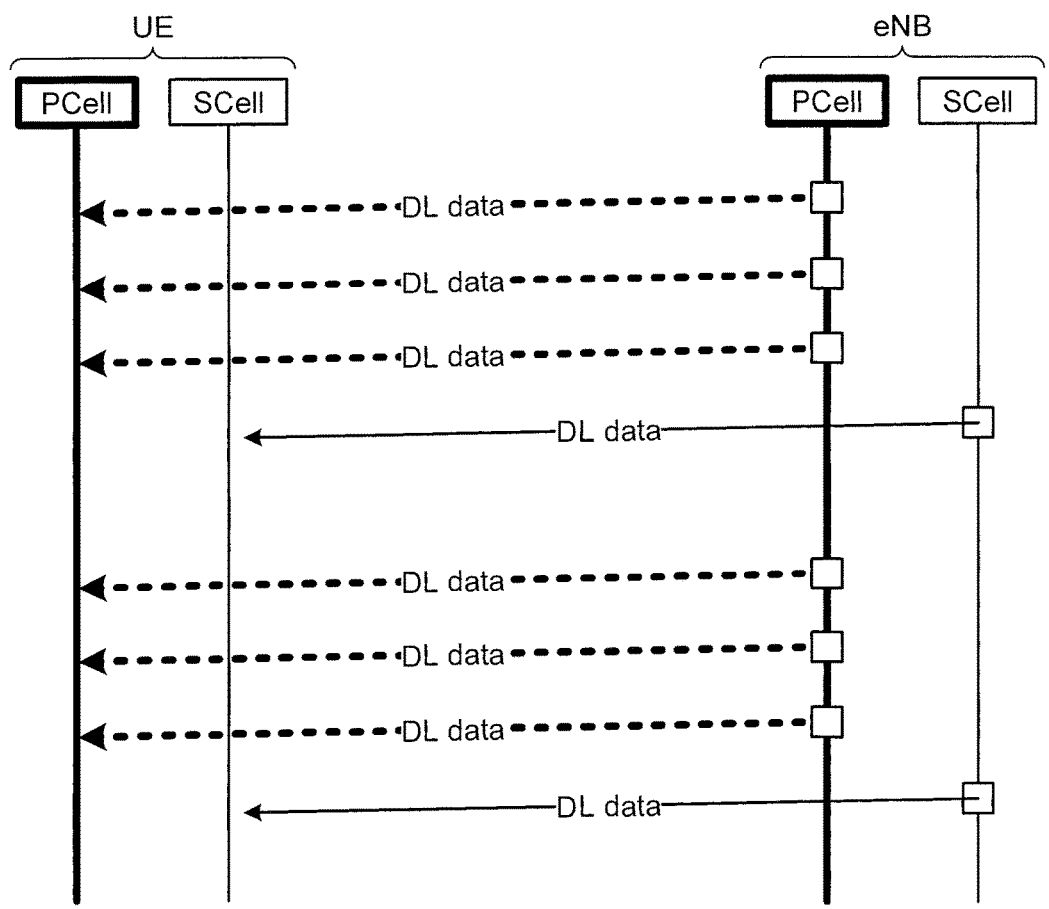
FIG. 4 is a diagram illustrating an aspect in which data is transmitted and received in a wireless communication system employing carrier aggregation.

In the LTE-A (or the LTE Rel-10), as a method for implementing high-speed communication, a wireless communication method of aggregating a plurality of radio carriers of the LTE system and transmitting large amount of data using the aggregated band is under review. This is referred to as carrier aggregation (frequency aggregation). FIG. 3 is a diagram illustrating the carrier aggregation. In FIG. 3, each of LTE radio carriers to be bound is referred to as a component carrier. Further, in the carrier aggregation, a cell for executing various kinds of important control (for example, transmission of uplink control data) is referred to as a primary cell (PCell). Each of cells (#1 to #4) that can be bound is referred to as a secondary cell (SCell), and is used as an additional carrier for improving the throughput. FIG. 4 is a diagram illustrating an aspect in which data is transmitted and received in a wireless communication system employing the carrier aggregation. In the LTE-A or the like, for example, the mobile station (UE) and the base station (eNB) perform transmission and reception of data (which corresponds to downlink (DL) data illustrated in FIG. 4) using a plurality of component carriers.

Figure 5:
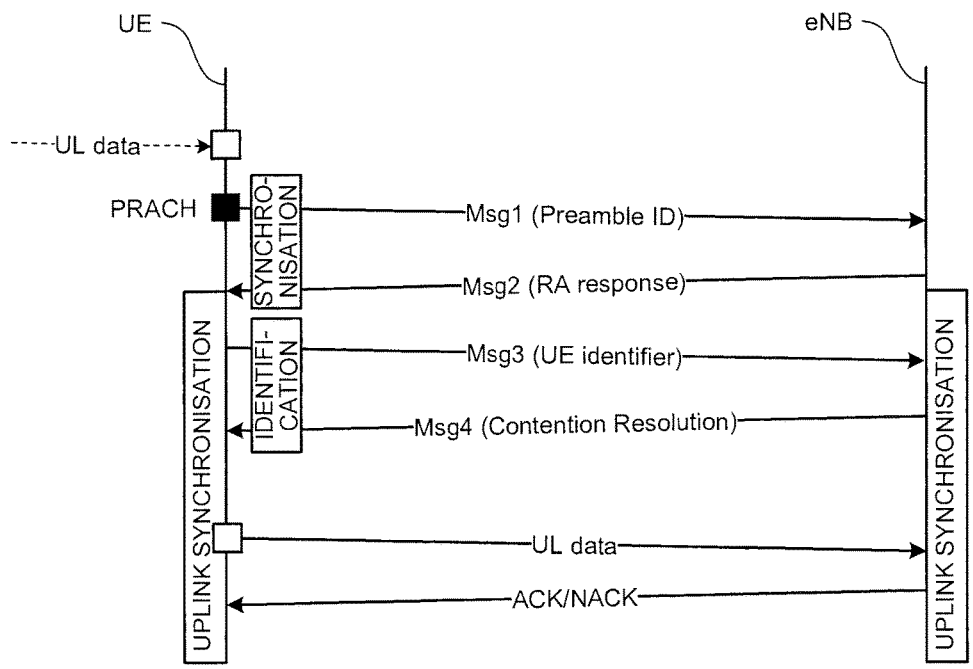
FIG. 5 is a diagram illustrating an example of a contention-based random access method.

Further, in the LTE-A or the like, a contention-based random access method is considered as method serving as the basis of the wireless communication method according to the present embodiment. For example, when uplink (UL) data is generated but a scheduling request resource is not assigned yet, the mobile station performs the contention-based random access, and requests the base station to give the uplink transmission grant. FIG. 5 is a diagram illustrating an example of the contention-based random access method.

Specifically, first of all, the mobile station starts the random access using a randomly selected preamble ID, and transmits the selected preamble ID through Msg1. Here, a plurality of mobile stations are assumed to transmit the same preamble ID through the same PRACH, and in this case, contention occurs. Meanwhile, even when contention occurs, the base station is unable to recognize an identifier of a valid mobile station in this stage and thus does not know mobile stations among which the contention of preamble IDs occurs. Then, the base station transmits a response (an RA response) to Msg1 through Msg2 together with, for example, a synchronisation signal or transmission grant for uplink communication. When a plurality of mobile stations transmit Msg1 at the same time, Msg2 is transmitted toward the plurality of mobile stations. The mobile station acquires an uplink synchronisation timing through Msg2. Then, the mobile station transmits an identifier of its own station (a UE identifier) through Msg3. When Msg3 is received, the base station can recognize the identifier of the mobile station and can recognize mobile stations among which the contention of the preamble IDs occurs when a plurality of the mobile stations transmit the same preamble ID through different PRACHs. Meanwhile, when a plurality of the mobile stations transmit the same preamble ID through the same PRACH, for example, a mobile station having high reception power is detected. Thereafter, the base station transmits Msg4 to the detected mobile station to perform contention resolution. In other words, in the contention-based random access method, synchronisation between devices (uplink synchronisation) is performed through Msg1 and Msg2, and mobile station identification is performed through Msg3 and Msg4.

Then, after "synchronized" and "mobile station identification" are completed through Msg1 to Msg4, the mobile station starts transmission and reception of data (UL data or ACK/NACK) with the base station. A reception time is specified for Msg2. The reception time has a value of 2, 3, 4, 5, 6, 7, 8, and 10, and a unit thereof is a subframe. For example, when the value is set to 2, the mobile station monitors Msg2 continuously during two subframes after three subframes when counting is performed starting from a subject frame next to a subframe in which Msg1 is transmitted. Further, a reception time is specified for Msg4. The reception time has a value of 8, 16, 24, 32, 40, 48, 56, and 64. For example, when the value is set to 8, the mobile station monitors Msg4 continuously during a maximum of eight subframes when counting is performed starting from a subframe in which Msg3 is transmitted.

Figure 6:
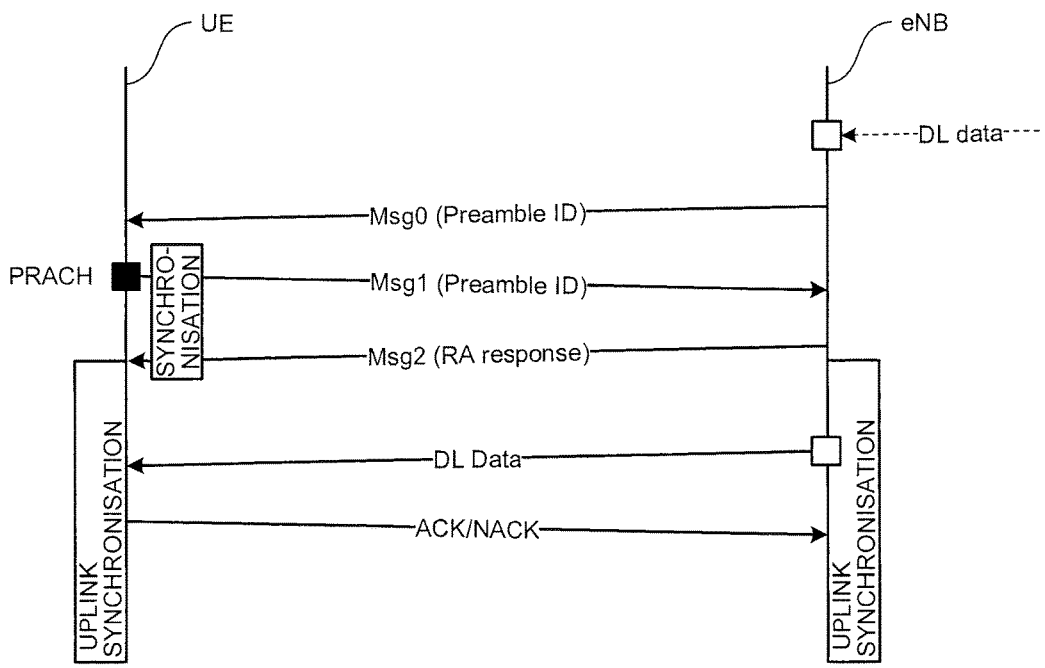
FIG. 6 is a diagram illustrating an example of a contention-free random access method.

Further, in the LTE-A or the like, a contention-free random access method is specified in addition to the contention-based random access method. For example, when DL data directed to a specific mobile station is generated but uplink of the mobile station is not synchronized, the base station triggers the mobile station to perform the contention-free random access in order to get the uplink synchronized. FIG. 6 is a diagram illustrating an example of the contention-free random access method.

Specifically, first of all, the base station assigns a dedicated preamble ID to the certain mobile station through Msg0. Then, the mobile station starts the random access using the assigned dedicated preamble ID through Msg1. Then, the base station transmits a response to Msg1 through Msg2 together with, for example, a synchronisation signal or transmission grant for uplink communication. The mobile station acquires an uplink synchronisation timing through Msg2. In the contention-free random access method, synchronisation between devices (obtaining uplink synchronisation) is obtained through Msg1 and Msg2.

Then, after "synchronisation" is performed through Msg1 and Msg2, the base station starts transmission and reception of data (DL data or ACK/NACK) with the mobile station.

Further, in the contention-free random access method, there may be a lack of dedicated preamble IDs used in Msg0. For example, it happens when many mobile stations perform the handover in the cell of the base station. In the handover, a dedicated preamble ID is assigned through Msg0, and the random access is performed through a target base station, and an uplink synchronisation timing is obtained fastly. For this reason, when many mobile stations perform the handover, many dedicated preamble IDs are used. In this case, since it is difficult for the base station to trigger the mobile station to perform the contention-free random access due to a lack of dedicated preamble IDs, the base station transmits a null preamble ID (specifically, "000000") through Msg0. Then, the mobile station that has received Msg0 performs the contention-based random access. In this case, Msg1 is specified to be transmitted through a most recent PRACH of a subframe in which Msg0 has been received.

Figure 7:
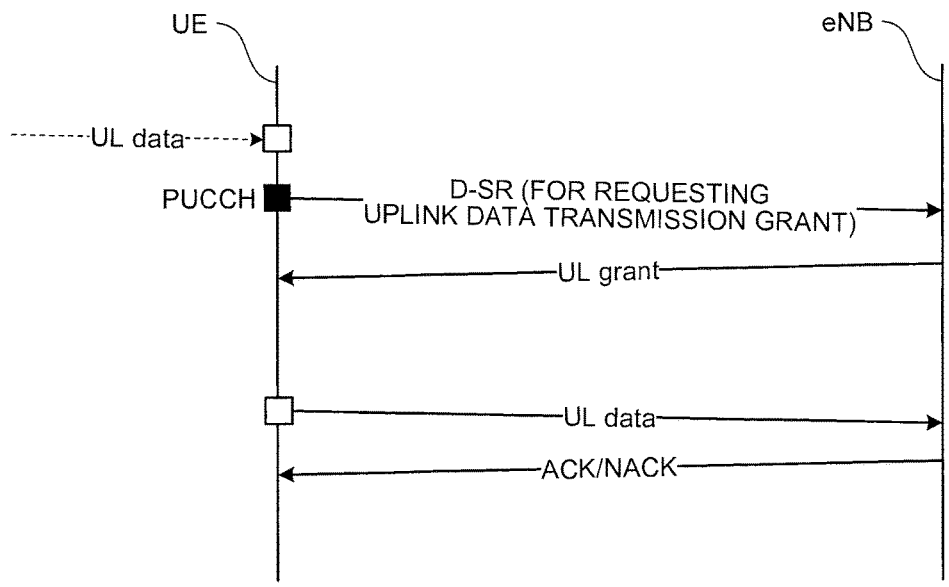
FIG. 7 is a diagram illustrating an example of a scheduling request method.

Further, in the LTE-A or the like, as a method serving the basis of the wireless communication method according to the present embodiment, a scheduling request method is specified. For example, when UL data is generated and a scheduling request resource is already assigned, the mobile station performs an uplink data transmission request by the scheduling request method. FIG. 7 is a diagram illustrating an example of the scheduling request method. Assignment of resources (assignment of subframes with transmission grant of "SR PUCCH" and wireless resources to be used) is designated by a high-level layer.

Specifically, the mobile station transmits a scheduling request message (D-SR) for requesting an uplink data transmission grant using the designated subframe timing and the designated wireless resources. Unlike the contention-based random access, the base station that has received the D-SR is able to detect the mobile station that has transmitted the D-SR and thus transmits an uplink transmission grant message (a UL grant) to the corresponding mobile station. The mobile station receives the UL grant and then transmits uplink data (UL data or ACK/NACK).

Further, when the D-SR is received, the base station need not necessarily transmit the UL grant to the mobile station (which is not specified in the specification). For this reason, when it is difficult to receive the UL grant from the base station, the mobile station keep transmitting the D-SR repeatedly until the UL grant is received using a designated transmission timing and resource of the D-SR. The number of D-SRs that can be transmitted is specified based on a parameter (a count value) such as SR_COUNTER and dsr-TransMax which is a maximum value. The maximum value is designated from the base station. In other words, when "SR_COUNTER<dsr-TransMax" is satisfied, the mobile station continuously transmits the D-SR. However, in the case of "SR_COUNTER≥dsr-TransMax," the mobile station is not allowed to transmit the D-SR because it is larger than an allowable transmission number, and thus switches to the contention-based random access and performs an uplink data transmission request.

Further, in the carrier aggregation, the PUCCH is present on the PCell. It is because PUCCH resources are invaluable. Thus, the scheduling request method is also performed on the PCell.

Further, there is a rule to differentiate between the use of the random access method and the use of the scheduling request method. In other words, when "SR PUCCH" is not assigned to the mobile station, the mobile station performs the uplink data transmission request based on the contention-based random access method. However, when "SR PUCCH" is assigned, the mobile station first performs the uplink data transmission request based on the scheduling request method. Then, when the uplink transmission grant is not obtained from the base station within the specified number of times of transmission (transmission of the D-SR), the mobile station switches to the uplink data transmission request based on the contention-based random access method. In other words, the random access method and the scheduling request method are exclusively performed and not performed at the same time.

Figure 8:
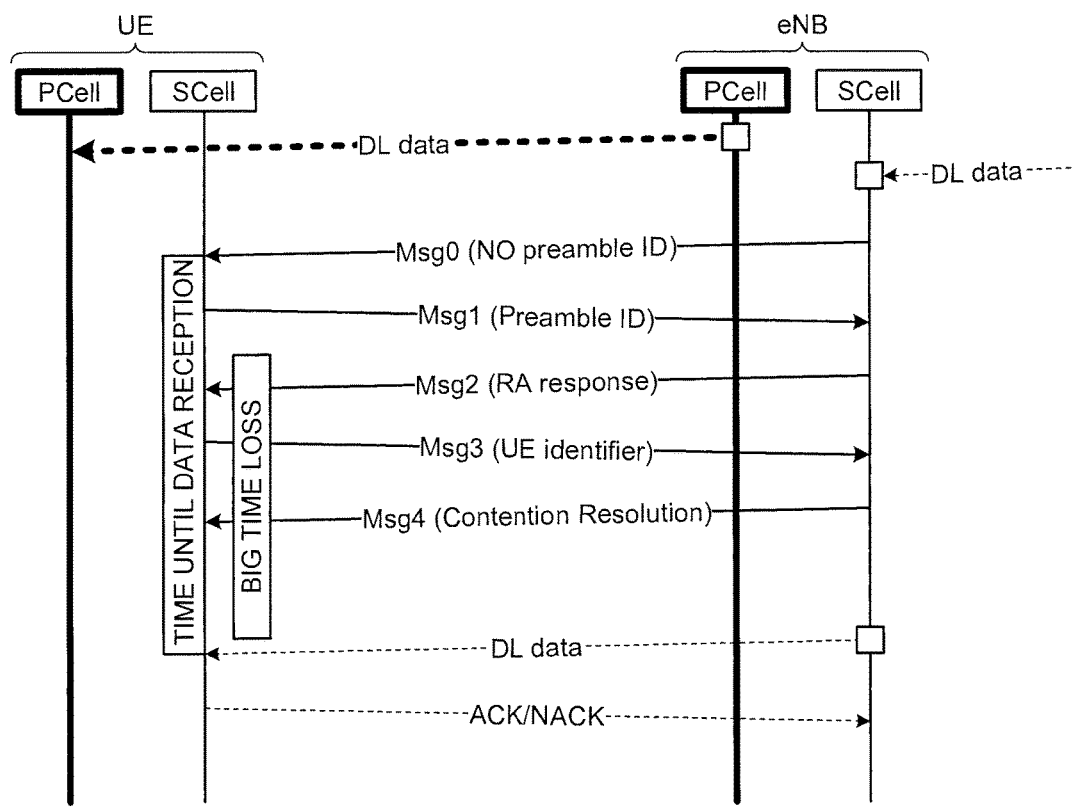
FIG. 8 is a diagram illustrating an example in which a contention-based random access method is performed through an SCell.

Further, as a method serving as the basis of the wireless communication method according to the present embodiment, an example in which the contention-based random access method is performed through the SCell in the carrier aggregation will be described. FIG. 8 is a diagram illustrating an example in which the contention-based random access method is performed through the SCell. Here, an example in which DL data directed to a specific mobile station is generated but the base station transmits a preamble ID "000000" through Msg0 due to a lack of dedicated preamble IDs is assumed.

For example, when there is a lack of dedicated preamble IDs, since it is difficult to trigger the mobile station to perform the contention-free random access using the dedicated preamble ID, the base station transmits the preamble ID "000000" through Msg0. Then, the mobile station that has received Msg0 starts the random access, and transmits a randomly selected preamble ID through Msg1. Then, the base station transmits a response (an RA response) to Msg1 through Msg2 together with, for example, a synchronisation signal or transmission grant for uplink communication. Then, the mobile station transmits an identifier of its own station (a UE identifier) through Msg3. Then, the base station performs contention resolution through Msg4. Then, after "synchronized" and "mobile station identification" are completed through Msg1 to Msg4, the base station starts transmission and reception of data (DL data or ACK/NACK) with the mobile station.

However, as described above, when the contention-based random access method is performed in SCell in the carrier aggregation, a time necessary until downlink data is transmitted after Msg0 is received is about 25 ms. In other words, a time loss necessary for transmission and reception of Msg3 and Msg4 for performing "mobile station identification" is large compared to the contention-free random access method (FIG. 6).

In this regard, in the present embodiment, a random access method (a wireless communication method) in the SCell is employed in order to implement high-speed communication.

Figure 9:
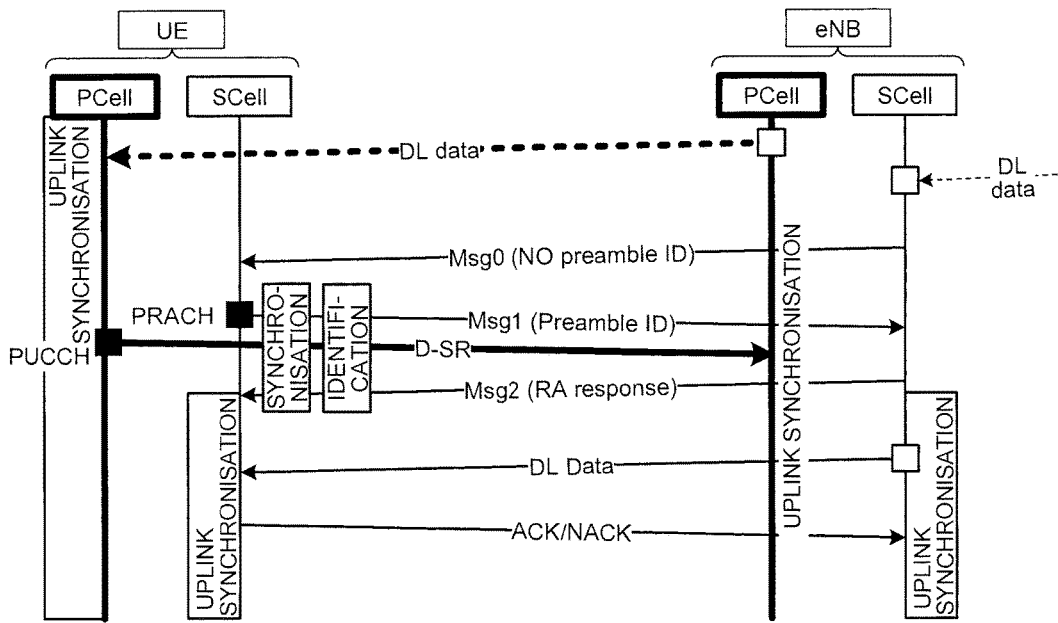
FIG. 9 is a diagram illustrating an example of a wireless communication method according to a first embodiment.

Next, a wireless communication method according to the present embodiment will be described. FIG. 9 is a diagram illustrating an example of a wireless communication method according to a first embodiment. In the present embodiment, the mobile station transmits the D-SR in addition to Msg1, and thus the base station can quickly identify the mobile station that has transmitted Msg1. In FIG. 9, an example in which DL data directed to a specific mobile station over the SCell is generated but the base station transmits a preamble ID "000000" through Msg0 due to a lack of dedicated preamble IDs is assumed. Further, in the present embodiment, the specific mobile station is assumed to be already assigned a scheduling request resource (to be already assigned a subframe in which transmission of "SR PUCCH" is allowed and wireless resources to be used). Further, in the PCell, uplink synchronisation remains already obtained.

When there is a lack of dedicated preamble IDs, it is difficult for the base station to trigger the specific mobile station to perform the contention-free random access (FIG. 6) using the dedicated preamble ID, the base station first transmits a preamble ID "000000" (no preamble ID) through Msg0.

Then, the mobile station that has received Msg0 transmits Msg1 including a randomly selected preamble ID through a PRACH set on the SCell. Further, the mobile station transmits the D-SR through the SR PUCCH which exists "near" the PRACH and is set on the PCell.

Then, when reception of Msg1 and the D-SR is detected, the base station determines that "Msg1 has been transmitted from the mobile station that has transmitted the D-SR" and uniquely identifies the mobile station. It is difficult for the base station to recognize an identifier of a valid mobile station through Msg1, but the base station can identify the mobile station that has transmitted the D-SR based on the reception of the D-SR.

Then, the base station transmits a response (an RA response) to Msg1 through Msg2 together with, for example, a synchronisation signal (correction value for an uplink timing) and transmission grant for uplink communication. The mobile station acquires an uplink synchronisation timing through Msg2.

In other words, in the present embodiment, synchronisation between devices (uplink synchronisation) is obtained by Msg1, the D-SR, and Msg2, and the mobile station is identified by the D-SR, and thus it is unnecessary to transmit and receive Msg3 and Msg4 in the contention-based random access method.

Then, after completing "synchronisation" and "mobile station identification" by Msg1, the D-SR, and Msg2, the base station starts transmission and reception of data (DL data or ACK/NACK) with the mobile station.

As described above, in the wireless communication method according to the present embodiment illustrated in FIG. 9, identification of a mobile station that has transmitted Msg1 can be quickly performed due to association of the D-SR and Msg1. Here, "association" means that the mobile station side transmits Msg1 through the PRACH configured on the SCell and further transmits the D-SR through the SR PUCCH configured on the PCell "near" the PRACH through which Msg1 has been transmitted. Further, "association" means that the base station side determines that "Msg1 has been transmitted from the mobile station that has transmitted the D-SR" when Msg1 and the D-SR have been detected.

Figure 10:
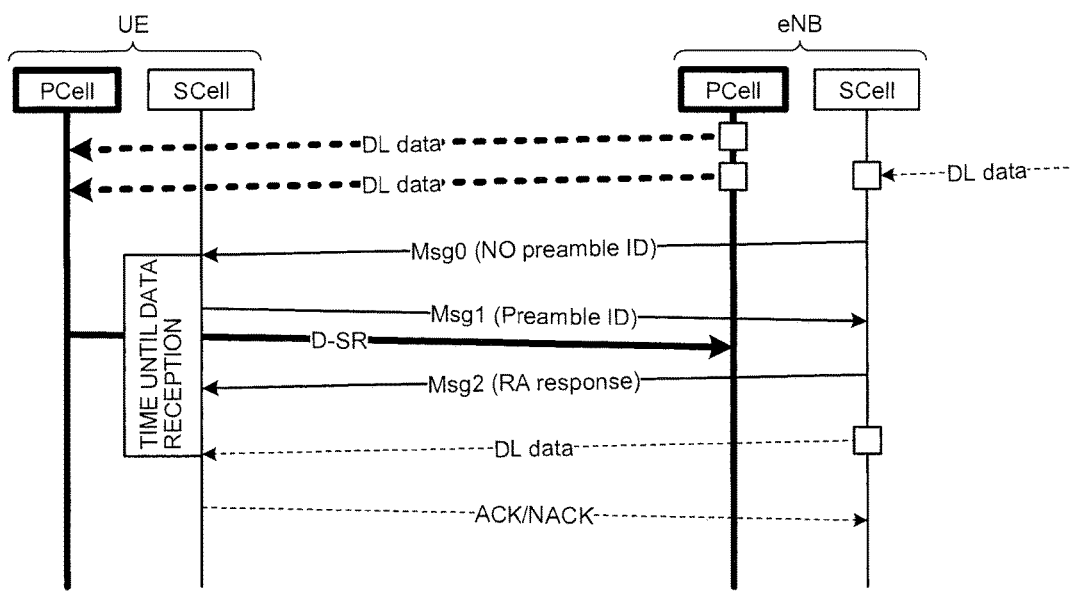
FIG. 10 is a diagram illustrating an effect of the wireless communication method according to the first embodiment.

FIG. 10 is a diagram illustrating an effect of the wireless communication method according to the present embodiment. A time necessary until downlink data is transmitted after Msg0 is received is about 25 ms in FIG. 8, but as the wireless communication method according to the present embodiment is performed, the time can be reduced to about 12 ms.

Figure 11:
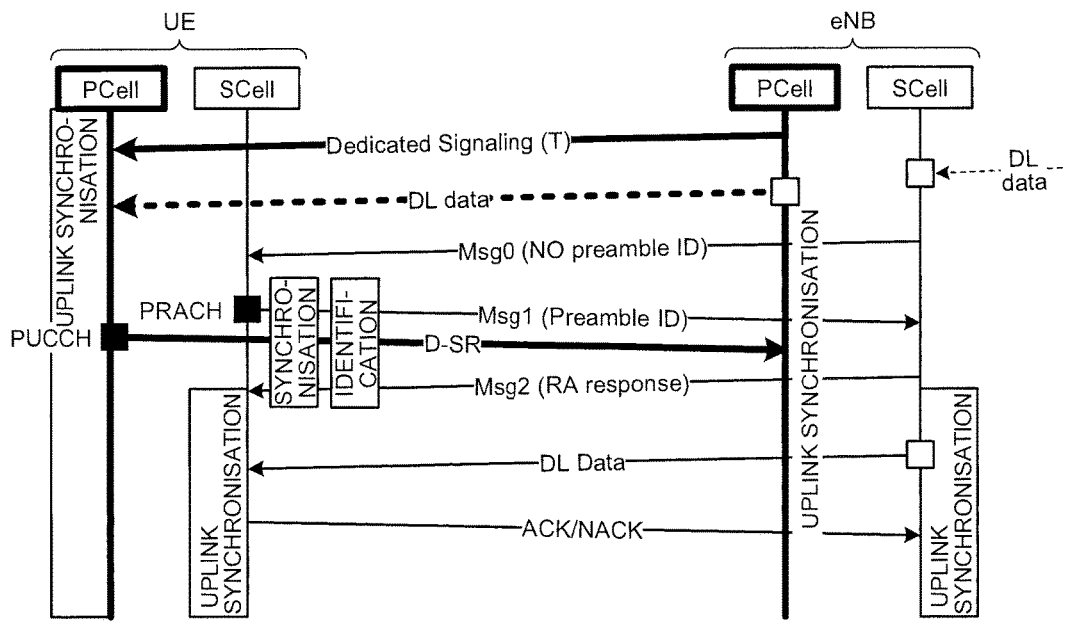
FIG. 11 is a diagram illustrating an operation of notifying of a value of a parameter T.

Further, "near" the PRACH which is a transmission timing of the D-SR may be predetermined as the parameter T. For example, when a Value of T is represented by the number of subframes having a subframe as a unit, "near" represents a status in which the PRACH on the SCell and the SR PUCCH on the PCell fall within T. FIG. 11 is a diagram illustrating an operation of notifying of the Value of T. In the present embodiment, the base station notifies the mobile station the Value of T through dedicated signaling. Here, it is preferable that the parameter T have a value of other than "0 (zero)." It is because when the Value of T is set to 0 (zero), it means that the mobile station transmits the PRACH and the SR PUCCH through the same subframe, but in this case, a process of decoding the PRACH and the SR PUCCH in a receiving unit of the base station becomes complicated. Here, when the base station can perform a high-speed decoding process, the Value of T may be set to 0 (zero). Further, the parameter T may be more rigorously set. In other words, the SR PUCCH may be transmitted after T subframes when counting is performed starting from a subframe in which the parameter T has been received.

Figure 12:
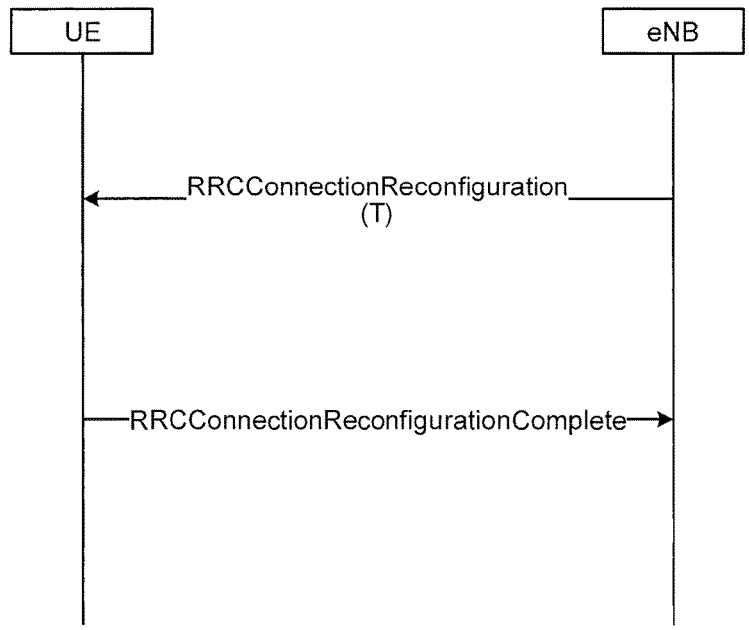
FIG. 12 is a diagram illustrating an example of dedicated signaling.

FIG. 12 is a diagram illustrating an example of the dedicated signaling. Here, the base station notifies the mobile station of the Value of T using "RRC Connection Reconfiguration" which is transmitted and received when communication sets up. Then, the mobile station transmits "RRC Connection Reconfiguration Complete" as a response.

FIG. 13 is a diagram illustrating another example of the dedicated signaling. Here, the base station notifies the mobile station of the Value of T using "MAC Control Element." Then, the mobile station transmits ACK as a response.

In the example of FIG. 9, the D-SR is transmitted after Msg1 is transmitted, the transmission timing of the D-SR is not limited to this example. In other words, the D-SR may be transmitted before Msg1 is transmitted. For example, after 4 ms which is a transmission timing of an acknowledgment response to typical downlink data when Msg0 is detected, the mobile station may transmit the D-SR, and then transmit Msg1.

Further, in the present embodiment (the wireless communication method illustrated in FIG. 9), it is possible that a transmission of Msg2 is omitted. Msg2 is Random Access RNTI (RA-RNTI) which is a common address and transmitted by a MAC RAR protocol data unit (PDU) which is a control command of the MAC layer. Specifically, Msg2 is transmitted in a state in which a CRC (16 bits) part of a physical downlink control channel (PDCCH) through which Msg2 is transmitted is masked by the RA-RNTI (16 bits), and the PDU includes a correction value of an uplink synchronisation timing, a random access grant, and the like. Thus, all mobile stations that have transmitted Msg1 need to monitor the PDCCH masked by the RA-RNTI at a specified timing. However, in the present embodiment, since the mobile station can be identified when Msg1 and the D-SR are detected, a TA command can be separately transmitted instead of Msg2 notified of using an address (RA-RNTI) common to the mobile stations. The TA command is transmitted through "MAC Control Element" which is control command of the MAC layer, specifically, "TA command MAC Control Element", and the correction value of the uplink synchronisation timing is notified of by 6 bits. FIG. 14 is a diagram illustrating an example in which the base station transmits the TA command instead of Msg2. The TA command is transmitted to the mobile station in a state in which the CRC part of the PDCCH is masked by C-RNTI which is an ID of the mobile station, and the mobile station receives the TA command and corrects the uplink synchronisation timing.

Figure 15:
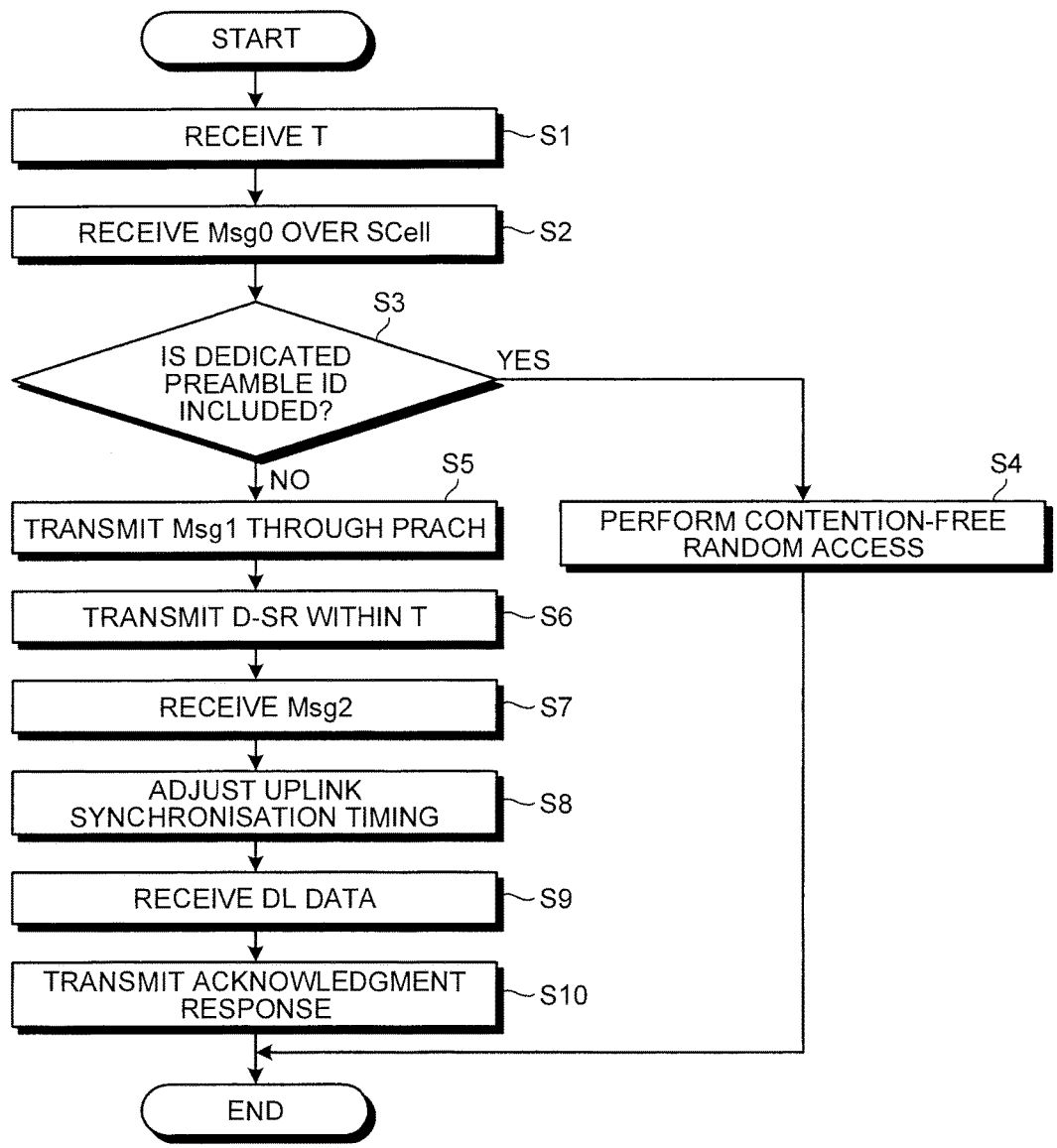
FIG. 15 is a flowchart illustrating an operation of a mobile station (receiving device) according to the first embodiment.
Figure 16:
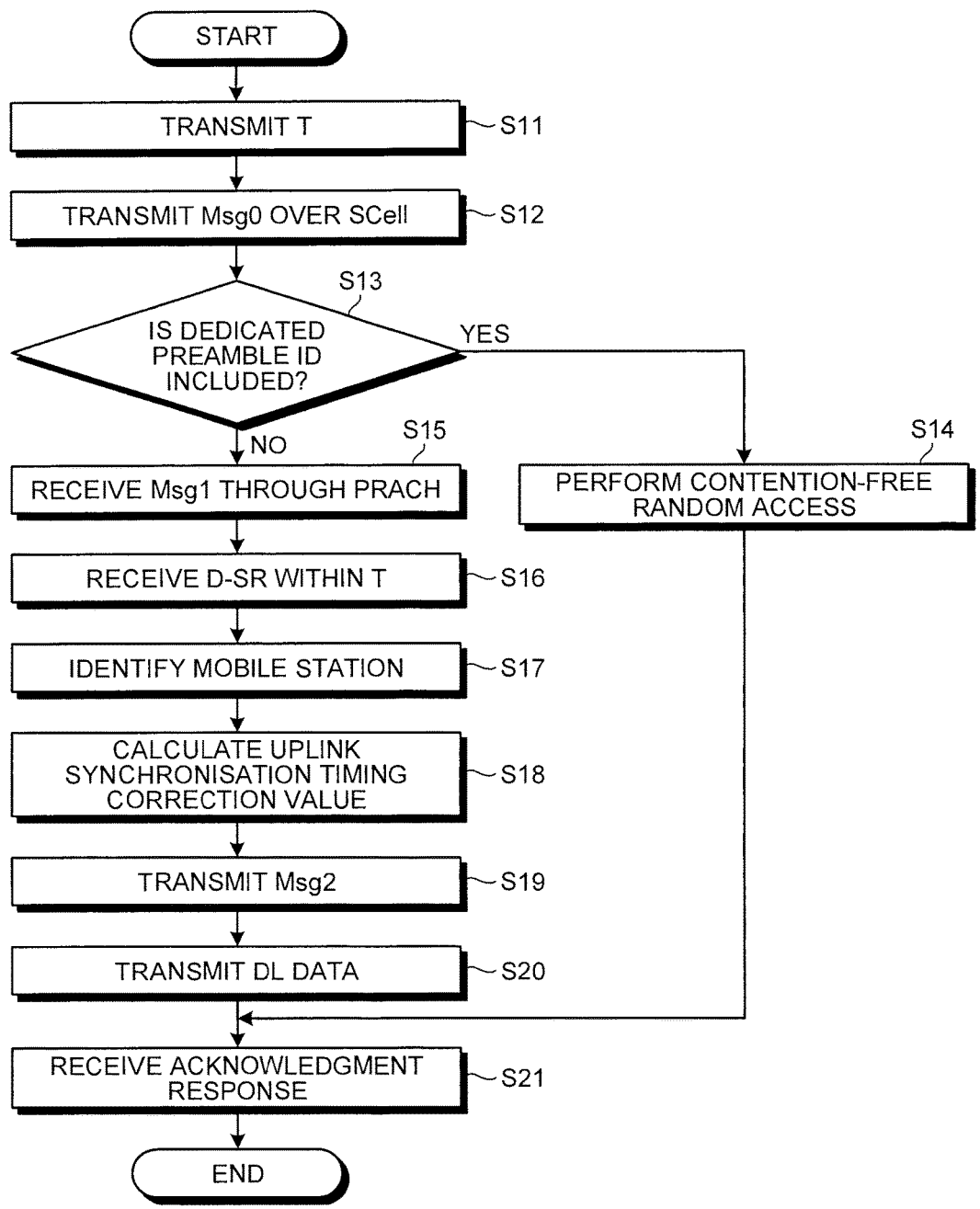
FIG. 16 is a flowchart illustrating an operation of a base station (transmitting device) according to the first embodiment.

Next, operations of the base station and the mobile station for implementing the wireless communication method according to the present embodiment will be described with reference to flowcharts. FIG. 15 is a flowchart illustrating an operation of the mobile station (receiving device) that receives DL data, and FIG. 16 is a flowchart illustrating an operation of the base station (transmitting device) that transmits DL data.

An operation of the mobile station will be described with reference to FIG. 15. First of all, the transmission/reception control unit 34 receives the parameter T transmitted through "RRC Connection Reconfiguration" through the transmitting/receiving unit 11, and stores the parameter T in the storage unit 23 (S1).

Then, the RA managing unit 31 receives Msg0 over the SCell through the transmitting/receiving unit 11 (S2). Then, the RA managing unit 31 determines whether or not a dedicated preamble ID is included in Msg0 (S3). For example, when it is determined that the dedicated preamble ID is included (Yes in S3), the RA managing unit 31 performs the contention-free random access illustrated in FIG. 6 (S4). However, when it is determined that the dedicated preamble ID is not included (No in S3), the RA managing unit 31 transmits Msg1 through PRACH set on the SCell through the uplink transmitting unit 12 and the transmitting/receiving unit 11 (S5). Here, it is determined that "the dedicated preamble ID is not included" when the preamble ID "000000" is included.

The D-SR managing unit 32 reads the parameter T from the storage unit 23, and transmits the D-SR within the parameter T using the SR PUCCH set on the PCell through the uplink transmitting unit 12 and the transmitting/receiving unit 11 (S6).

Then, the RA managing unit 31 receives Msg2 over the SCell through the transmitting/receiving unit 11 (S7). Then, the transmission/reception control unit 34 adjusts the uplink synchronisation timing based on Msg2 received by the RA managing unit 31 (S8).

Thereafter, the transmission/reception control unit 34 receives DL data over the SCell through the transmitting/receiving unit 11 (S9), and transmits a response acknowledgment (ACK/NACK) over the SCell as a response (S10).

An operation of the base station will be described with reference to FIG. 16. First of all, the transmission/reception control unit 64 reads the parameter T previously stored in the storage unit 53, and transmits the parameter T using "RRC Connection Reconfiguration" through the transmitting/receiving unit 43 (S11).

Thereafter, when DL data directed to a specific mobile station over the SCell is generated, the RA managing unit 61 transmits Msg0 over the SCell through the transmitting/receiving unit 43 (S12). Then, the RA managing unit 61 checks whether or not a dedicated preamble ID is included in Msg0 (S13). For example, when it is determined that Msg0 including the dedicated preamble ID is transmitted (Yes in S13), the RA managing unit 61 performs the contention-free random access illustrated in FIG. 6 (S14). However, when it is determined that Msg0 including no dedicated preamble ID is transmitted (No in S13), the RA managing unit 61 receives Msg1 transmitted through the PRACH set on the SCell through the transmitting/receiving unit 43 (S15). Here, it is determined that "Msg0 including no dedicated preamble ID is transmitted" when Msg0 including the preamble ID "000000" is transmitted.

The D-SR managing unit 62 reads the parameter T from the storage unit 53, and receives the D-SR transmitted through the SR PUCCH set on the PCell within the parameter T through the transmitting/receiving unit 43 (S16). Then, the RA managing unit 61 specifies the mobile station that has transmitted the D-SR as the mobile station that has transmitted Msg1 (S17), and the TA managing unit 63 calculates an uplink synchronisation timing correction value corresponding to the specified mobile station (S18).

Then, the RA managing unit 61 transmits Msg2 over the SCell through the transmitting/receiving unit 43 (S19).

Thereafter, the transmission/reception control unit 64 transmits DL data over the SCell through the transmitting/receiving unit 43 (S20), and receives the response acknowledgment (ACK/NACK) over the SCell as the response (S21).

In the above description (S1 and S11) using the flowcharts, the parameter T is transmitted and received through the "RRC Connection Reconfiguration," but the present invention is not limited to this example. For example, the parameter T may be transmitted and received using the "MAC Control Element."

In the above description (S7 and S19) using the flowcharts, Msg2 is transmitted and received, but the present invention is not limited to this example. For example, the TA command may be transmitted and received instead of Msg2. In this case, in S7, "the TA managing unit 33 receives the TA command over the SCell through the transmitting/receiving unit 11." In S8, "the transmission/reception control unit 34 adjusts the uplink synchronisation timing based on the TA command received by the TA managing unit 33." In S19, "the TA managing unit 63 transmits the TA command over the SCell through the transmitting/receiving unit 43."

As described above, in the present embodiment, the mobile station that has received Msg0 transmits Msg1 using the PRACH set on the SCell. Further, the mobile station transmits the D-SR using the SR PUCCH set on the PCell near the PRACH through which Msg1 has been transmitted. Then, the base station uniquely specifies (identifies) the mobile station that has received Msg1 based on the received D-SR. Thus, since Msg3 and Msg4 used to identify the mobile station need not be transmitted and received, the mobile station can reduce a processing time until DL data is received after Msg0 is received. Further, the base station can reduce a processing time until DL data is transmitted after Msg0 is transmitted. In other words, high-speed communication can be implemented in the whole system.

Figure 17:
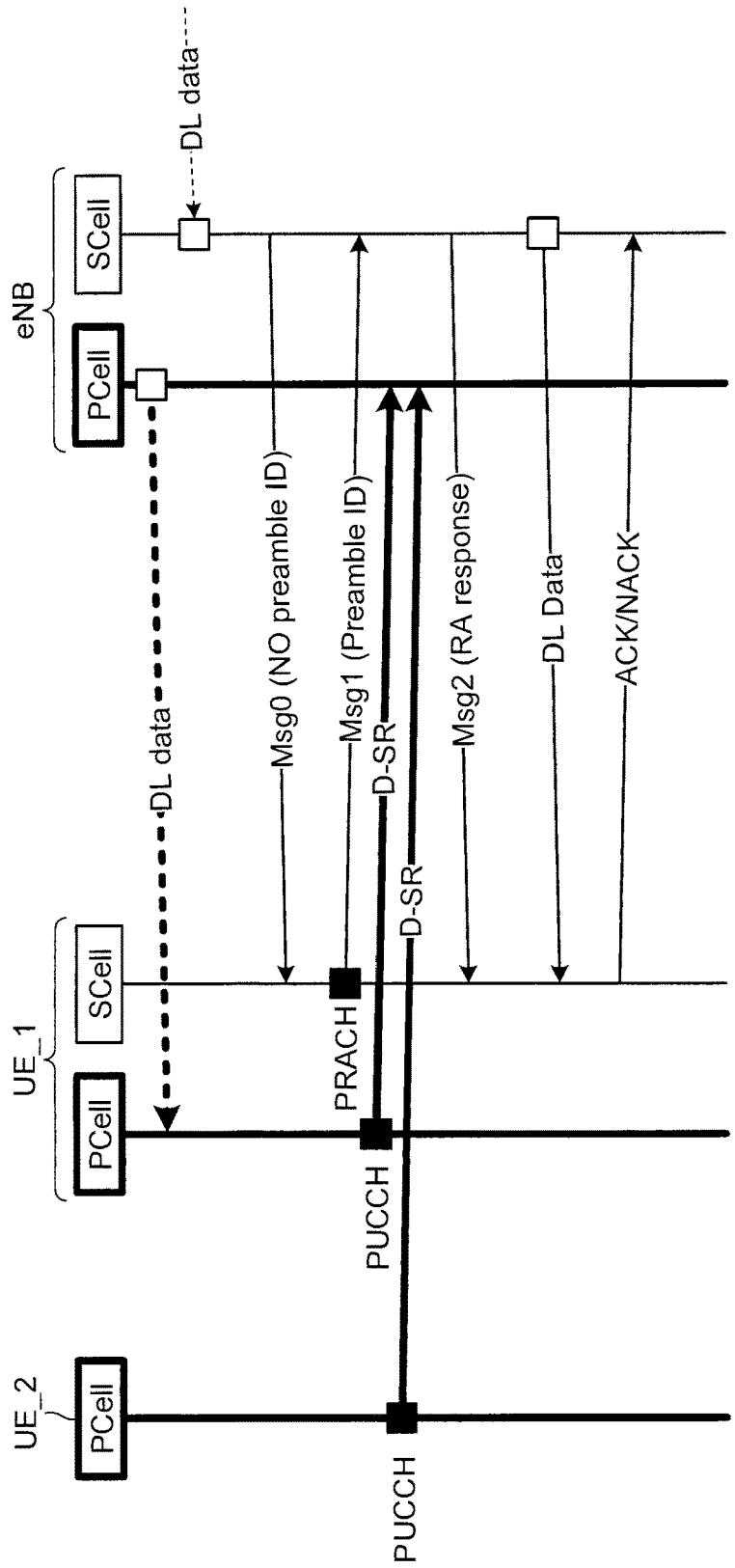
FIG. 17 is a diagram illustrating an example in which a plurality of D-SRs are received.

The present embodiment has been described in connection with the example in which the mobile station that has received Msg0 transmits the D-SR. However, since the SR PUCCH can be assigned to a plurality of mobile stations as a dedicated resource, the base station may receive the D-SR from a plurality of mobile stations through the subframe on the same PCell near the PRACH through which Msg1 has been transmitted. FIG. 17 is a diagram illustrating an example in which a plurality of D-SRs are received. In this case, the base station processes Msg1 and the plurality of D-SRs to identify a desired mobile station. However, since the D-SR is a dedicated resource of each mobile station and assigned when the base station sets communication (specifically, assigned by the "RRC Connection Reconfiguration"), the base station can identify a desired mobile station from among the plurality of received D-SRs.

Figure 18:
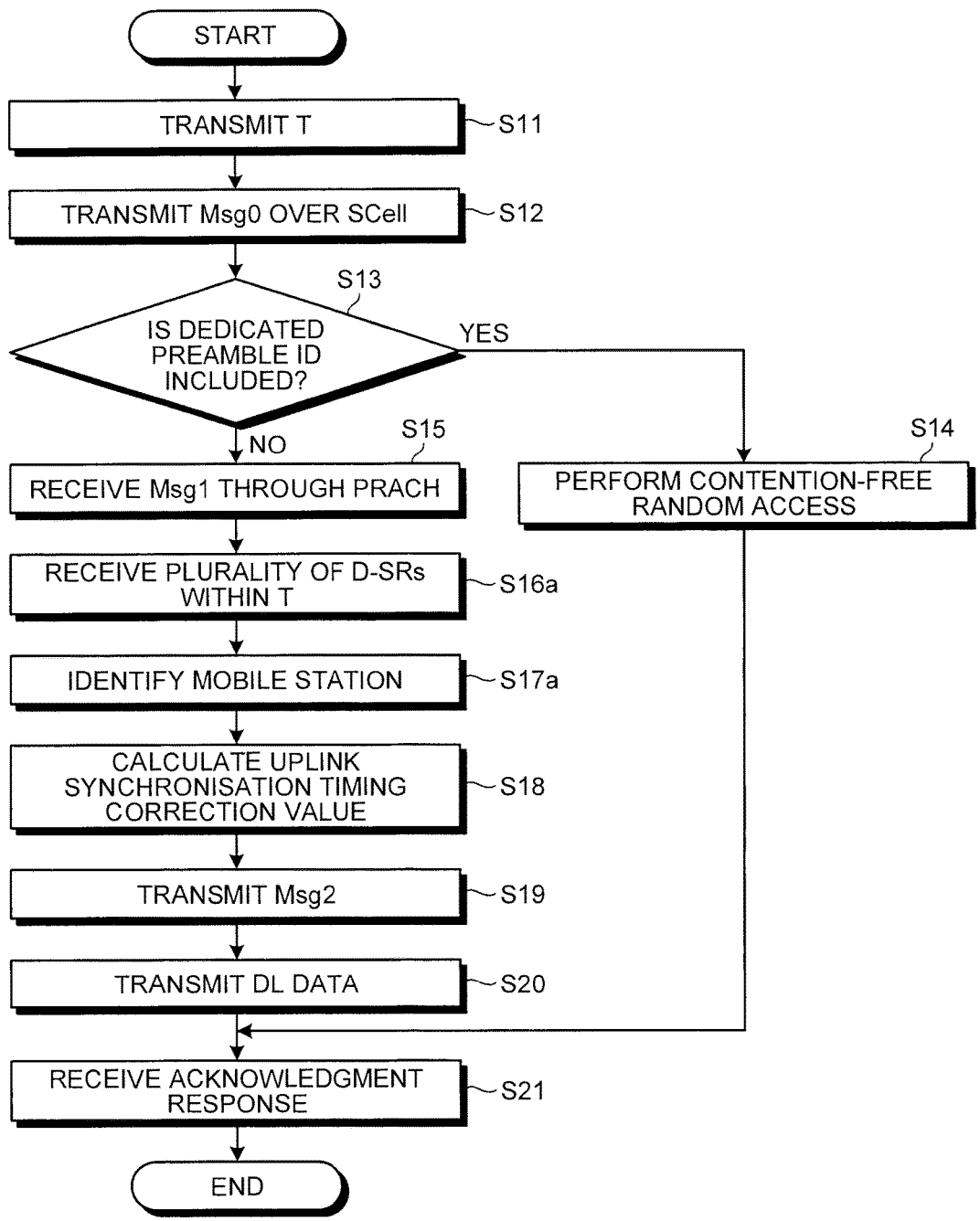
FIG. 18 is a flowchart illustrating an operation of a base station (transmitting device) when a plurality of D-SRs are received.

FIG. 18 is a flowchart illustrating an operation of the base station (transmitting device) when a plurality of D-SRs are received. For example, the D-SR managing unit 62 of the base station receives a plurality of D-SRs transmitted through the SR PUCCH set on the PCell through the transmitting/receiving unit 43 within the parameter T (S16a). Then, the D-SR managing unit 62 identifies a desired mobile station from among a plurality of mobile stations that have transmitted the D-SRs (S17a). The same process as in FIG. 16 is represented by the same step (S) number, and a description thereof will not be repeated.

Second Embodiment

A wireless communication method according to a second embodiment will be described. In the second embodiment, for example, activation/de-activation is introduced on execution of the wireless communication method illustrated in FIG. 9 (an example of "the wireless communication method of associating Msg1 with the D-SR"). The configurations of the mobile station and the base station are the same as in the first embodiment. A process different from that in the first embodiment will be described below.

In the first embodiment, signaling (dedicated signaling (T)) for notifying of the parameter T is used as a trigger for activating the wireless communication method illustrated in FIG. 9 (see FIG. 11). In other words, the mobile station performs S5 to S10 (the process of associating Msg1 with the D-SR) as necessary when the parameter T is received (S1 of FIG. 15).

In the second embodiment, notification of the parameter T (S1 and S11 of FIG. 15) is separated from notification for executing the wireless communication method illustrated in FIG. 9 (an example of "the wireless communication method of associating Msg1 with the D-SR").

Specifically, in order to activate the wireless communication method illustrated in FIG. 9, the base station masks Msg0 by a dedicated address other than C-RNTI, and then transmits Msg0. However, in order to de-activate the wireless communication method illustrated in FIG. 9, the base station masks Msg0 by an address (C-RNTI) of the mobile station, and then transmits Msg0. In other words, when the mobile station receives Msg0 masked by the dedicated address, the mobile station regards Msg0 as a trigger of activation and transmits Msg1 and the D-SR as necessary. On the other hand, when the mobile station receives Msg0 masked by C-RNTI, the mobile station is de-activated, and performs the contention-based random access (Msg1 to Msg4) illustrated in FIG. 8, for example. Preferably, the dedicated address has 16 bits, similarly to C-RNTI.

Next, the wireless communication method according to the second embodiment will be described with reference to flowcharts of respective devices. The process (S1 and S11 in the first embodiment) related to notification of the parameter T is performed separately from the following process of FIGS. 19 and 20, and the parameter T is assumed to be stored in each storage unit in advance.

Figure 19:
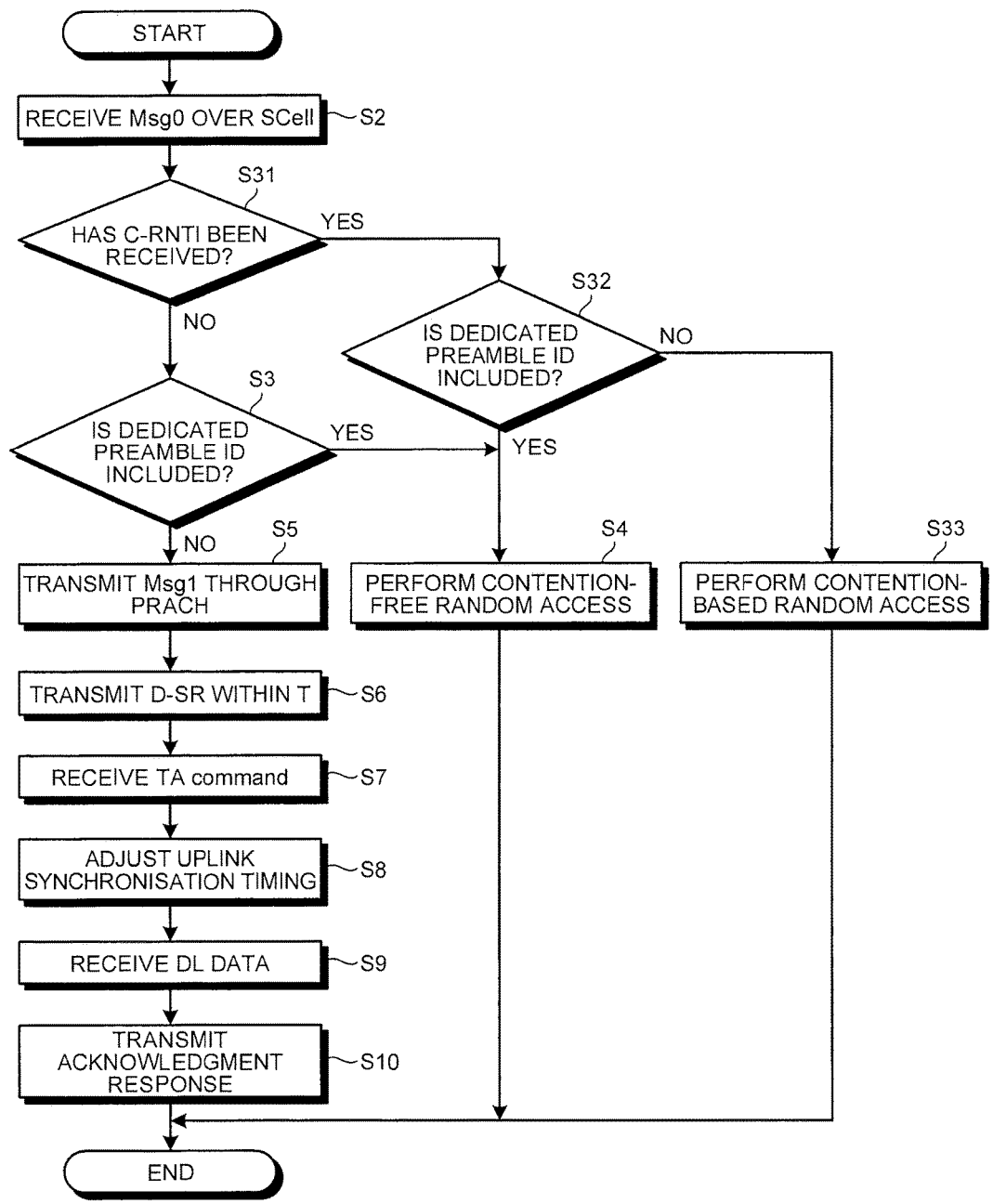
FIG. 19 is a flowchart illustrating an operation of a mobile station (receiving device) according to a second embodiment.

FIG. 19 is a flowchart illustrating an operation of the mobile station (receiving device) that receives DL data according to the second embodiment. The same process as in the first embodiment is denoted by the same step (S) number, and a description thereof will not be repeated. Here, a process different from that in the first embodiment will be described.

Referring to FIG. 19, the RA managing unit 31 of the mobile station that has received Msg0 checks whether or not Msg0 remains masked by C-RNTI, that is, whether or not C-RNTI has been received (S31). For example, when the dedicated address has been received (No in S31), the mobile station performs S3 and S5 to S10 through the same process as in the first embodiment.

However, when C-RNTI has been received (Yes in S31), the RA managing unit 31 of the mobile station determines whether or not a dedicated preamble ID is included in Msg0 (S32). Then, when it is determined that the dedicated preamble ID is included (Yes in S32), the contention-free random access is performed (S4), whereas when it is determined that the dedicated preamble ID is not included (No in S32), the contention-based random access is performed (S33).

Figure 20:
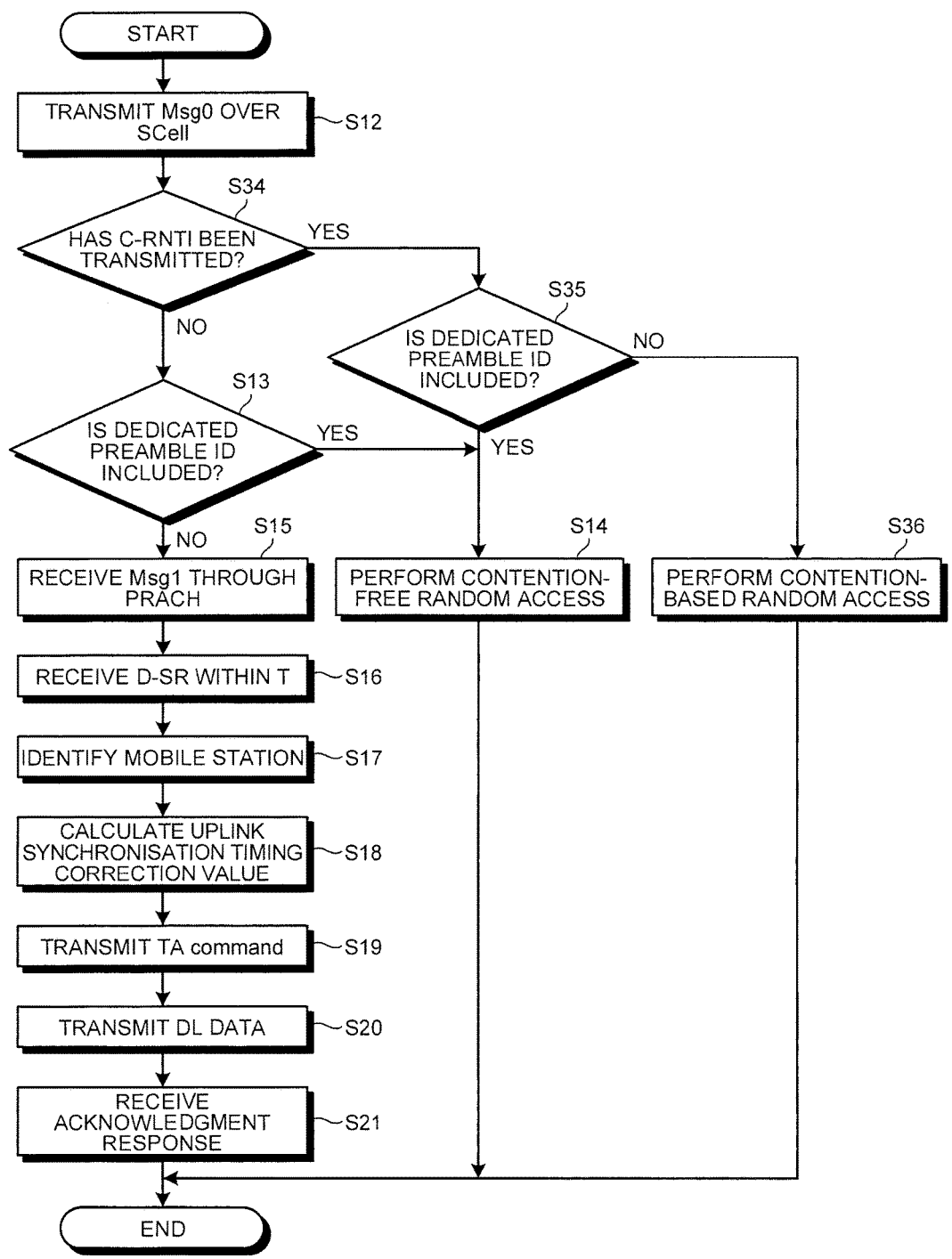
FIG. 20 is a flowchart illustrating an operation of a base station (transmitting device) according to the second embodiment.

FIG. 20 is a flowchart illustrating an operation of the base station (transmitting device) that transmits DL data according to the second embodiment. The same process as in the first embodiment is denoted by the same step (S) number, and a description thereof will not be repeated. Here, a process different from that in the first embodiment will be described.

Referring to FIG. 20, the RA managing unit 61 of the base station that has transmitted Msg0 checks whether or not Msg0 remains masked by C-RNTI, that is, whether or not C-RNTI has been transmitted (S34). For example, when the dedicated address has been transmitted (No in S34), the base station performs S13 and S15 to S21 or S13 and S14 through the same process as in the first embodiment.

However, when C-RNTI has been transmitted (Yes in S34), the RA managing unit 61 of the base station checks whether or not a dedicated preamble ID is included in Msg0 (S35). Then, when it is determined that the dedicated preamble ID is included (Yes in S35), the contention-free random access is performed (S14), whereas when it is determined that the dedicated preamble ID is not included (No in S35), the contention-based random access is performed (S36).

As described above, in the present embodiment, the dedicated address is introduced as a trigger for activating the wireless communication method illustrated in FIG. 9 (an example of "the wireless communication method of associating Msg1 with the D-SR"). In other words, in the present embodiment, Msg1 and the D-SR are transmitted similarly to the first embodiment according to the presence or absence of the dedicated address. As a result, since Msg3 and Msg4 used to identify the mobile station need not be transmitted or received similarly to the first embodiment, the mobile station can reduce a processing time until DL data is received after Msg0 is received. Further, the base station can reduce a processing time until DL data is transmitted after Msg0 is transmitted. In other words, high-speed communication can be implemented in the whole system.

Third Embodiment

A wireless communication method according to a third embodiment will be described. In the third embodiment, in the wireless communication system for implementing the wireless communication method according to the first embodiment or the second embodiment, a case in which the base station detects a plurality of Msg1 in the same subframe is considered. The configurations of the mobile station and the base station are the same as in the first embodiment. A process different from that in the first embodiment will be described.

For example, when the base station detects a plurality of Msg1s through the same subframe in the process of S15 while the wireless communication method according to the first embodiment or the second embodiment is being performed, it is difficult for the base station to identify a mobile station that has transmitted Msg1. For this reason, even when the base station makes an attempt to identify the mobile station using the D-SR together, it is difficult to associate the D-SR with Msg1.

Figure 21:
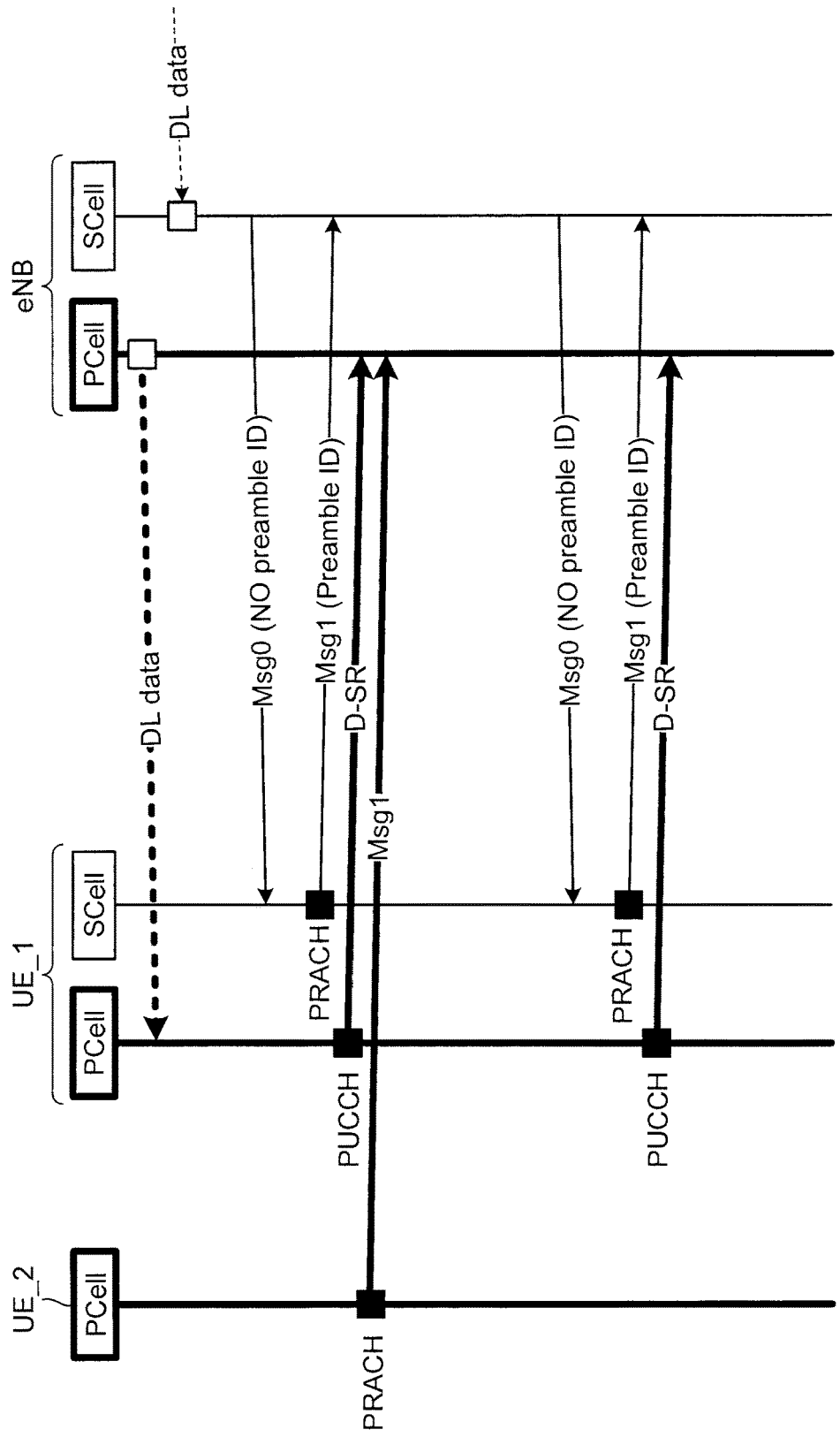
FIG. 21 is a diagram illustrating an example of a wireless communication method according to a third embodiment.

In this regard, in the present embodiment, the base station transmits Msg0 to a desired mobile station again, for example, as illustrated in FIG. 21. In other words, the base station repeatedly transmits Msg0 until the D-SR is associated with Msg1. FIG. 21 is a diagram illustrating an example of the wireless communication method according to the third embodiment (a first wireless communication method according to the third embodiment). Here, two mobile stations, that is, UE_1 and UE_2 transmit Msg1, the base station that has received two Msg1s receives Msg0 again, and UE_1 is identified by associating UE_1 based on the received Msg1 and the D-SR.

Figure 22:
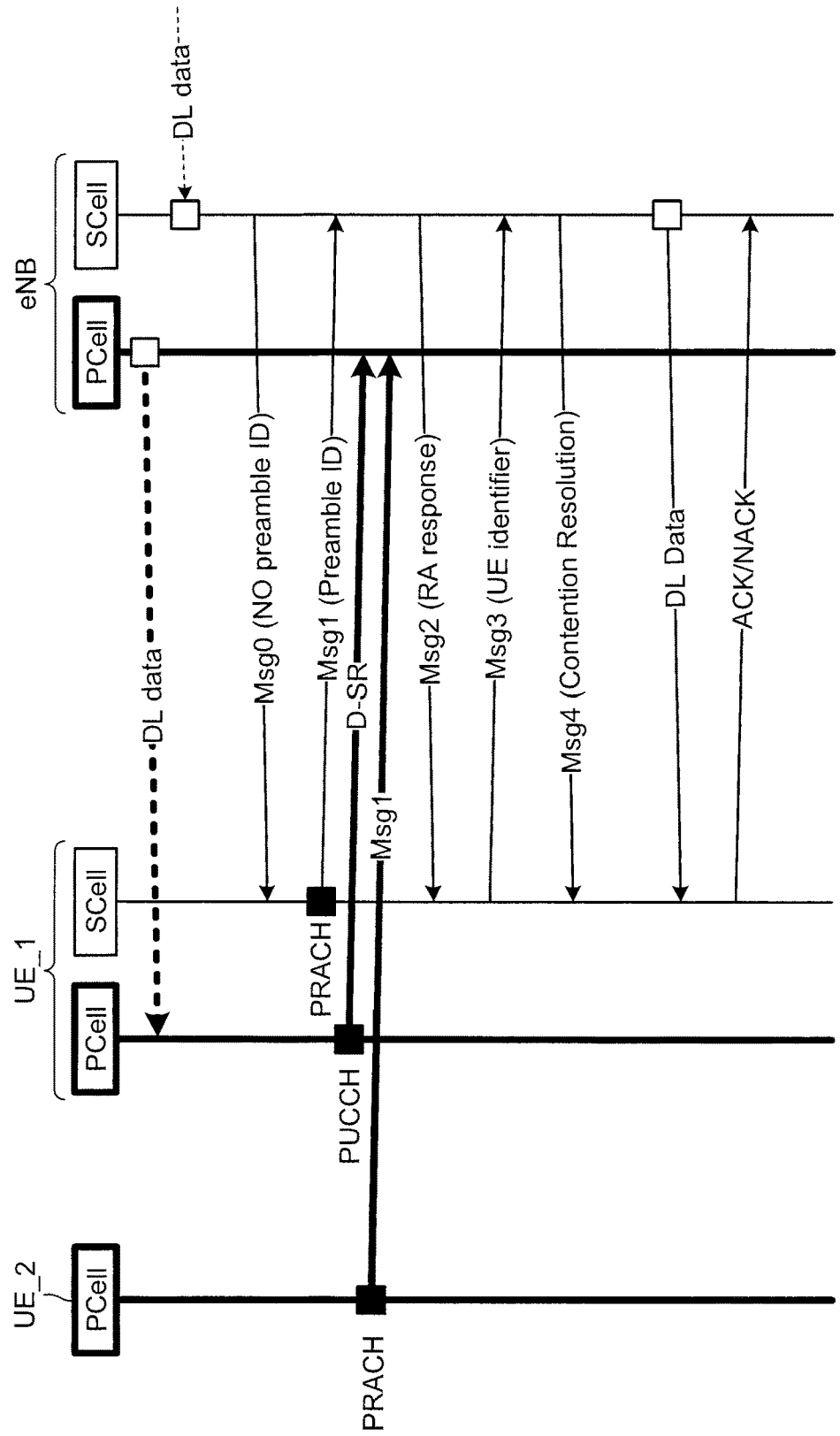
FIG. 22 is a diagram illustrating an example of the wireless communication method according to the third embodiment.

Further, in the present embodiment, UE_1 can be identified by a method different as that in FIG. 21. For example, the base station triggers a desired mobile station to perform the contention-based random access. In other words, when a plurality of Msg1s are detected in the same subframe, the base station transmits Msg2 over the SCell. FIG. 22 is a diagram illustrating an example of the wireless communication method according to the third embodiment (the second wireless communication method according to the third embodiment) different from that in FIG. 21.

When the contention-based random access is performed, the mobile station has to determine whether or not the base station has properly associated Msg1 with the D-SR. It is because when Msg2 is received, the mobile station has to determine whether it is to subsequently transmit Msg3 or it is to be on standby for arrival of DL data without transmitting Msg3.

Figure 23:
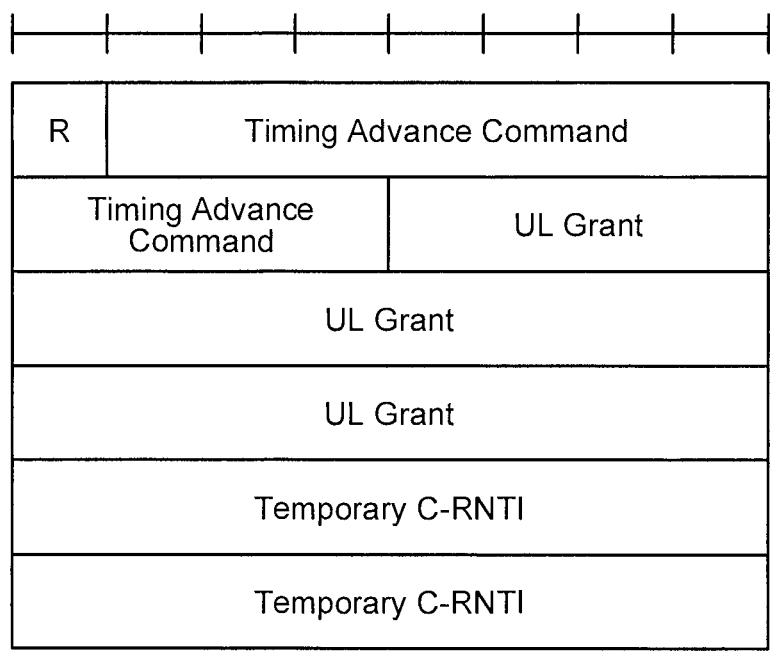
FIG. 23 is a diagram illustrating an example of a PDU.

For this reason, in the present embodiment, one of the following two methods is performed. A first method is a method using a reserve bit included in Msg2. FIG. 23 is a diagram illustrating an example of the MAC RAR PDU which is a control command of the MAC layer in which Msg2 is transmitted. For example, when a reserve bit (an R bit) of the PDU is 0, the contention-based random access is performed. In other words, the mobile station transmits Msg3. However, when the R bit is 1, the mobile station does not transmit Msg3. In other words, it is determined that the base station has properly associated Msg1 with the D-SR. In the first method, 0 and 1 may be reversed to each other.

In a second method, when Msg1 has not properly been associated with the D-SR, the base station transmits typical Msg2. However, when Msg1 has been properly associated with D-SR, the base station transmits the TA command. Through this method, when Msg2 is received, the mobile station determines that Msg1 has not been properly associated with the D-SR, and transmits Msg3. Meanwhile, when the TA command is received, it is determined that Msg1 has been properly associated with the D-SR.

Through this method, the mobile station can easily determine whether or not Msg3 is to be transmitted.

Next, the wireless communication method according to the third embodiment will be described with reference to flowcharts of respective devices. The same process as in the first embodiment is denoted by the same step (S) number, and a description thereof will not be repeated. Here, a process different from that in the first embodiment will be described.

Figure 24:
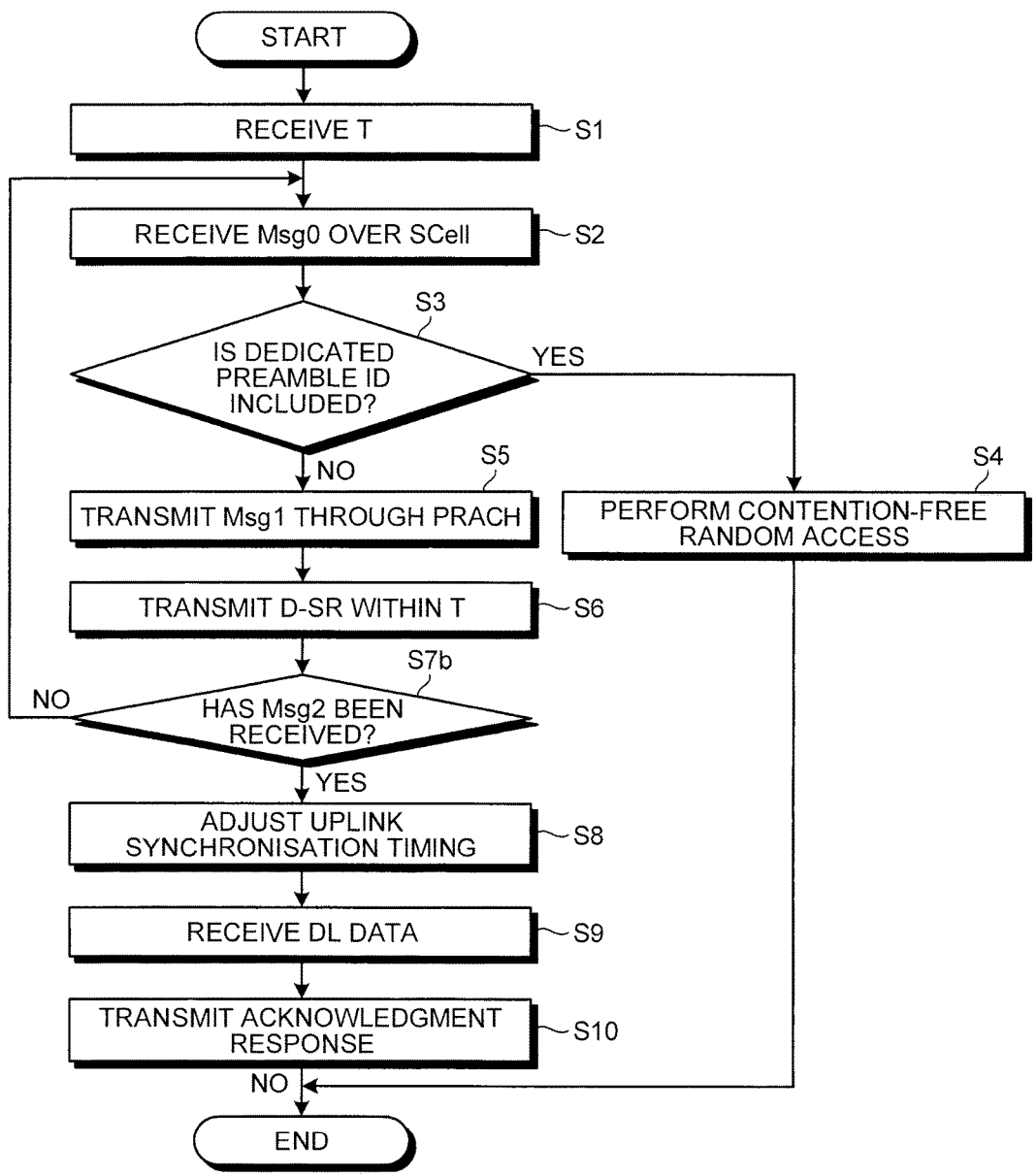
FIG. 24 is a flowchart illustrating an operation of a mobile station (receiving device) in a first wireless communication method according to the third embodiment.

FIG. 24 is a flowchart illustrating an operation of the mobile station (receiving device) in the first wireless communication method according to the third embodiment. Referring to FIG. 24, in the mobile station, the D-SR managing unit 32 transmits the D-SR within the parameter T (S6), and then the RA managing unit 31 is on standby for reception of Msg2 from the base station (S7b). Then, when the RA managing unit 31 receives Msg2 over the SCell through the transmitting/receiving unit 11 (Yes in S7b), the TA managing unit 33 adjusts an uplink synchronisation timing based on Msg2 received by the RA managing unit 31 (S8). Meanwhile, when Msg2 is not received (No in S7b), the RA managing unit 31 receives Msg0 again through the transmitting/receiving unit 11 (S2).

Figure 25:
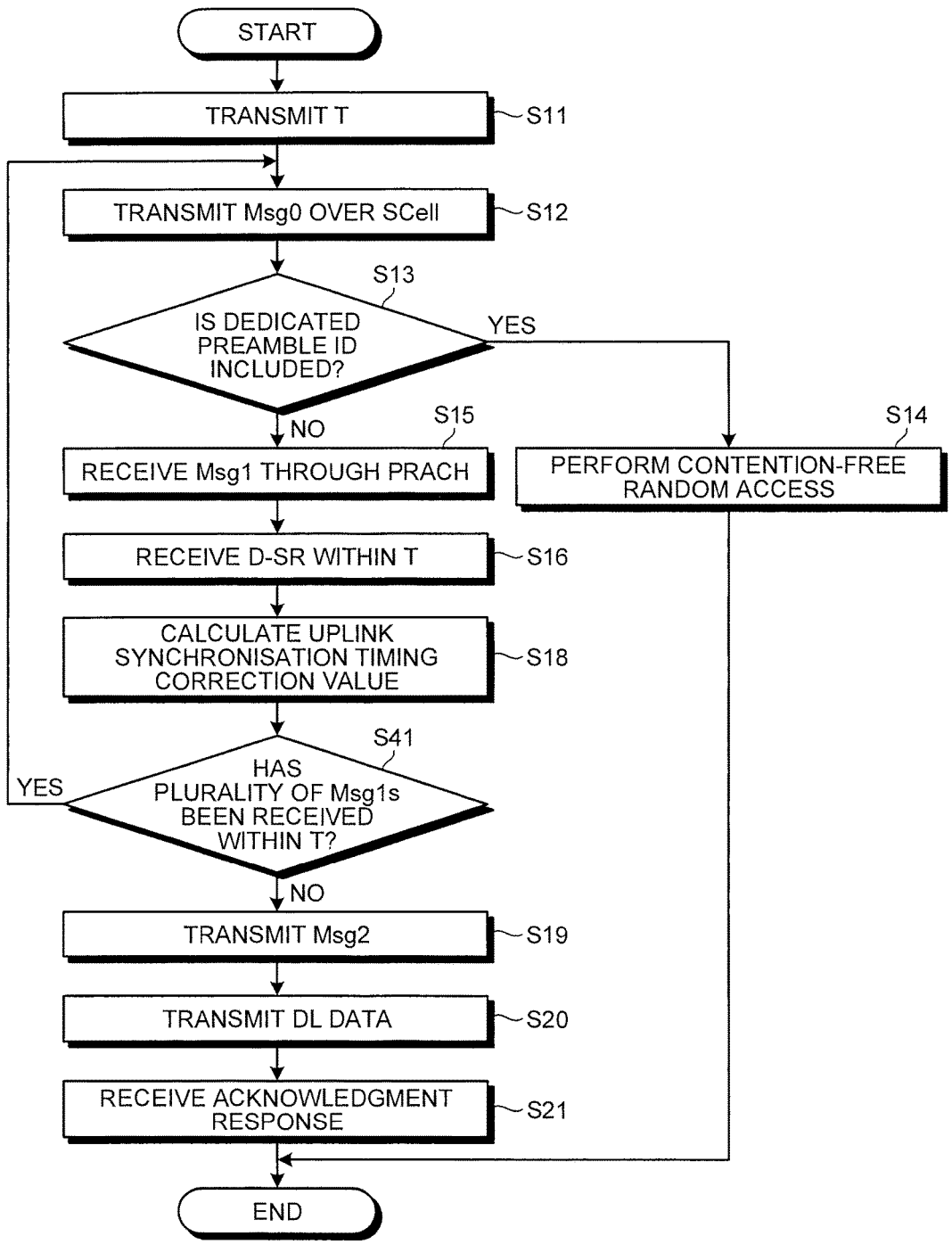
FIG. 25 is a flowchart illustrating an operation of a base station (transmitting device) in the first wireless communication method according to the third embodiment.

FIG. 25 is a flowchart illustrating an operation of the base station (transmitting device) in the first wireless communication method according to the third embodiment. Referring to FIG. 25, in the base station, the D-SR managing unit 62 reads the parameter T from the storage unit 53, and receives the D-SR transmitted through the SR PUCCH set on the PCell through the transmitting/receiving unit 43 within the parameter T (S16). Then, the TA managing unit 63 calculates the uplink synchronisation timing correction value (S18), and the RA managing unit 61 checks whether or not a plurality of Msg1s have been received within the parameter T (S41). For example, when only one Msg1 has been received within the parameter T (No in S41), the RA managing unit 61 transmits Msg2 over the SCell through the transmitting/receiving unit 43 (S19). Meanwhile, when a plurality of Msg1s have been received within the parameter T (Yes in S41), the RA managing unit 61 transmits Msg0 over the SCell again through the transmitting/receiving unit 43 (S12).

Figure 26:
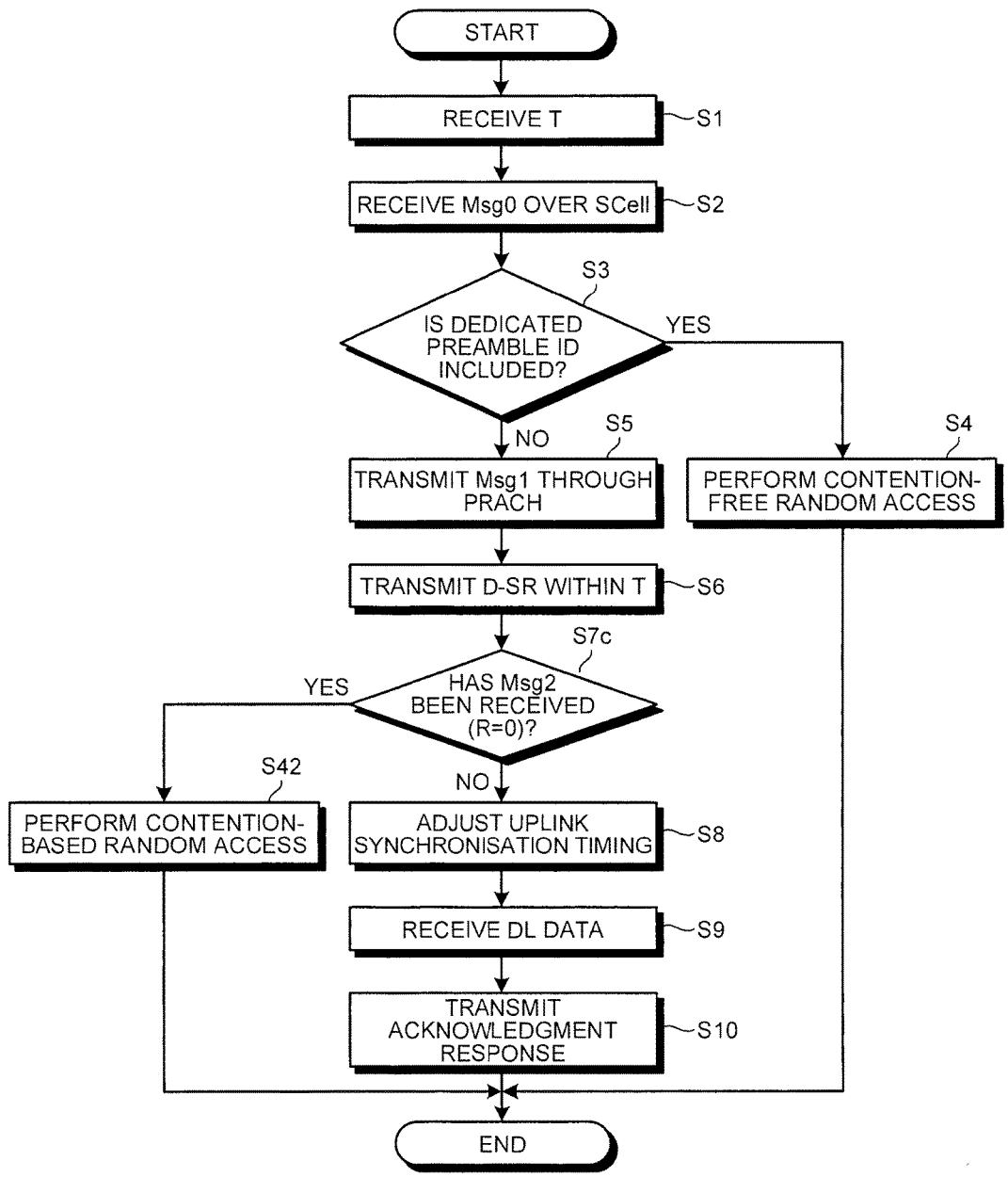
FIG. 26 is a flowchart illustrating an operation of a mobile station (receiving device) in a second wireless communication method (R-bit determination) according to the third embodiment.

FIG. 26 is a flowchart illustrating an operation of the mobile station (receiving device) in the second wireless communication method (R bit determination) according to the third embodiment. Referring to FIG. 26, in the mobile station, the D-SR managing unit 32 transmits the D-SR within the parameter T (S6), and the RA managing unit 31 is on standby for reception of Msg2 from the base station (S7c). Then, when it is determined that the RA managing unit 31 has received Msg2 over the SCell through the transmitting/receiving unit 11 and the R bit is 1 (No in S7c), the TA managing unit 33 adjusts an uplink synchronisation timing based on Msg2 received by the RA managing unit 31 (S8). However, when it is determined that the RA managing unit 31 has received Msg2 over the SCell through the transmitting/receiving unit 11 and the R bit is 0 (Yes in S7c), the RA managing unit 31 performs the contention-based random access (S42).

Figure 27:
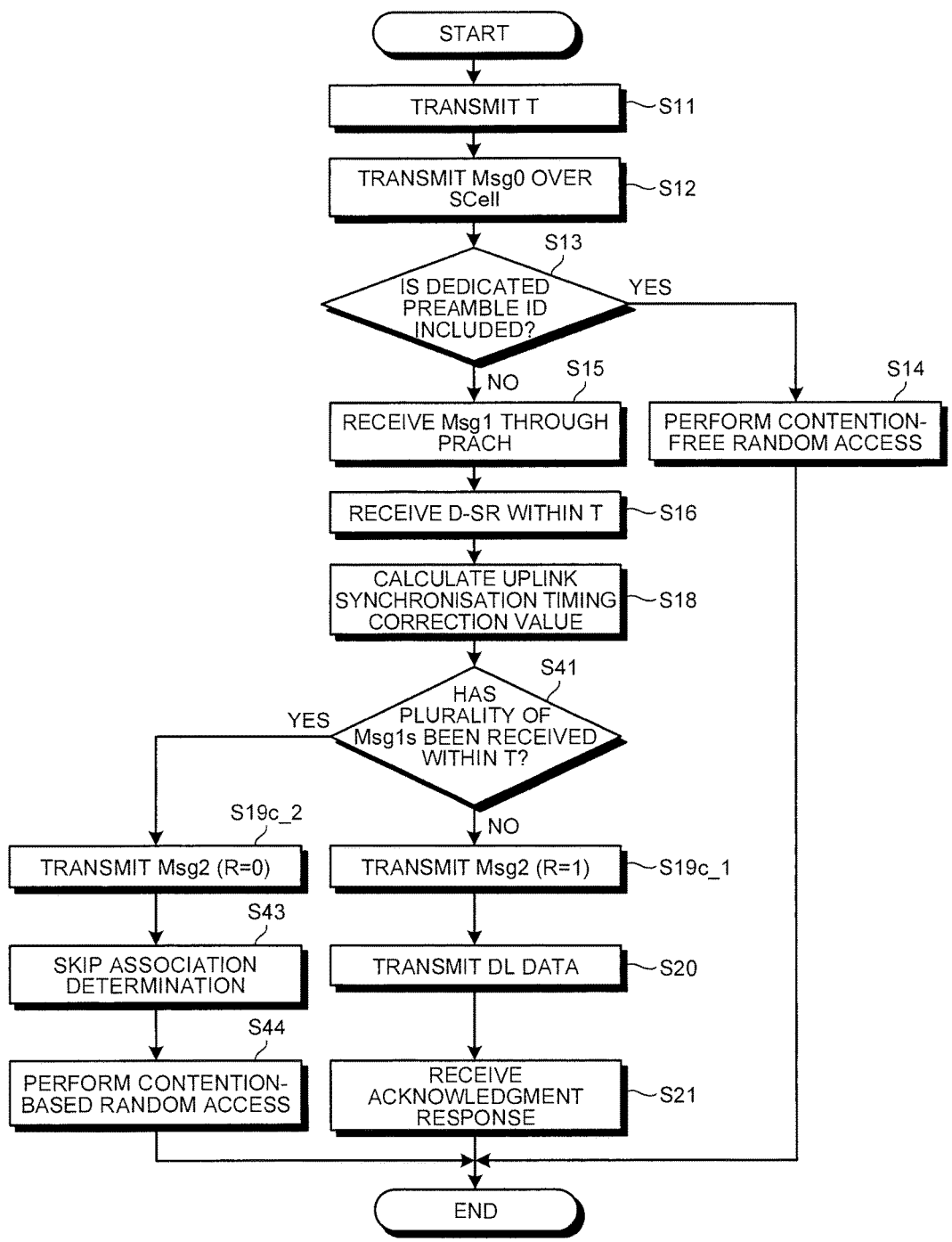
FIG. 27 is a flowchart illustrating an operation of a base station (transmitting device) in the second wireless communication method (R-bit determination) according to the third embodiment.

FIG. 27 is a flowchart illustrating an operation of the base station (transmitting device) in the second wireless communication method (R bit determination) according to the third embodiment. Referring to FIG. 27, in the base station, the D-SR managing unit 62 reads the parameter T from the storage unit 53, and receives the D-SR transmitted through the SR PUCCH set on the PCell through the transmitting/receiving unit 43 within the parameter T (S16). Then, the TA managing unit 63 calculates the uplink synchronisation timing correction value (S18), and then the RA managing unit 61 checks whether or not a plurality of Msg1s have been received within the parameter T (S41). For example, when it is determined that only one Msg1 has been received within the parameter T (No in S41), the RA managing unit 61 transmits Msg2 in which the R bit of the PDU is set to 1 over the SCell through the transmitting/receiving unit 43 (S19c_1). However, when it is determined that a plurality of Msg1s have been received within the parameter T (Yes in S41), the RA managing unit 61 transmits Msg2 in which the R bit of the PDU is set to 0 over the SCell through the transmitting/receiving unit 43 (S19c_2). Then, the RA managing unit 61 does not perform an operation of associating Msg1 with the D-SR (S43), and performs the contention-based random access (S44).

Figure 28:
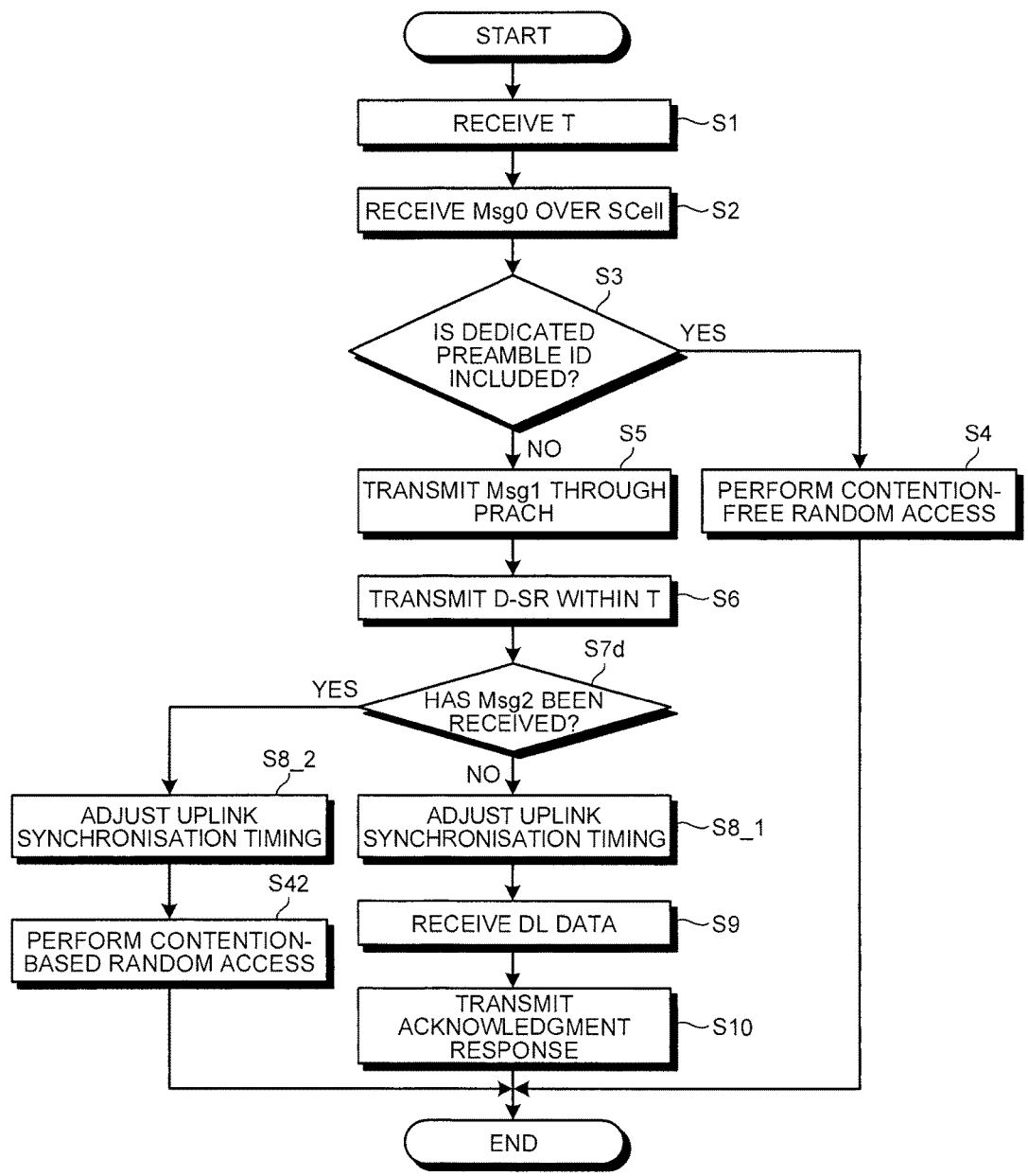
FIG. 28 is a flowchart illustrating an operation of a mobile station (receiving device) in the second wireless communication method (TA command determination) according to the third embodiment.

FIG. 28 is a flowchart illustrating an operation of the mobile station (receiving device) in the second wireless communication method (TA command determination) according to the third embodiment. Referring to FIG. 28, in the mobile station, the D-SR managing unit 32 transmits the D-SR within the parameter T (S6), the RA managing unit 31 is on standby for reception of Msg2, and the TA managing unit 33 is on standby for reception of the TA command (S7d). Then, when the TA command is received over the SCell through the transmitting/receiving unit 11 (No in S7d), the TA managing unit 33 adjust an uplink synchronisation timing based on the TA command (S8_1). Meanwhile, when the RA managing unit 31 receives Msg2 over the SCell through the transmitting/receiving unit 11 (Yes in S7d), the TA managing unit 33 adjusts an uplink synchronisation timing based on Msg2 received by the RA managing unit 31 (S8_2). Then, the RA managing unit 31 performs the contention-based random access (S42).

Figure 29:
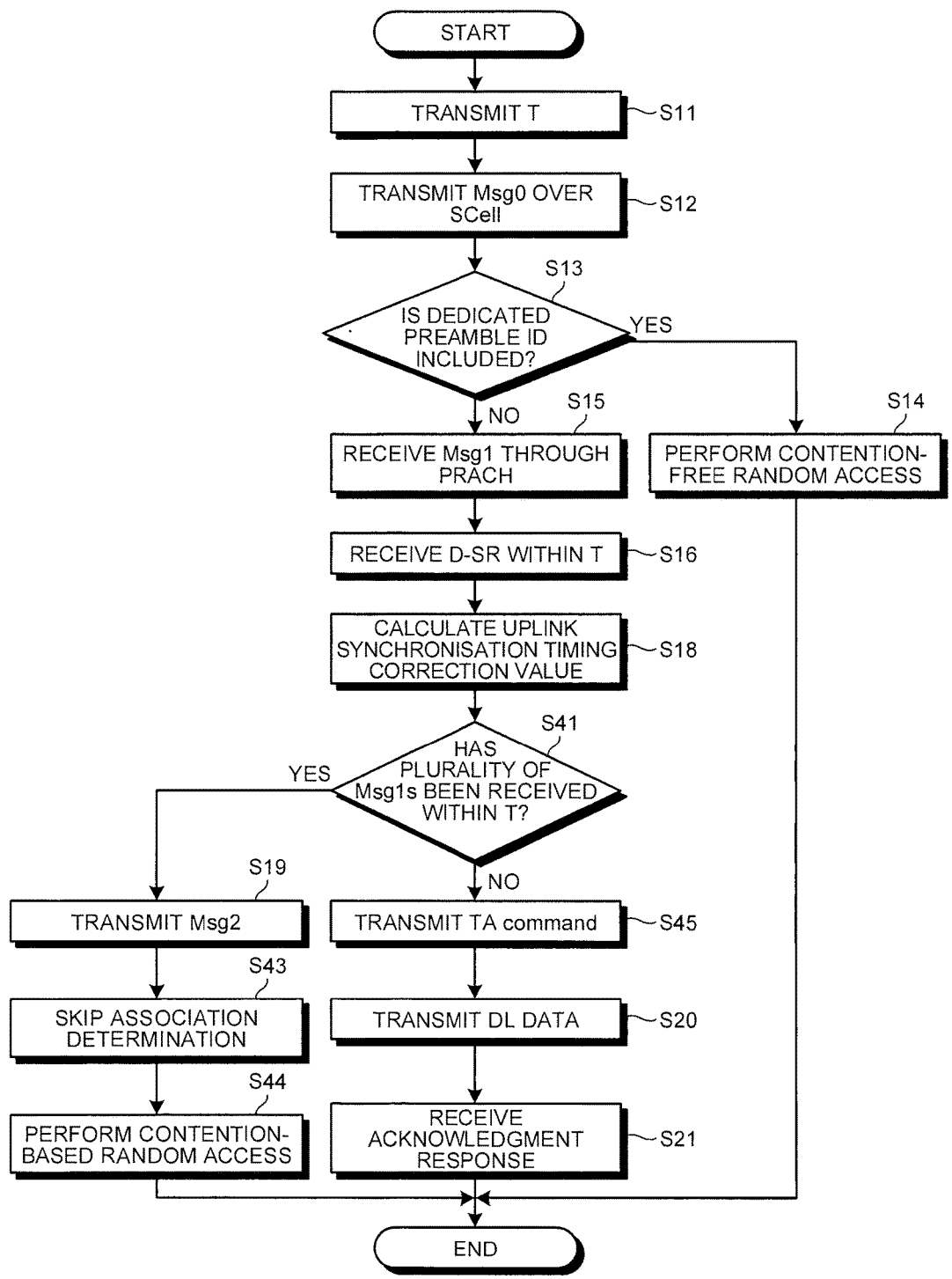
FIG. 29 is a flowchart illustrating an operation of a base station (transmitting device) in the second wireless communication method (TA command determination) according to the third embodiment.

FIG. 29 is a flowchart illustrating an operation of the base station (transmitting device) in the second wireless communication method (TA command determination) according to the third embodiment. Referring to FIG. 29, in the base station, the D-SR managing unit 62 reads the parameter T from the storage unit 53, and receives the D-SR transmitted through the SR PUCCH set on the PCell through the transmitting/receiving unit 43 within the parameter T (S16). Then, the TA managing unit 63 calculates the uplink synchronisation timing correction value (S18), and then the RA managing unit 61 checks whether or not a plurality of Msg1s have been received within the parameter T (S41). For example, when it is determined that only one Msg1 has been received within the parameter T (No in S41), the TA managing unit 63 transmits the TA command over the SCell through the transmitting/receiving unit 43 (S45). However, when it is determined that a plurality of Msg1s have been received within the parameter T (Yes in S41), the RA managing unit 61 transmits Msg2 over the SCell through the transmitting/receiving unit 43 (S19). Then, the RA managing unit 61 does not perform an operation of associating Msg1 with the D-SR (S43), and performs the contention-based random access (S44).

As described above, in the present embodiment, any one of the above-described wireless communication methods is performed. Thus, the base station can prevent a phenomenon that Msg1 is erroneously associated with the D-SR and the mobile station is notified of an erroneous uplink synchronisation timing.

Fourth Embodiment

A wireless communication method according to a fourth embodiment will be described. In the fourth embodiment, a case in which it fails to transmit and receive the D-SR and it is difficult for the base station to detect Msg1, that is, it is difficult for the base station to associate Msg1 with the D-SR is considered. The configurations of the mobile station and the base station are the same as in the first embodiment. The following description will proceed with a process different from that in the first embodiment.

Figure 30:
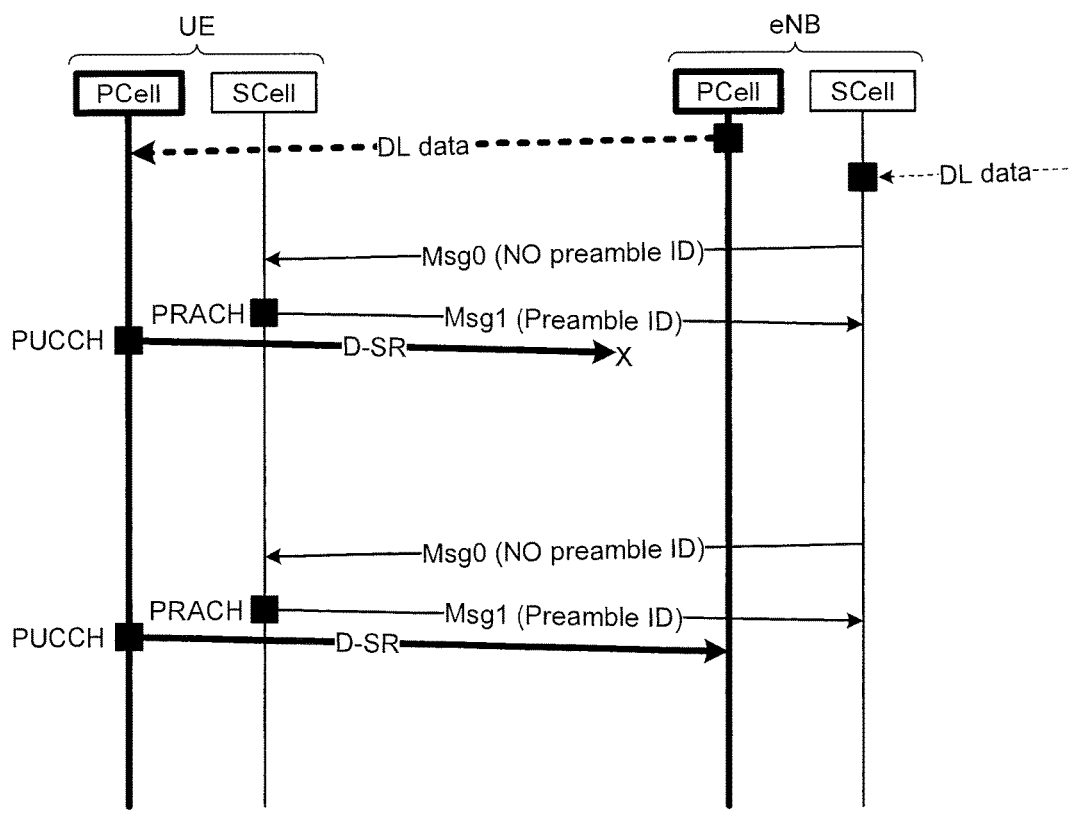
FIG. 30 is a diagram illustrating an example of a wireless communication method according to a fourth embodiment.

FIG. 30 is a diagram illustrating an example of the wireless communication method according to the fourth embodiment. For example, when it fails to transmit and receive the D-SR as illustrated in FIG. 30, it is difficult for the base station to associate Msg1 with the D-SR. In this regard, when it is determined that it is difficult to receive the D-SR, the base station transmits Msg0 again, and performs an operation of associating Msg1 with the D-SR again.

Figure 31:
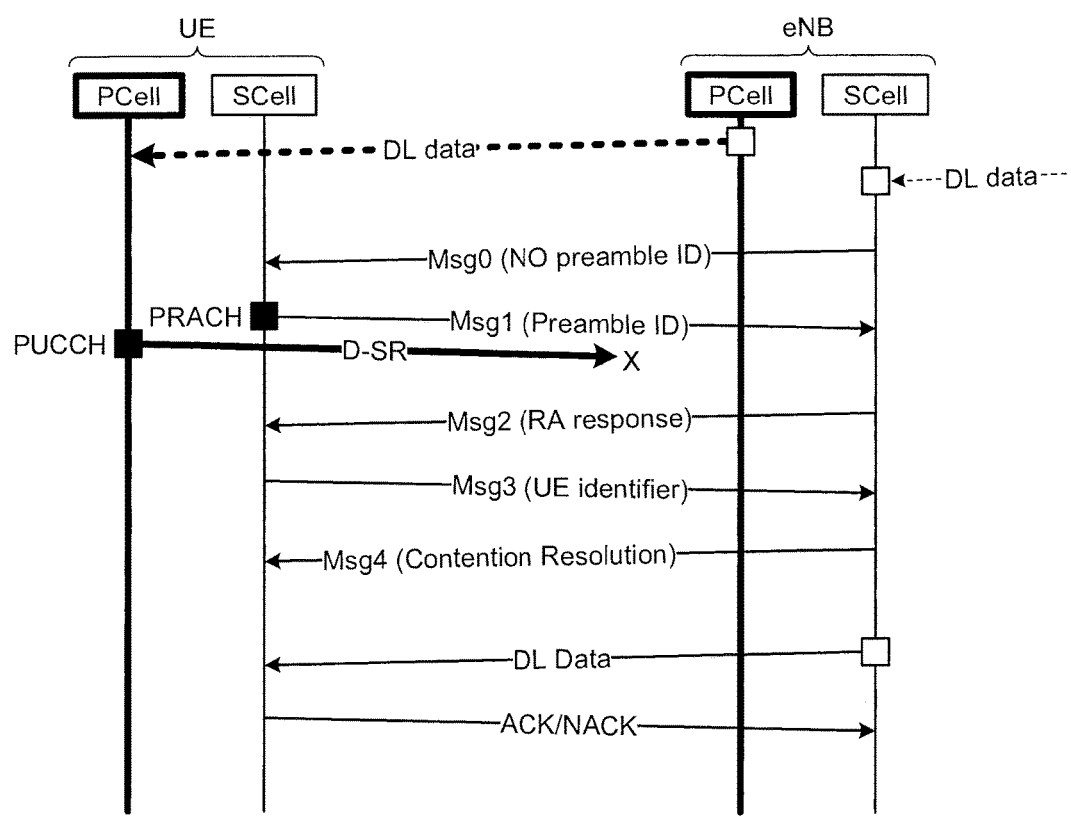
FIG. 31 is a diagram illustrating an example of the wireless communication method according to the fourth embodiment.

Further, in the present embodiment, communication can be continued by a method different from that illustrated in FIG. 30. FIG. 31 is a diagram illustrating an example of the wireless communication method according to the fourth embodiment from that illustrated in FIG. 30. For example, when it fails to transmit and receive the D-SR as illustrated in FIG. 31, since it is difficult to associate Msg1 with the D-SR, the base station switches to the contention-based random access (transmission and reception of Msg2 to Msg4) and continues communication.

In the present embodiment, any of the wireless communication methods illustrated in FIGS. 30 and 31 may be selected, and this determination is made by the scheduling unit 42 of the base station. For example, when an assignment period of the SR PUCCH resource for transmitting the D-SR is short, the D-SR is able to be received due to the retransmission of Msg0 while decreasing the delay, the wireless communication method illustrated in FIG. 30 is selected. However, when an assignment cycle of the SR PUCCH resource is long, since selection of the contention-based random access method can increase a possibility that the D-SR will be quickly received, the wireless communication method illustrated in FIG. 31 is selected.

Further, the wireless communication method may be selected as follows. For example, when it is determined that the D-SR has not been received due to a lack of uplink transmission power and influence of instantaneous uplink interference, since it is likely to receive a next D-SR, the wireless communication method illustrated in FIG. 30 is selected. Meanwhile, when there is a problem in adjustment of uplink transmission power or when it is determined that interference continues, since selection of the contention-based random access method can increase a possibility that the D-SR will be quickly received, the wireless communication method illustrated in FIG. 31 is selected.

Further, when the contention-based random access is performed, the mobile station has to determine whether or not the base station has properly received the D-SR. For this reason, in the present embodiment, one of the following two methods is performed.

A first method is a method using a reserve bit included in Msg2. For example, when a reserve bit (an R bit) of the PDU (see FIG. 23) is 0, the contention-based random access is performed. In other words, the mobile station transmits Msg3. However, when the R bit is 1, the mobile station does not transmit Msg3. In other words, it is determined that the base station has properly received the D-SR. In the first method, 0 and 1 may be reversed to each other.

In a second method, when the D-SR has not properly been received, the base station transmits typical Msg2. However, when the D-SR has been properly received, the base station transmits the TA command. Through this method, when Msg2 is received, the mobile station determines that the D-SR has not been properly received, and transmits Msg3. Meanwhile, when the TA command is received, it is determined that the D-SR has been properly received.

Through this method, the mobile station can easily determine whether or not Msg3 is to be transmitted.

Figure 32:
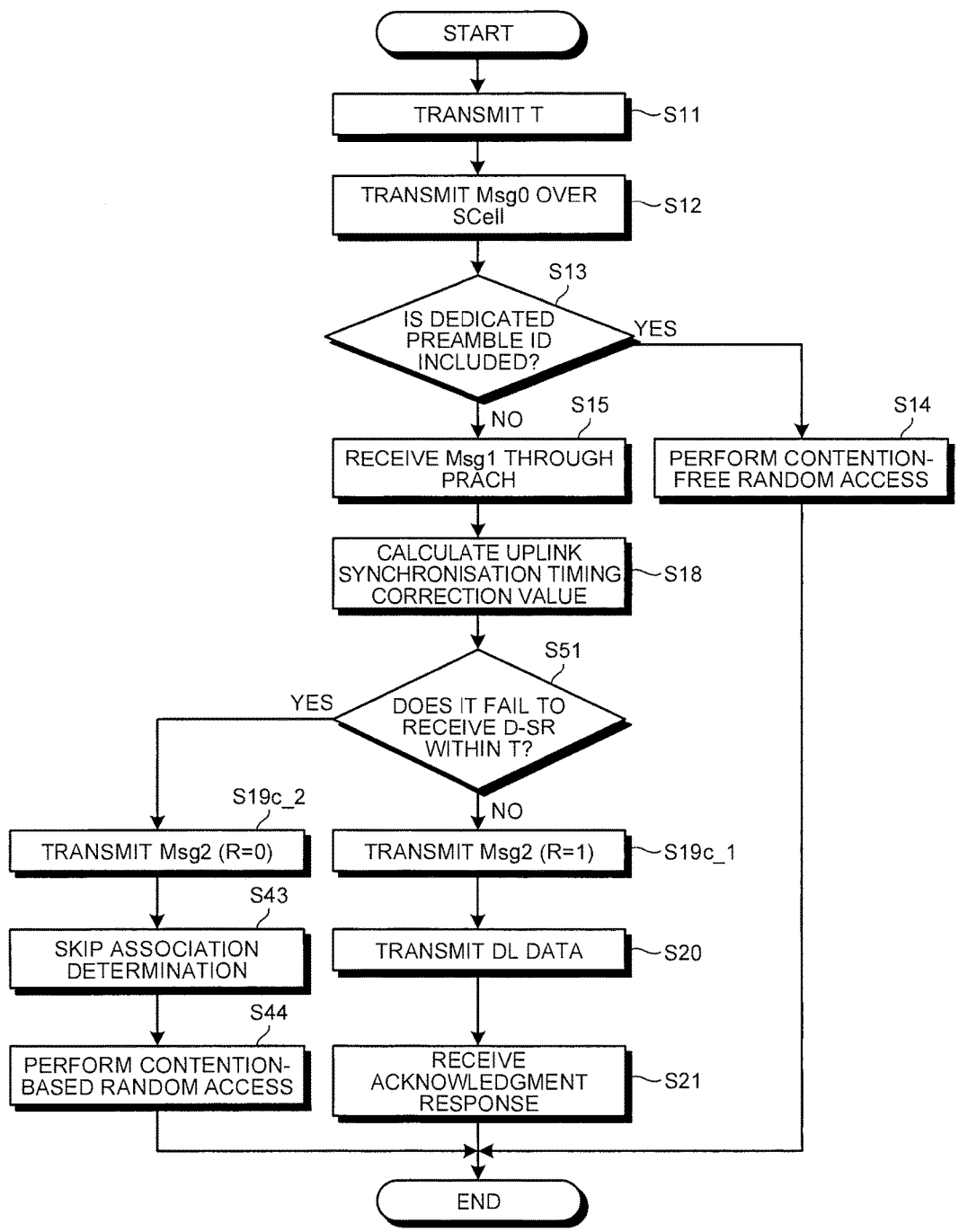
FIG. 32 is a flowchart illustrating an operation of a base station (transmitting device) in the wireless communication method (R bit determination) according to the fourth embodiment.

Next, the wireless communication method according to the fourth embodiment will be described with reference to flowcharts of respective devices. FIG. 32 is a flowchart illustrating an operation of the base station (transmitting device) in the wireless communication method (R bit determination) according to the fourth embodiment. The same process as in the first to third embodiments is denoted by the same step (S) number, and a description thereof will not be repeated. Here, a process different from that in FIG. 27 according to the third embodiment will be described. Further, an operation of the mobile station is the same as the wireless communication method illustrated in FIG. 26.

Referring to FIG. 32, in the base station, the RA managing unit 61 receives Msg1 transmitted through the PRACH set on the SCell through the transmitting/receiving unit 43 (S15). Then, the TA managing unit 63 calculates the uplink synchronisation timing correction value (S18), and then the D-SR managing unit 62 determines whether or not the D-SR has been received within the parameter T (S51). For example, when it is determined that the D-SR has been received within the parameter T (No in S51), the RA managing unit 61 transmits Msg2 in which the R bit of the PDU is set to 1 over the SCell through the transmitting/receiving unit 43 (S19c_1). However, when it is determined that the D-SR has not been received within the parameter T (Yes in S51), the RA managing unit 61 transmits Msg2 in which the R bit of the PDU is set to 0 over the SCell through the transmitting/receiving unit 43 (S19c_2). Then, the RA managing unit 61 does not perform an operation of associating Msg1 with the D-SR (S43), and performs the contention-based random access (S44).

Figure 33:
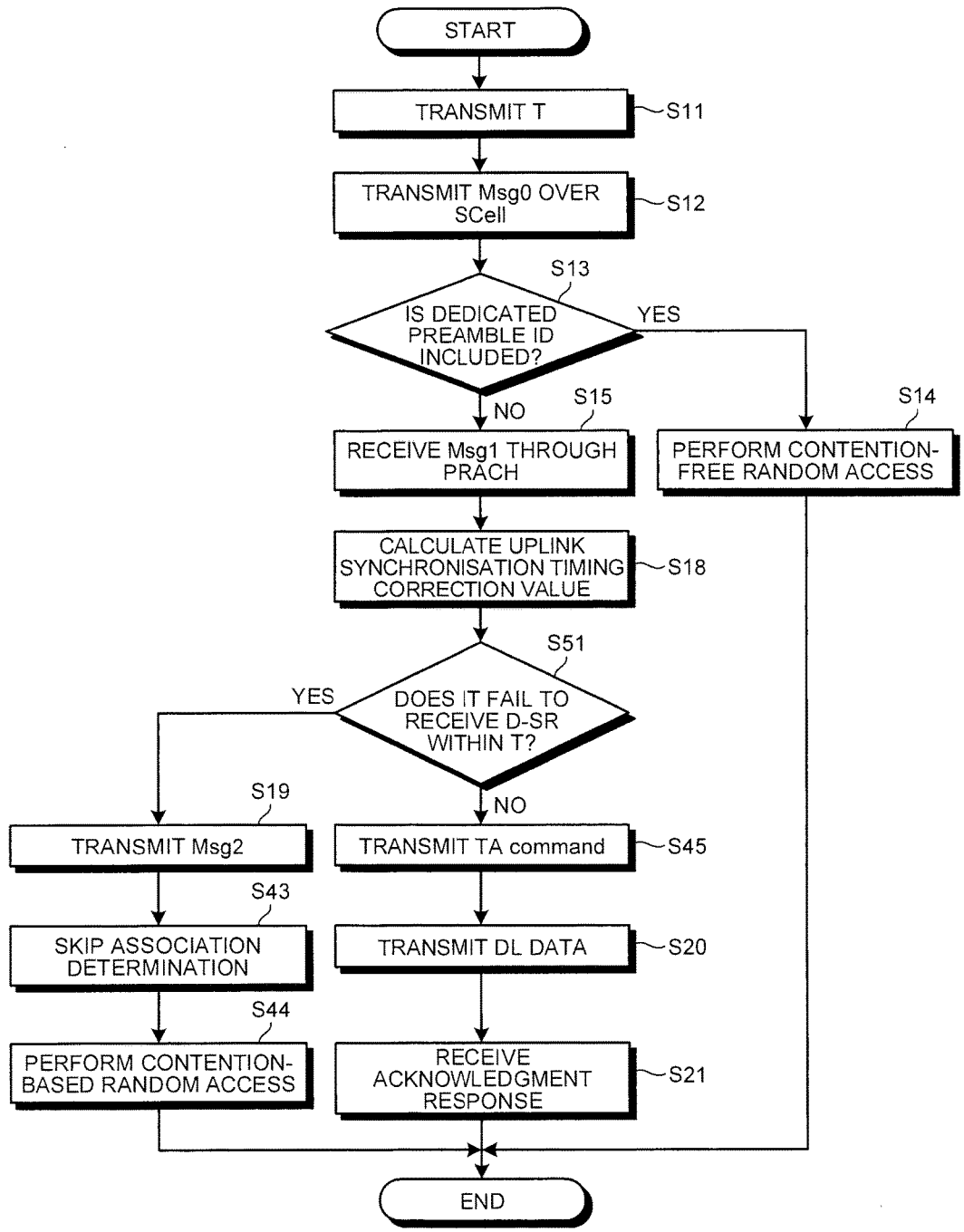
FIG. 33 is a flowchart illustrating an operation of a base station (transmitting device) in the wireless communication method (TA command determination) according to the fourth embodiment.

FIG. 33 is a flowchart illustrating an operation of the base station (transmitting device) in the wireless communication method (TA command determination) according to the fourth embodiment. The same process as in the first to third embodiments is denoted by the same step (S) number, and a description thereof will not be repeated. Here, a process different from that in FIG. 29 according to the third embodiment will be described. Further, an operation of the mobile station is the same as the wireless communication method illustrated in FIG. 28.

Referring to FIG. 33, in the base station, the RA managing unit 61 receives Msg1 transmitted through the PRACH set on the SCell through the transmitting/receiving unit 43 (S15). Then, the TA managing unit 63 calculates the uplink synchronisation timing correction value (S18), and then the D-SR managing unit 62 determines whether or not the D-SR has been received within the parameter T (S51). For example, when it is determined that the D-SR has been received within the parameter T (No in S51), the TA managing unit 63 transmits the TA command over the SCell through the transmitting/receiving unit 43 (S45). However, when it is determined that D-SR has not been received within the parameter T (Yes in S51), the RA managing unit 61 transmits Msg2 over the SCell through the transmitting/receiving unit 43 (S19). Then, the RA managing unit 61 does not perform an operation of associating Msg1 with the D-SR (S43), and performs the contention-based random access (S44).

As described above, in the present embodiment, when it fails to transmit and receive the D-SR and it is difficult for the base station to associate Msg1 with the D-SR, the wireless communication method illustrated in FIG. 30 or 31 is performed. Thus, the base station and the mobile station can continuously perform communication.

Fifth Embodiment

A wireless communication method according to a fifth embodiment will be described. In the fifth embodiment, a case in which it fails to transmit and receive Msg1 and it is difficult for the base station to detect Msg1 is considered. The configurations of the mobile station and the base station are the same as in the first embodiment. The following description will proceed with a process different from that in the first embodiment.

Figure 34:
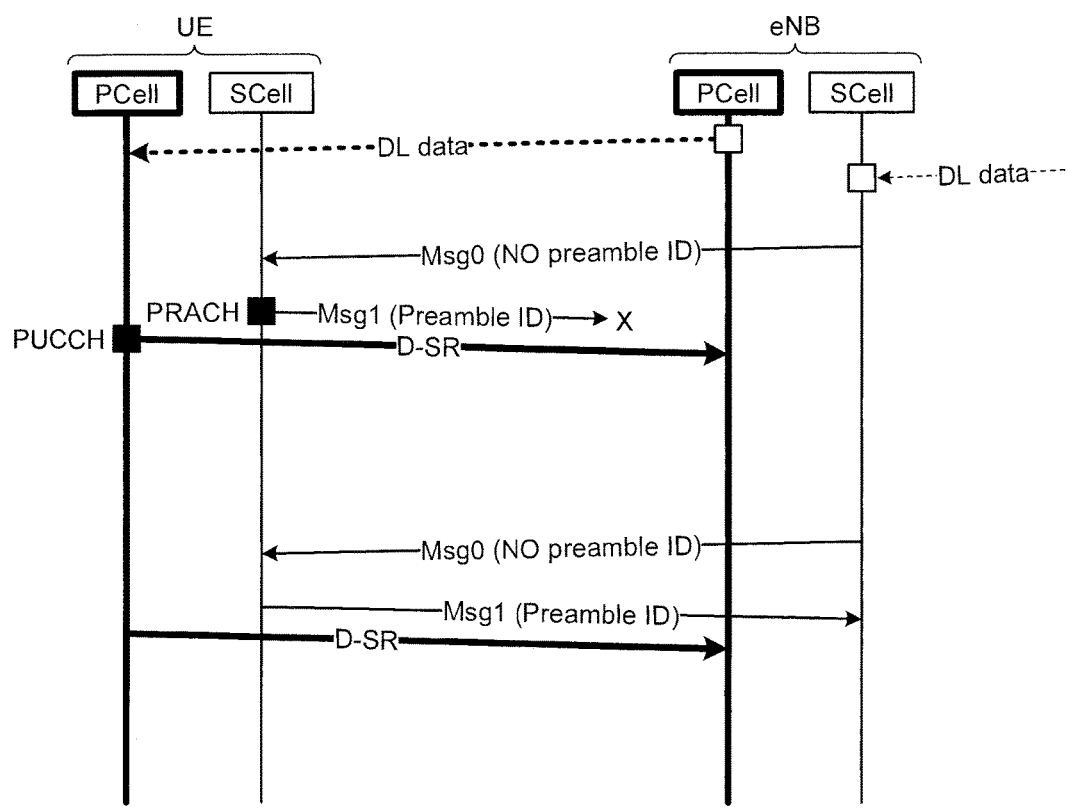
FIG. 34 is a diagram illustrating an example of the wireless communication method according to a fifth embodiment.

FIG. 34 is a diagram illustrating an example of the wireless communication method according to the fifth embodiment. For example, after Msg0 is transmitted, a subframe in which the base station receives Msg1 from a desired mobile station is a subframe to which the PRACH is most recently assigned. In other words, when it is difficult to detect Msg1 in this subframe, the base station can determine that it fails to receive Msg1. Thus, in the present embodiment, when it is determined that it fails to receive Msg1, the base station transmits Msg0 again to the mobile station in order to acquire an uplink synchronisation timing again.

Next, the wireless communication method according to the fifth embodiment will be described with reference to flowcharts of respective devices. The same process as in the first embodiment is denoted by the same step (S) number, and a description thereof will not be repeated. Here, a process different from that in the first embodiment will be described.

Figure 35:
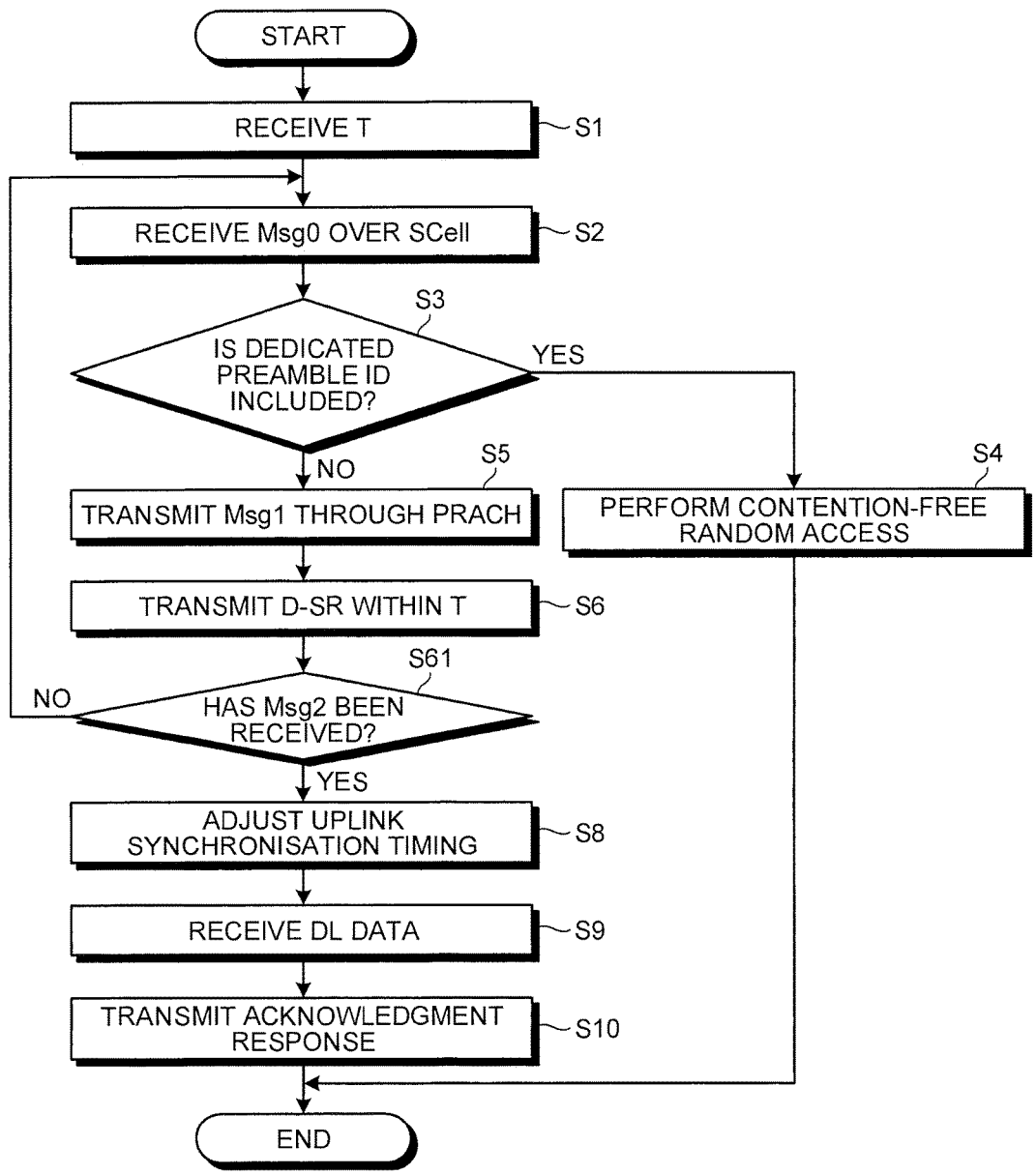
FIG. 35 is a flowchart illustrating an operation of a mobile station (receiving device) in the wireless communication method according to the fifth embodiment.

FIG. 35 is a flowchart illustrating an operation of the mobile station (receiving device) in the wireless communication method according to the fifth embodiment. Referring to FIG. 35, in the mobile station, the D-SR managing unit 32 reads the parameter T from the storage unit 23, and transmits the D-SR through the uplink transmitting unit 12 and the transmitting/receiving unit 11 within the parameter T using the SR PUCCH set on the PCell (S6). Then, the RA managing unit 31 checks whether or not Msg2 has been received over the SCell (S61). For example, when it is determined that Msg2 has been received (Yes in S61), the transmission/reception control unit 34 adjusts an uplink synchronisation timing based on Msg2 received by the RA managing unit 31 (S8). However, when it is determined that Msg2 has not been received (No in S61), the RA managing unit 31 receives Msg0 again through the transmitting/receiving unit 11 (S2).

Figure 36:
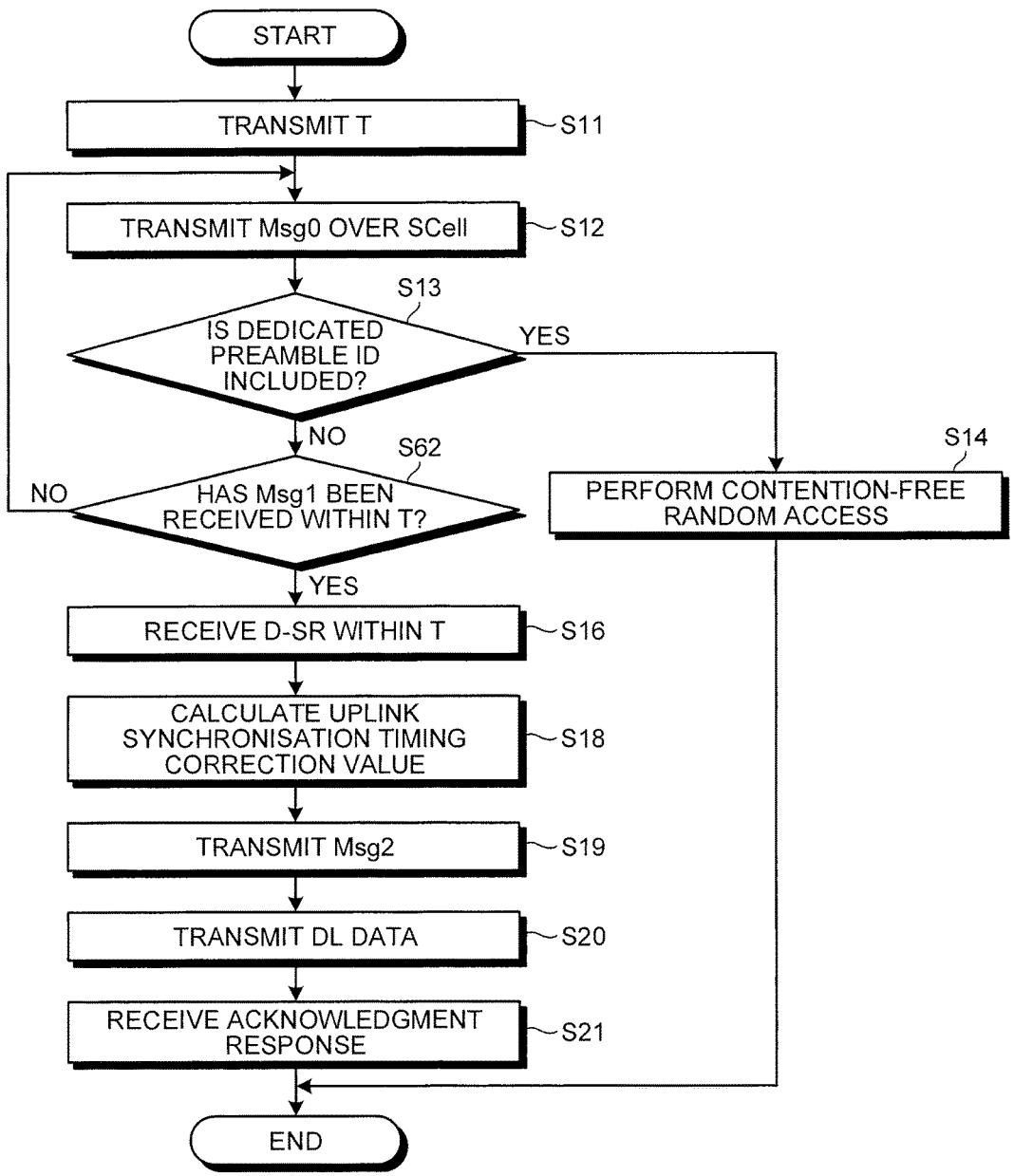
FIG. 36 is a flowchart illustrating an operation of a base station (transmitting device) in the wireless communication method according to the fifth embodiment.

FIG. 36 is a flowchart illustrating an operation of the base station (transmitting device) in the wireless communication method according to the fifth embodiment. Referring to FIG. 36, in the base station, when the RA managing unit 61 transmits Msg0 including no dedicated preamble ID (No in S13), the RA managing unit 61 checks whether or not Msg1 transmitted through the PRACH has been received within the parameter T (S62). For example, when it is determined that Msg1 has been received within the parameter T (Yes in S62), the D-SR managing unit 62 reads the parameter T from the storage unit 53, and receives the D-SR transmitted through the SR PUCCH through the transmitting/receiving unit 43 within the parameter T (S16). However, when it is determined that Msg1 has not been received within the parameter T (No in S62), the RA managing unit 61 transmits Msg0 again over the SCell through the transmitting/receiving unit 43 (S12).

As described above, in the present embodiment, even when it fails to transmit and receive Msg1, the base station can recognize the subframe in which Msg1 is received from a desired mobile station and thus quickly retransmit Msg0. Thus, the base station and the mobile station can continuously perform communication.

Sixth Embodiment

A wireless communication method according to a sixth embodiment will be described. In the sixth embodiment, a case in which as a plurality of mobile stations transmit Msg1 using the same PRACH and the same preamble ID, collision of Msg1 occurs, and it is difficult for the base station to properly decode Msg1 is considered. The configurations of the mobile station and the base station are the same as in the first embodiment. The following description will proceed with a process different from that in the first embodiment.

Figure 37:
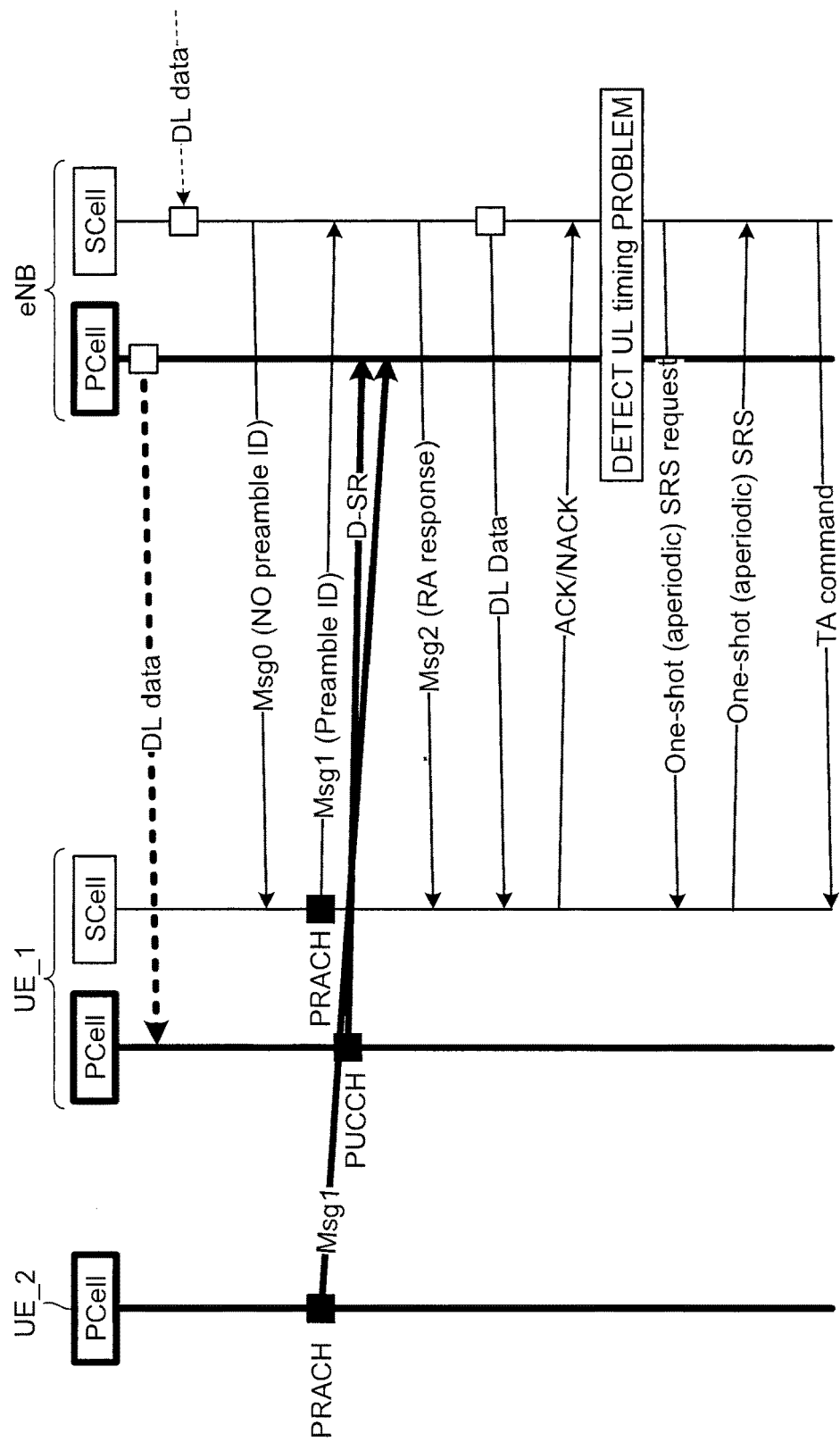
FIG. 37 is a diagram illustrating an example of the wireless communication method according to a sixth embodiment.

FIG. 37 is a diagram illustrating an example of the wireless communication method (a first uplink synchronisation correction method) according to the sixth embodiment. For example, there are cases in which as a plurality of mobile stations (UE_1 and UE_2) transmit Msg1 using the same PRACH and the same preamble ID, collision of Msg1 occurs, and it is difficult for the base station to properly decode Msg1.

When it is difficult to properly decode Msg1, particularly, a problem occurs when the base station detects Msg1 transmitted from another mobile station (UE_2) other than a desired mobile station (UE_1). In this case, the base station erroneously associates Msg1 with the D-SR. As a result, the desired mobile station (UE_1) is notified of the uplink synchronisation timing of another mobile station (UE_2). This case is not desirable because when a radio signal received in the base station is within a cyclic prefix (CP) length, it does not cause interference in another cell, but it causes interference in a corresponding cell.

In this regard, in the present embodiment, for example, when deviation of an uplink synchronisation timing is detected in data communication (ACK/NACK) after Msg2 is transmitted, the base station notifies the mobile station (UE_1) of a new uplink synchronisation timing. Through this operation, uplink synchronisation can be corrected.

Specifically, after deviation of an uplink synchronisation timing is detected, the base station first requests the mobile station (UE_1) to transmit one-shot type sounding RS (SRS) (which corresponds to a one-shot (aperiodic) SRS request in FIG. 37). A cell requesting the SRS is preferably a cell having the same carrier as a cell in which Msg1 has been transmitted. Then, the mobile station (UE_1) transmits the SRS (which corresponds to one-shot (aperiodic) SRS in FIG. 37). Then, the base station calculates a proper uplink synchronisation timing (uplink synchronisation timing correction value) based on the received SRS, and transmits the TA command to the mobile station (UE_1).

Figure 38:
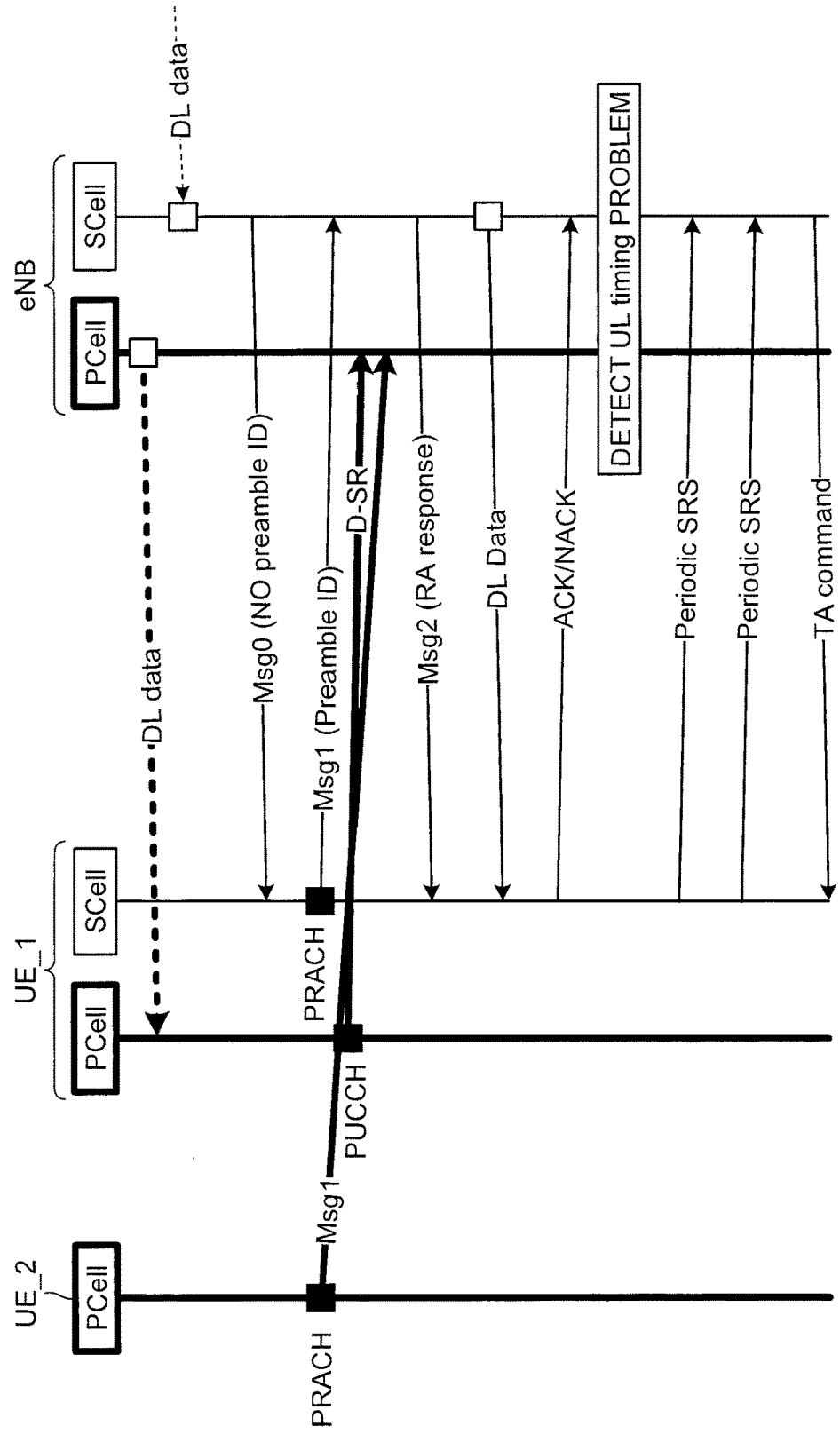
FIG. 38 is a diagram illustrating an example of the wireless communication method according to the sixth embodiment.

Further, the proper uplink synchronisation timing may be transmitted to the mobile station (UE_1) by a method (a second uplink synchronisation correction method) different from the above-described method. For example, it is a method of calculating the proper uplink synchronisation timing based on the SRS transmitted by typical periodic SRS transmission. FIG. 38 is a diagram illustrating an example of the wireless communication method according to the sixth embodiment which is different from the above-described method. In this method, the base station receives an SRS (periodic SRS) periodically transmitted by the mobile station (UE_1), detects deviation of the uplink synchronisation timing, then calculates the proper uplink synchronisation timing based on the SRS, and transmits the TA command to the mobile station (UE_1).

Figure 39:
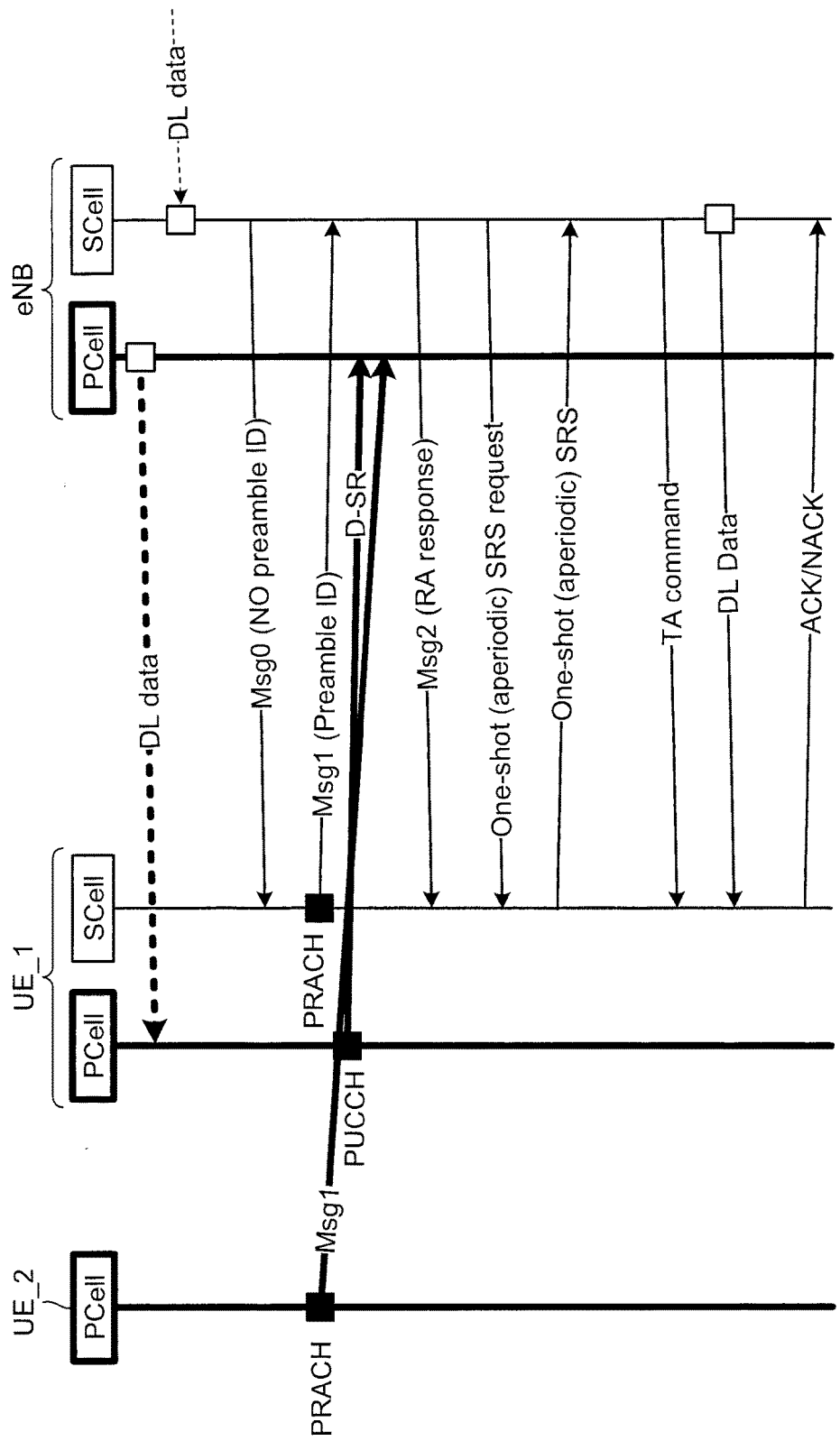
FIG. 39 is a diagram illustrating an example of the wireless communication method according to the sixth embodiment.

As another method (a third uplink synchronisation correction method), there is a method of transmitting the proper uplink synchronisation timing to the mobile station (UE_1) before detecting deviation of the uplink synchronisation timing. FIG. 39 is a diagram illustrating an example of the wireless communication method according to the sixth embodiment which is different from the above-described method. In this method, first of all, after transmitting Msg2, the base station subsequently requests the mobile station (UE_1) to transmit a one-shot type SRS (sounding RS) (which corresponds to a one-shot (aperiodic) SRS request in FIG. 39). A cell that requests the SRS may be a cell having the same carrier as a cell in which Msg1 has been transmitted. Then, the mobile station (UE_1) transmits the SRS (which corresponds to a one-shot (aperiodic) SRS in FIG. 39). Then, the base station calculates the proper uplink synchronisation timing based on the received SRS, and transmits the TA command to the mobile station (UE_1). Thereafter, data communication (DL Data or ACK/NACK) is performed between the base station and the mobile station (UE_1).

Next, the wireless communication method according to the sixth embodiment will be described with reference to flowcharts of respective devices. The same process as in the first embodiment is denoted by the same step (S) number, and a description thereof will not be repeated. Here, a process different from that in the first embodiment will be described.

Figure 40:
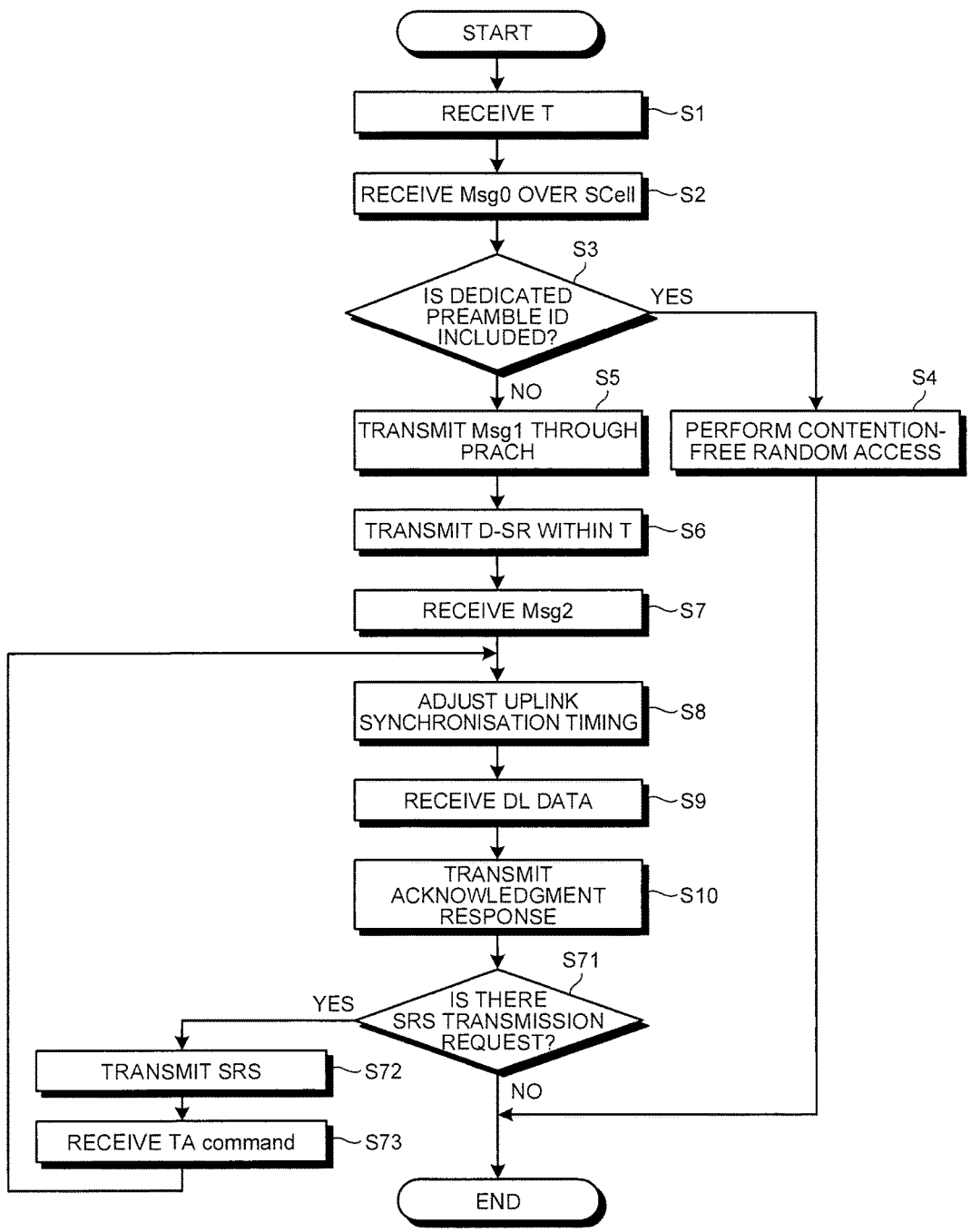
FIG. 40 is a flowchart illustrating an operation of a mobile station (receiving device) in the wireless communication method (a first uplink synchronisation correction method) according to the sixth embodiment.

FIG. 40 is a flowchart illustrating an operation of the mobile station (receiving device) in the wireless communication method (the first uplink synchronisation correction method) according to the sixth embodiment. Referring to FIG. 40, in the mobile station, the transmission/reception control unit 34 transmits a response acknowledgment over the SCell as a response to DL data (S10), and then checks whether or not there is an SRS transmission request from the base station (S71). For example, when it is determined that there is an SRS transmission request (Yes in S71), the transmission/reception control unit 34 transmits the SRS (one-shot SRS) through the uplink transmitting unit 12 and the transmitting/receiving unit 11 (S72). Thereafter, the TA managing unit 33 receives the TA command from the base station through the transmitting/receiving unit 11 (S73), and adjusts the uplink synchronisation timing (S8). However, when it is determined that there is no SRS transmission request (No in S71), since the uplink synchronisation is already obtained, the process ends.

Figure 41:
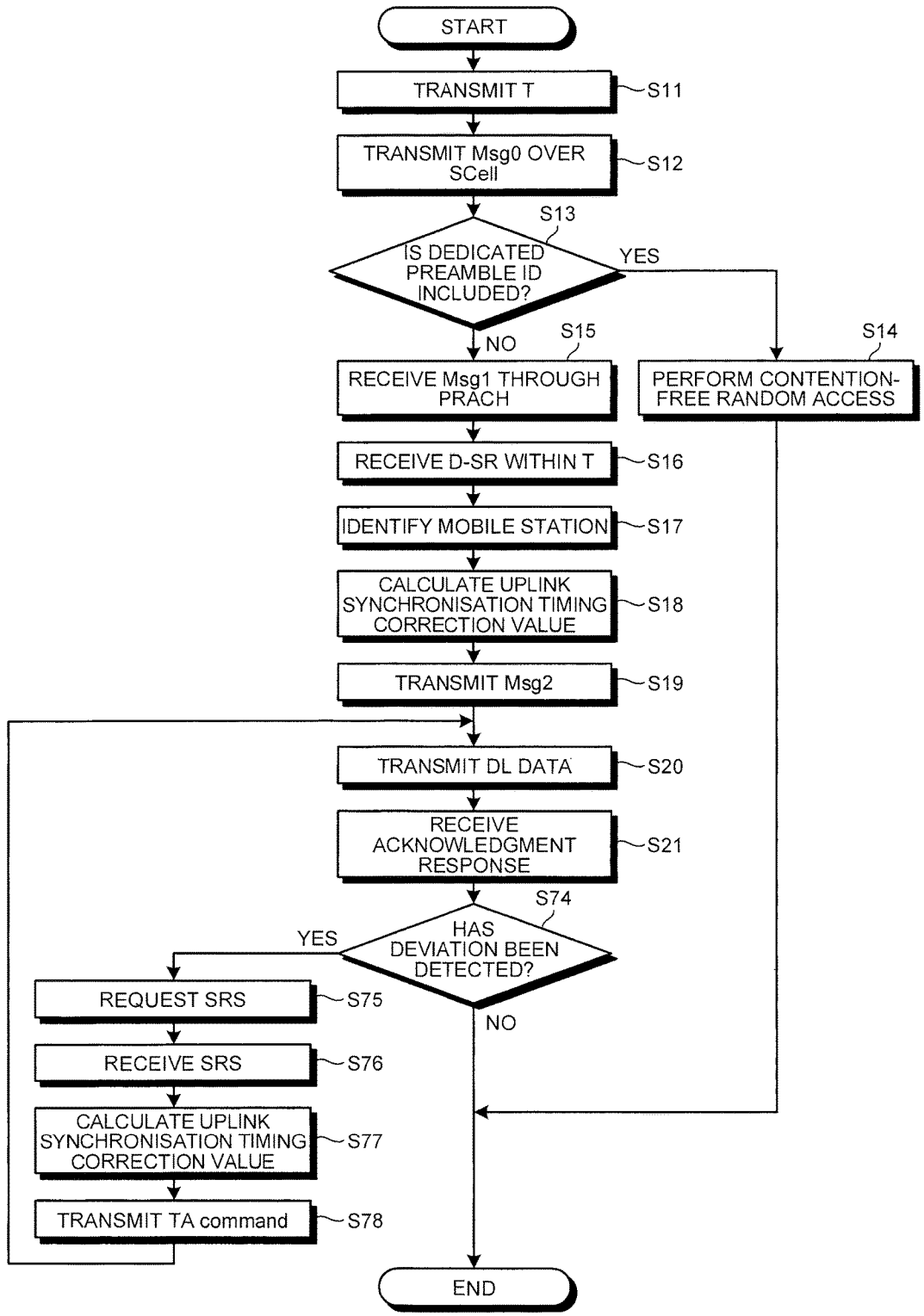
FIG. 41 is a flowchart illustrating an operation of a base station (transmitting device) in the wireless communication method (the first uplink synchronisation correction method) according to the sixth embodiment.

FIG. 41 is a flowchart illustrating an operation of the base station (transmitting device) in the wireless communication method (the first uplink synchronisation correction method) according to the sixth embodiment. Referring to FIG. 41, in the base station, the transmission/reception control unit 64 receives the acknowledgment response from the mobile station (S21), and then when deviation of the uplink synchronisation timing is detected (Yes in S74), an SRS transmission request is transmitted to the mobile station through the transmitting/receiving unit 43 (S75). Then, the transmission/reception control unit 64 receives the SRS (one-shot SRS) through the transmitting/receiving unit 43 (S76), and then the TA managing unit 63 calculates the uplink synchronisation timing correction value (S77), and transmits the TA command through the transmitting/receiving unit 43 (S78). Thereafter, data communication is performed between the base station and the mobile station (S20 and S21). Further, when there is no deviation of the uplink synchronisation timing (No in S74), since the uplink synchronisation is already obtained, the process ends.

Figure 42:
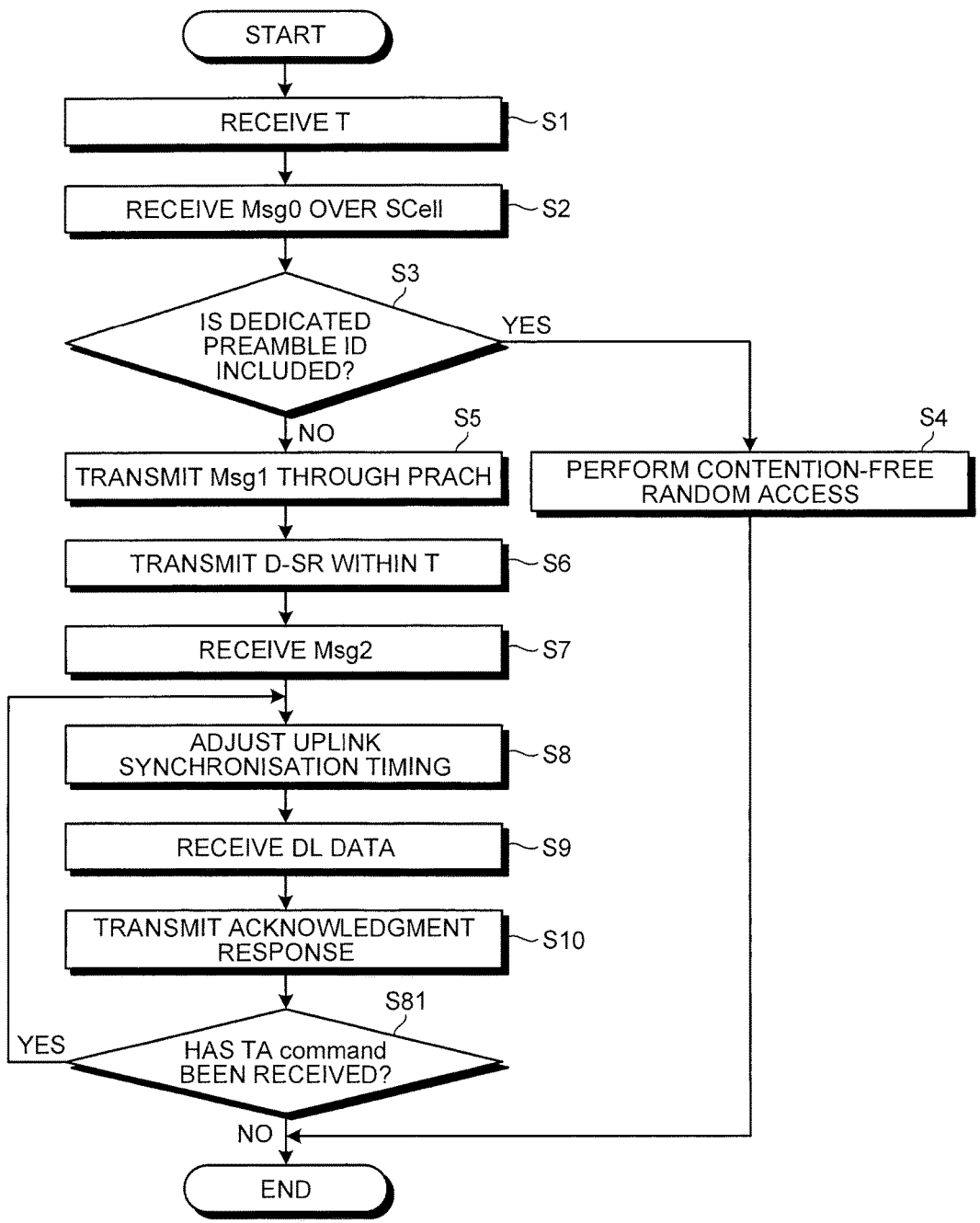
FIG. 42 is a flowchart illustrating an operation of a mobile station (receiving device) in the wireless communication method (a second uplink synchronisation correction method) according to the sixth embodiment.

FIG. 42 is a flowchart illustrating an operation of the mobile station (receiving device) in the wireless communication method (the second uplink synchronisation correction method) according to the sixth embodiment. Referring to FIG. 42, in the mobile station, the transmission/reception control unit 34 transmits a response acknowledgment over the SCell as a response to DL data (S10), and then TA managing unit 33 checks whether or not the TA command has been received from the base station (S81). For example, when the TA command has been received (Yes in S81), the TA managing unit 33 adjusts the uplink synchronisation timing based on the uplink synchronisation timing correction value (S8). However, when the TA command has not been received (No in S81), since the uplink synchronisation is already obtained, the process ends.

Figure 43:
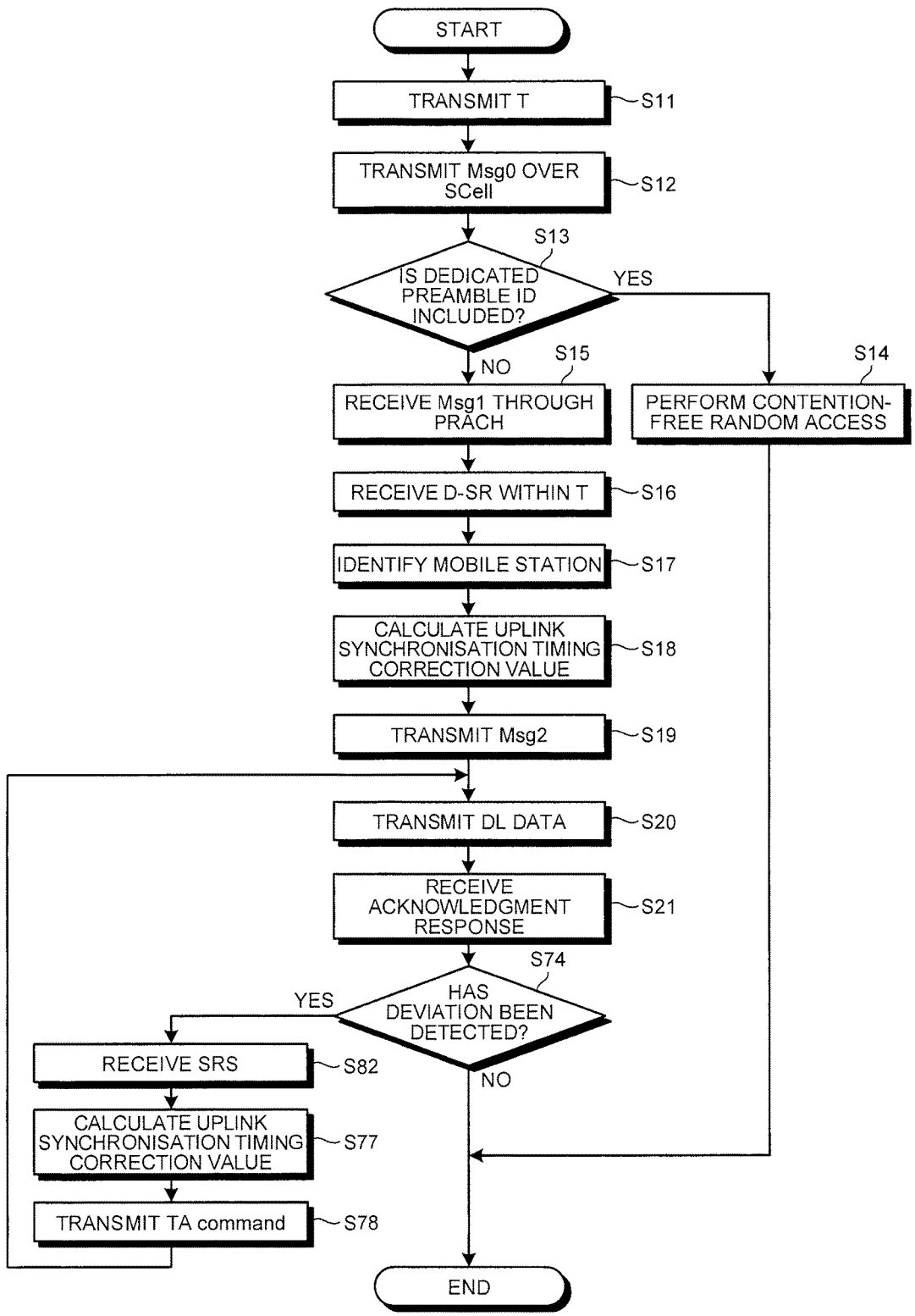
FIG. 43 is a flowchart illustrating an operation of a base station (transmitting device) in the wireless communication method (the second uplink synchronisation correction method) according to the sixth embodiment.

FIG. 43 is a flowchart illustrating an operation of the base station (transmitting device) in the wireless communication method (the second uplink synchronisation correction method) according to the sixth embodiment. Referring to FIG. 43, in the base station, the transmission/reception control unit 64 receives the acknowledgment response from the mobile station (S21), and then, when deviation of the uplink synchronisation timing is detected (Yes in S74), the TA managing unit 63 performs the following process. The TA managing unit 63 calculates the uplink synchronisation timing correction value based on the SRS (periodic SRS) periodically transmitted from the mobile station (S82 and S77), and transmits the TA command through the transmitting/receiving unit 43 (S78). Thereafter, data communication is performed between the base station and the mobile station (S20 and S21). However, when there is no deviation of the uplink synchronisation timing (No in S74), since the uplink synchronisation is already obtained, the process ends.

Figure 44:
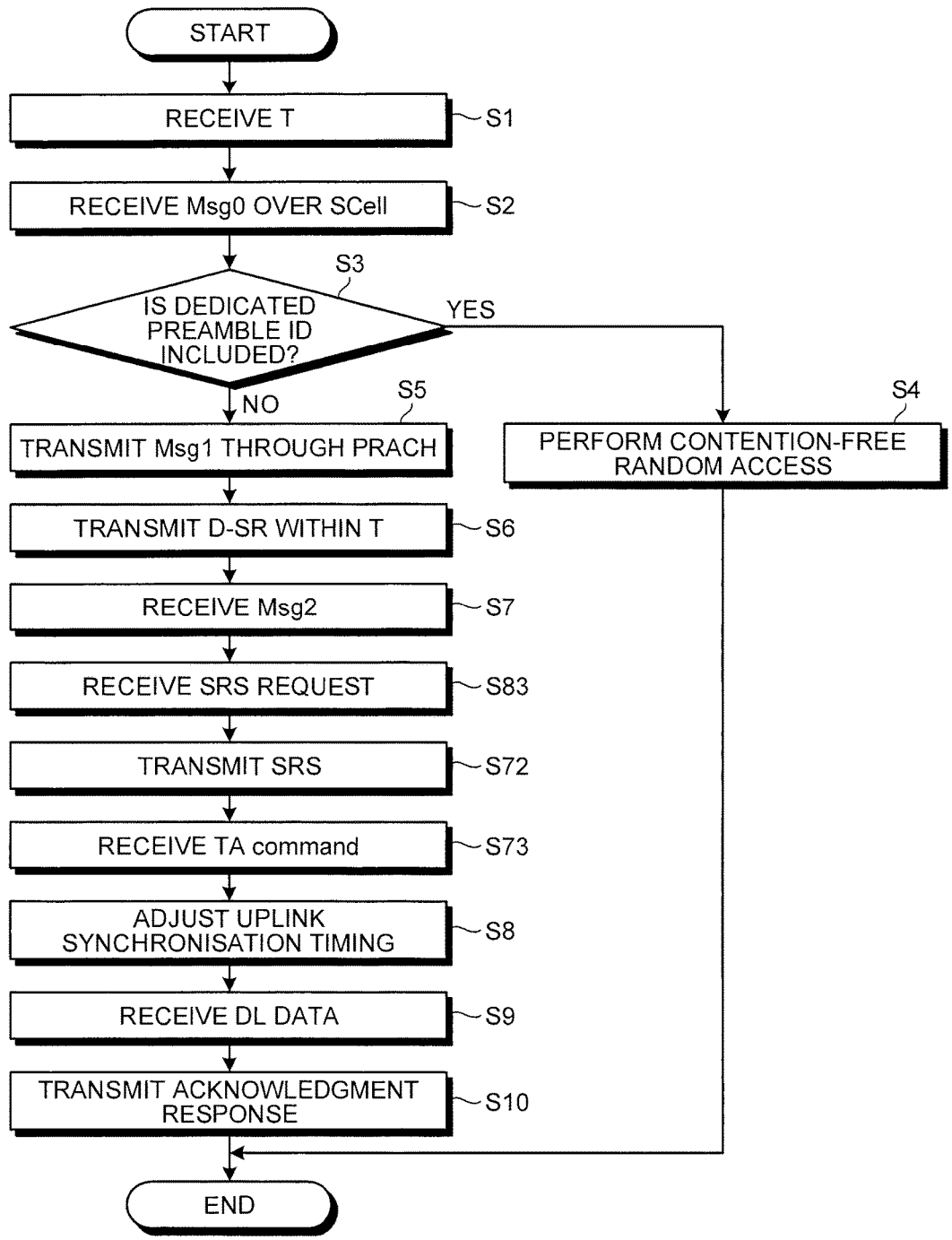
FIG. 44 is a flowchart illustrating an operation of a mobile station (receiving device) in the wireless communication method (a third uplink synchronisation correction method) according to the sixth embodiment.

FIG. 44 is a flowchart of an operation of the mobile station (receiving device) in the wireless communication method (the third uplink synchronisation correction method) according to the sixth embodiment. Referring to FIG. 44, in the mobile station, the RA managing unit 31 receives Msg2 (S7), and then the transmission/reception control unit 34 subsequently receives the SRS transmission request from the base station (S83). Then, the transmission/reception control unit 34 transmits the SRS (one-shot SRS) through the uplink transmitting unit 12 and the transmitting/receiving unit 11 (S72). Thereafter, the TA managing unit 33 receives the TA command from the base station through the transmitting/receiving unit 11 (S73), adjusts the uplink synchronisation timing (S8).

Figure 45:
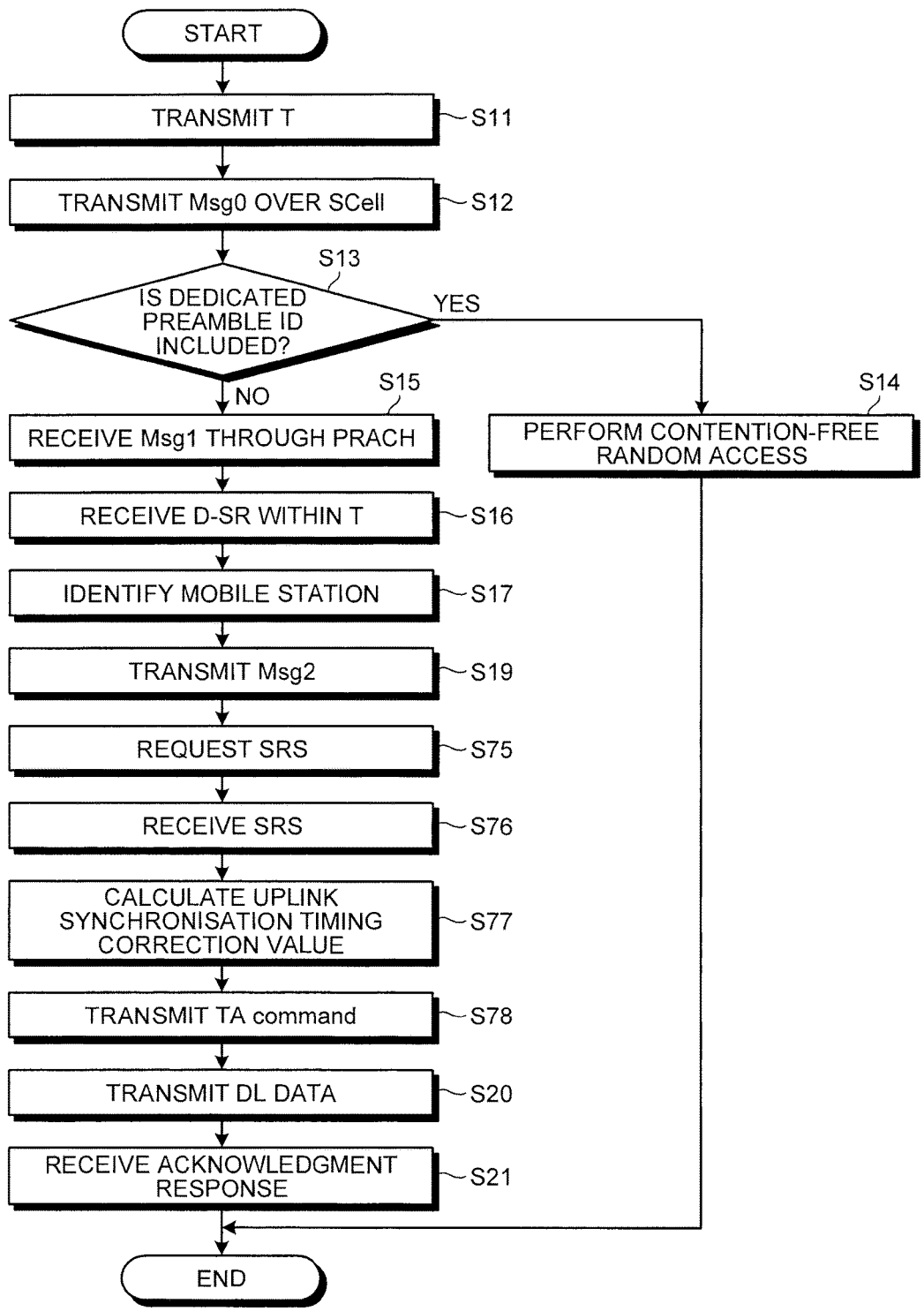
FIG. 45 is a flowchart illustrating an operation of a base station (transmitting device) in the wireless communication method (the third uplink synchronisation correction method) according to the sixth embodiment.

FIG. 45 is a flowchart illustrating an operation of the base station (transmitting device) in the wireless communication method (the third uplink synchronisation correction method) according to the sixth embodiment. Referring to FIG. 45, in the base station, the RA managing unit 61 transmits Msg2 (S19), and then the transmission/reception control unit 64 transmits the SRS transmission request to the mobile station through the transmitting/receiving unit 43 (S75). Then, the transmission/reception control unit 64 receives the SRS (one-shot SRS) through the transmitting/receiving unit 43 (S76), and then the TA managing unit 63 calculates the uplink synchronisation timing correction value (S77) and transmits the TA command through the transmitting/receiving unit 43 (S78). Thereafter, data communication is performed between the base station and the mobile station (S20 and S21).

As described above, in the present embodiment, even when collision of Msg1 occurs and it is difficult for the base station to properly decode Msg1, the above-described methods are performed, and thus it is possible to notify a desired mobile station of the proper uplink synchronisation timing. Thus, the base station and the mobile station can continuously perform communication.

Seventh Embodiment

A wireless communication method according to a seventh embodiment will be described. The configurations of the mobile station and the base station are the same as in the first embodiment. The following description will proceed with a process different from those in the first to sixth embodiments.

The third embodiment and the sixth embodiment have been described in connection with the example in which Msg1 overlaps that of another mobile station and the example in which collision of Msg1 occurs. The overlapping and collision occur because the PRACH through which Msg1 is transmitted is common to the respective mobile stations.

Figure 46:
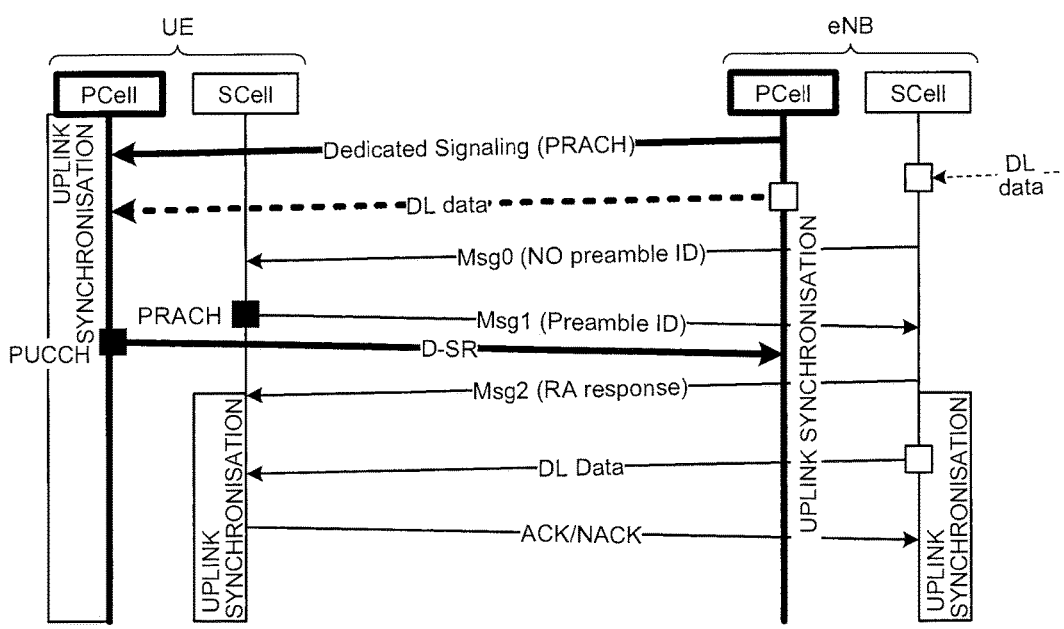
FIG. 46 is a diagram illustrating an example of the wireless communication method according to a seventh embodiment.

In this regard, in the present embodiment, for example, the PRACH used to perform the wireless communication method illustrated in FIG. 9 (an example of "the wireless communication method of associating Msg1 with the D-SR") is separated from the PRACH used for other processes. FIG. 46 is a diagram illustrating an example of the wireless communication method according to the seventh embodiment.

In the past, notification of PRACH assignment information is given to the mobile station through SIB2 (System Information Block 2) which is broadcast information. However, in the carrier aggregation, for the PCell, the PRACH is notified of through the SIB2 similarly to the existing system, but for the SCell, the PRACH is notified of as dedicated information using dedicated signaling other than broadcast information. Specifically, for example, as described in the first embodiment, the PRACH is notified of through the RRC (RRC Connection Reconfiguration). Thus, in a case where the "wireless communication method of associating Msg1 with the D-SR" illustrated in FIG. 9 is applied to the mobile station, a PRACH solely used by a desired mobile station is preferably assigned by dedicated signaling (see "dedicated signaling (PRACH)" in FIG. 46).

Figure 47:
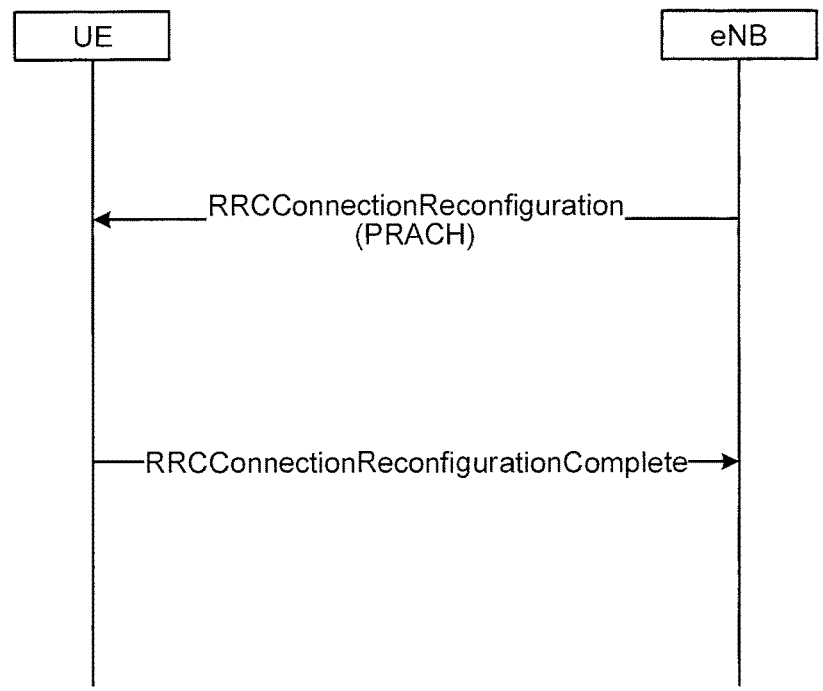
FIG. 47 is a diagram illustrating an example of dedicated signaling.

FIG. 47 is a diagram illustrating an example of the dedicated signaling. Here, the base station notifies the mobile station of PRACH assignment information using the "RRC Connection Reconfiguration" transmitted and received when communication starts.

Figure 48:
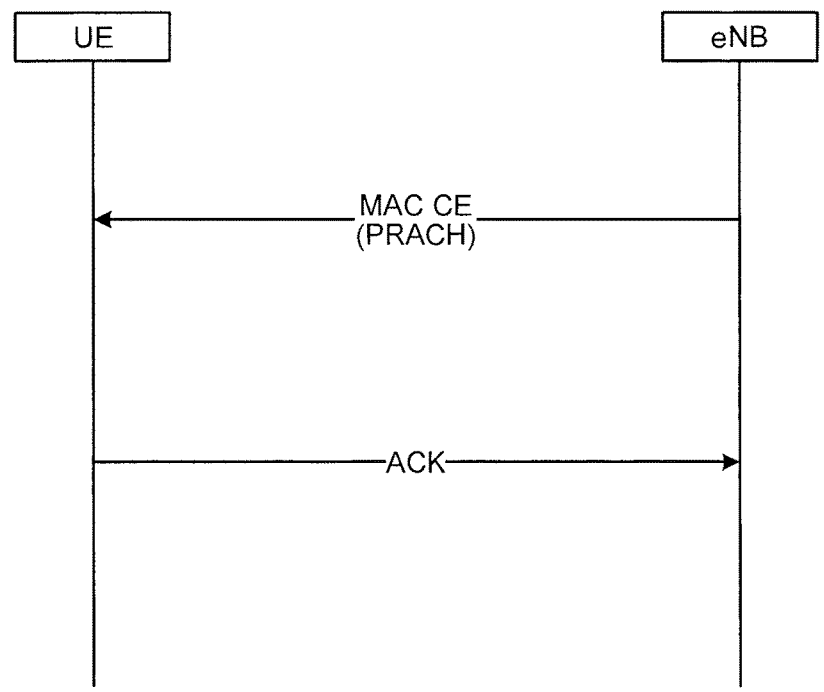
FIG. 48 is a diagram illustrating an example of dedicated signaling.

FIG. 48 is a diagram illustrating another example of the dedicated signaling. Here, the base station notifies the mobile station of the PRACH assignment information using "MAC Control Element."

Next, the wireless communication method according to the seventh embodiment will be described with reference to flowcharts of respective devices. The same process as in the first embodiment is denoted by the same step (S) number, and a description thereof will not be repeated. Here, a process different from that in the first embodiment will be described. In the present embodiment, as an example, the parameter T is assumed to remain already stored in each storage unit.

Figure 49:
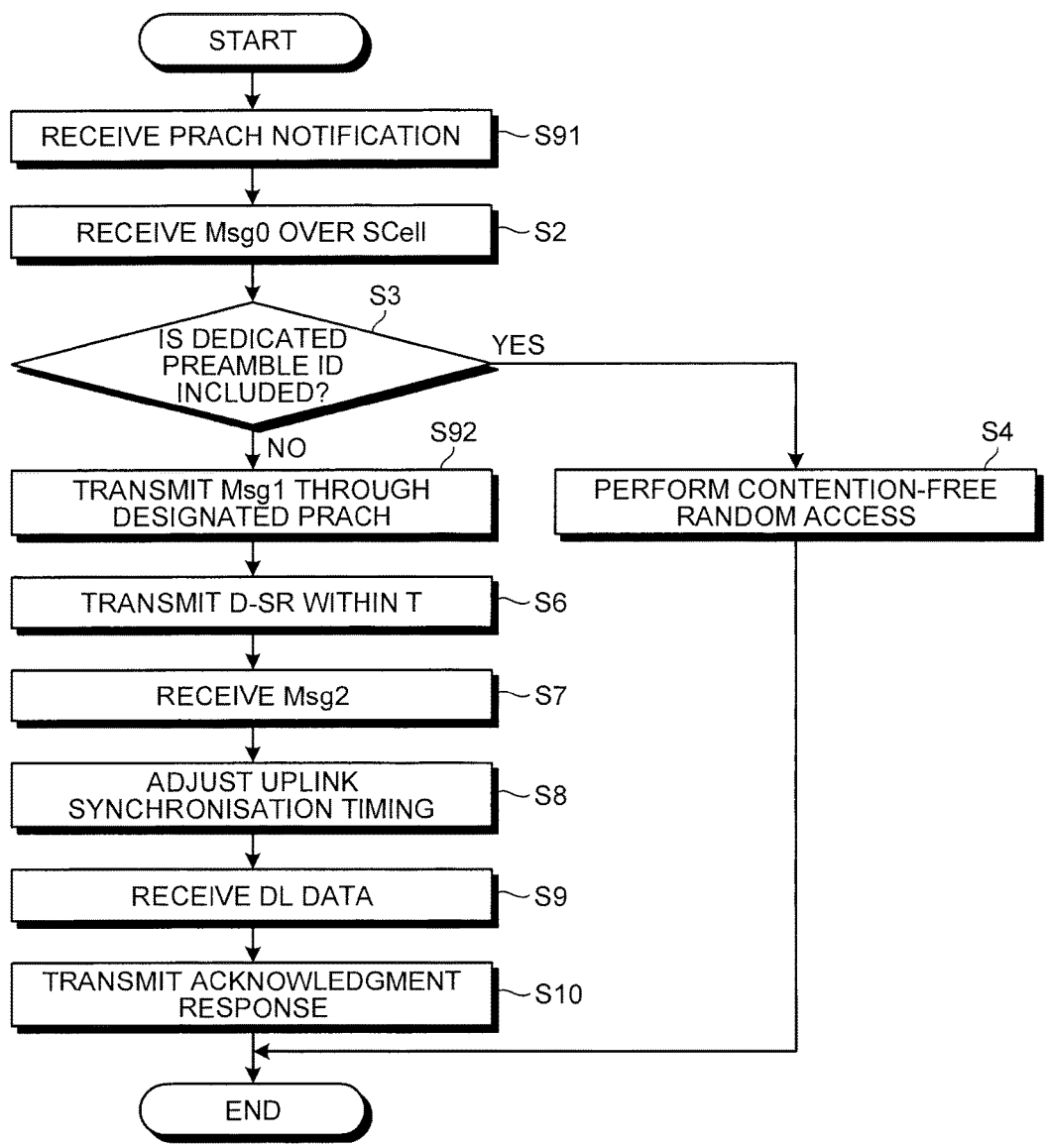
FIG. 49 is a flowchart illustrating an operation of a mobile station (receiving device) in the wireless communication method according to the seventh embodiment.

FIG. 49 is a flowchart illustrating an operation of the mobile station (receiving device) in the wireless communication method according to the seventh embodiment. Referring to FIG. 49, in the mobile station, the transmission/reception control unit 34 receives PRACH assignment information (PRACH notification) from the base station through the transmitting/receiving unit 11 (S91).

Thereafter, when it is determined that the dedicated preamble ID is not included in Msg0 (No in S3), the RA managing unit 31 transmits Msg1 through the PRACH over the designated SCell through the uplink transmitting unit 12 and the transmitting/receiving unit 11 (S92). Then, the D-SR managing unit 32 reads the parameter T from the storage unit 23, and transmits the D-SR using the SR PUCCH set on the PCell through the uplink transmitting unit 12 and the transmitting/receiving unit 11 within the parameter T (S6).

Figure 50:
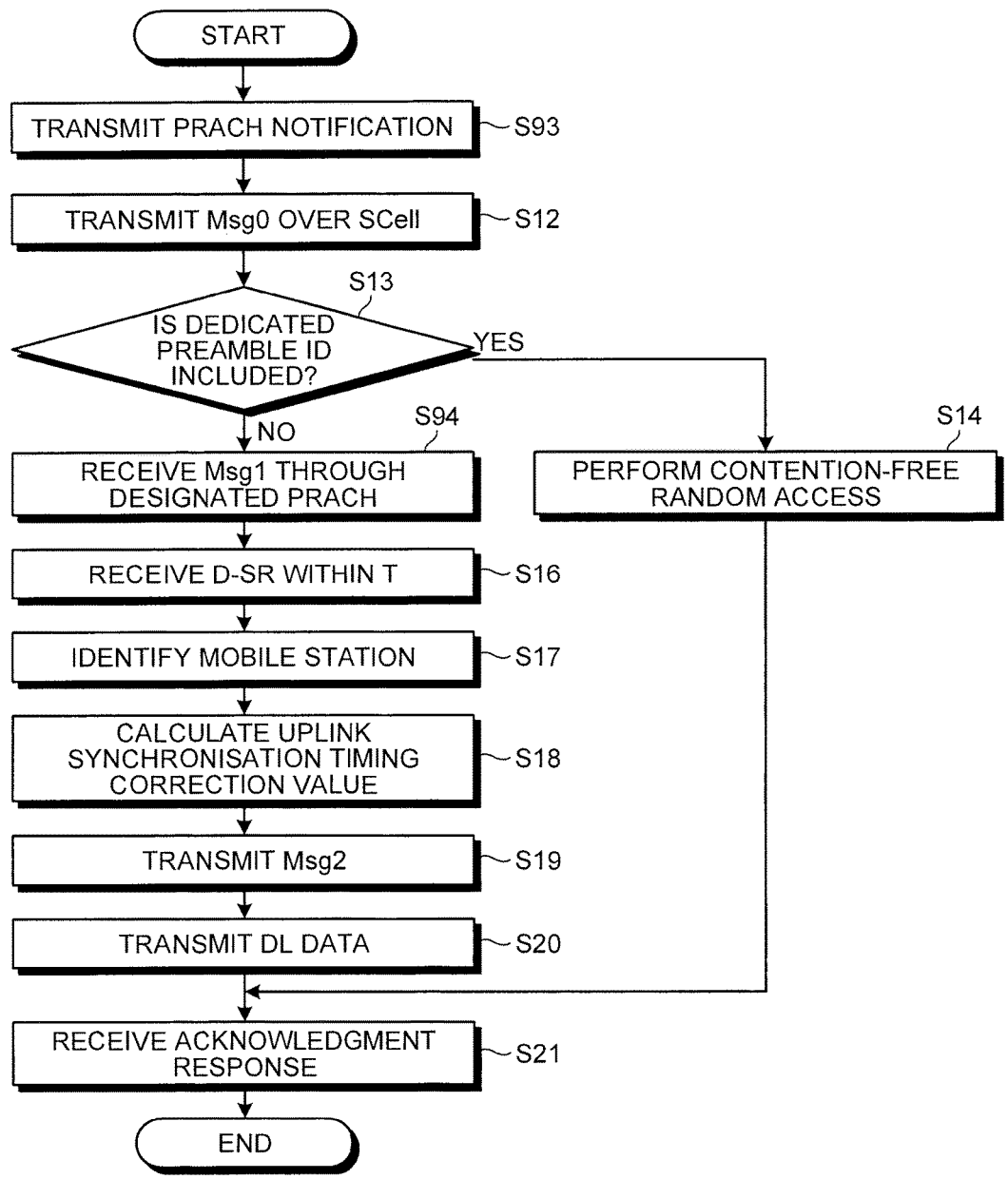
FIG. 50 is a flowchart illustrating an operation of a base station (transmitting device) in the wireless communication method according to the seventh embodiment.

FIG. 50 is a flowchart illustrating an operation of the base station (transmitting device) in the wireless communication method according to the seventh embodiment. Referring to FIG. 50, in the base station, the transmission/reception control unit 64 transmits PRACH assignment information (PRACH notification) to the mobile station through the transmitting/receiving unit 43 (S93).

Thereafter, when Msg0 including no dedicated preamble ID is transmitted (No in S13), the RA managing unit 61 receives Msg1 transmitted through the PRACH over the SCell designated by its own station through the transmitting/receiving unit 43 (S94). Then, the D-SR managing unit 62 reads the parameter T from the storage unit 53, and then receives the D-SR transmitted through the SR PUCCH set on the PCell through the transmitting/receiving unit 43 within the parameter T (S16).

As described above, in the present embodiment, the PRACH used to perform the wireless communication method illustrated in FIG. 9 (an example of "the wireless communication method of associating Msg1 with the D-SR") is separated from the PRACH used to perform other processes. Thus, overlapping and collision of Msg1 occurring in the third embodiment and the sixth embodiment can be avoided.

Eighth Embodiment

A wireless communication method according to an eighth embodiment will be described. The configurations of the mobile station and the base station are the same as in the first embodiment. The following description will proceed with a process different from those in the first to seventh embodiments.

The third embodiment has been described in connection with the example in which Msg1 overlaps that of another mobile station. The overlapping occurs because it is difficult to identify mobile stations that have transmitted a plurality of Msg1s received by the base station.

Figure 51:
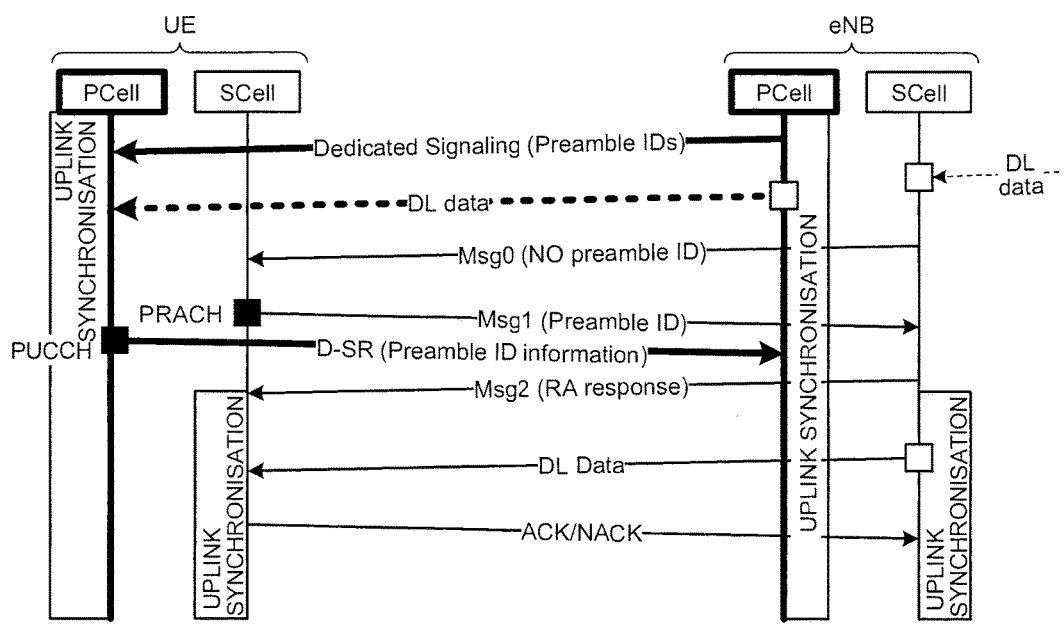
FIG. 51 is a diagram illustrating an example of the wireless communication method according to an eighth embodiment.

In this regard, in the present embodiment, for example, when the "wireless communication method of associating Msg1 with the D-SR" illustrated in FIG. 9 is performed, information of Msg1 (to be) transmitted is included in the D-SR. FIG. 51 is a diagram illustrating an example of the wireless communication method according to the eighth embodiment.

For example, as a first method, there is a method in which since the mobile station transmits a 6-bit preamble ID through Msg1, a 6-bit preamble ID is similarly included in the D-SR ("D-SR (preamble ID information)" of FIG. 51).

As a second method, there is a method in which when the ""wireless communication method of associating Msg1 with the D-SR" illustrated in FIG. 9 is performed, the number of bits to be included in the D-SR is suppressed by designating preamble IDs to be used in advance and thus limiting the number of preamble IDs. For example, by limiting the number of preamble IDs to a specific number 8 and assigning an dedicated identifier to each preamble ID in a range of 1 to 8 (000 to 111), the number of bits of a preamble ID represented by the D-SR can be limited to 3. In this case, D-SR (Preamble ID information) of FIG. 51 is 3-bit information, and the preamble ID notifying method used above is performed using, for example, "RRC Connection Reconfiguration" (see "dedicated signaling (Preamble IDs)" of FIG. 51) as described above. Further, as an application of the second method, there is a method in which when the "wireless communication method of associating Msg1 with the D-SR" illustrated in FIG. 9 is performed, the number of preamble IDs to be used is fixed to one (1). In this case, preamble ID information is not included in the D-SR.

Figure 52:
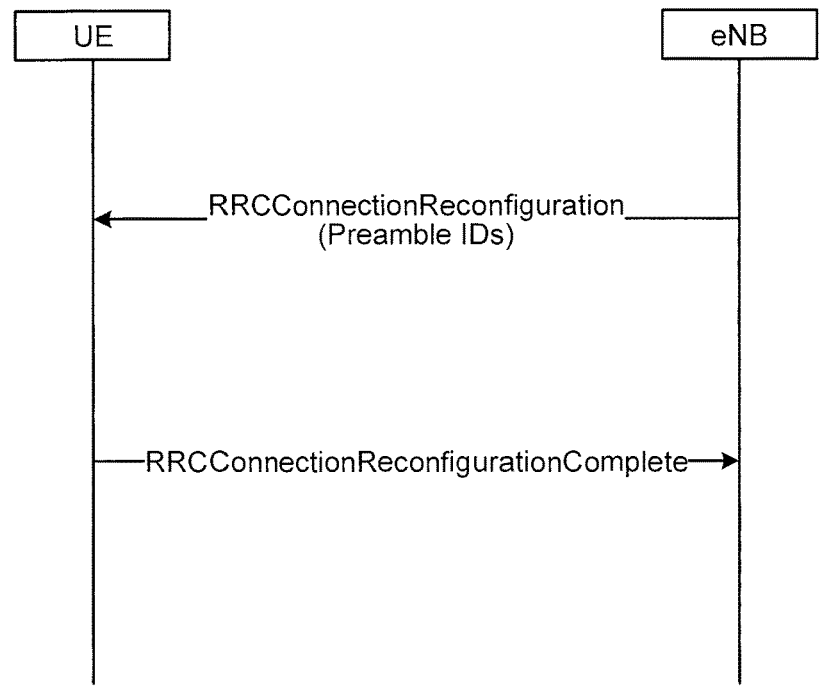
FIG. 52 is a diagram illustrating an example of dedicated signaling.

FIG. 52 is an example of the dedicated signaling. Here, the base station notifies the mobile station of the preamble ID information using "RRC Connection Reconfiguration" transmitted and received when communication starts.

Figure 53:
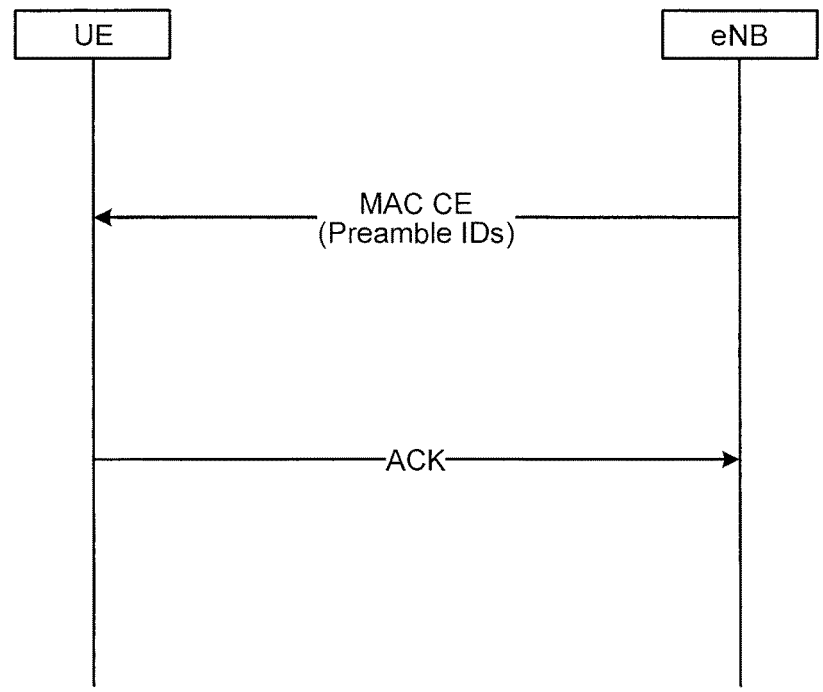
FIG. 53 is a diagram illustrating an example of dedicated signaling.

FIG. 53 is another example of the dedicated signaling. Here, the base station notifies the mobile station of the preamble ID information using "MAC Control Element."

Next, the wireless communication method according to the eighth embodiment will be described with reference to flowcharts of respective devices. The same process as in the first embodiment is denoted by the same step (S) number, and a description thereof will not be repeated. Here, a process different from that in the first embodiment will be described. In the present embodiment, as an example, the parameter T is assumed to remain already stored in each storage unit.

Figure 54:
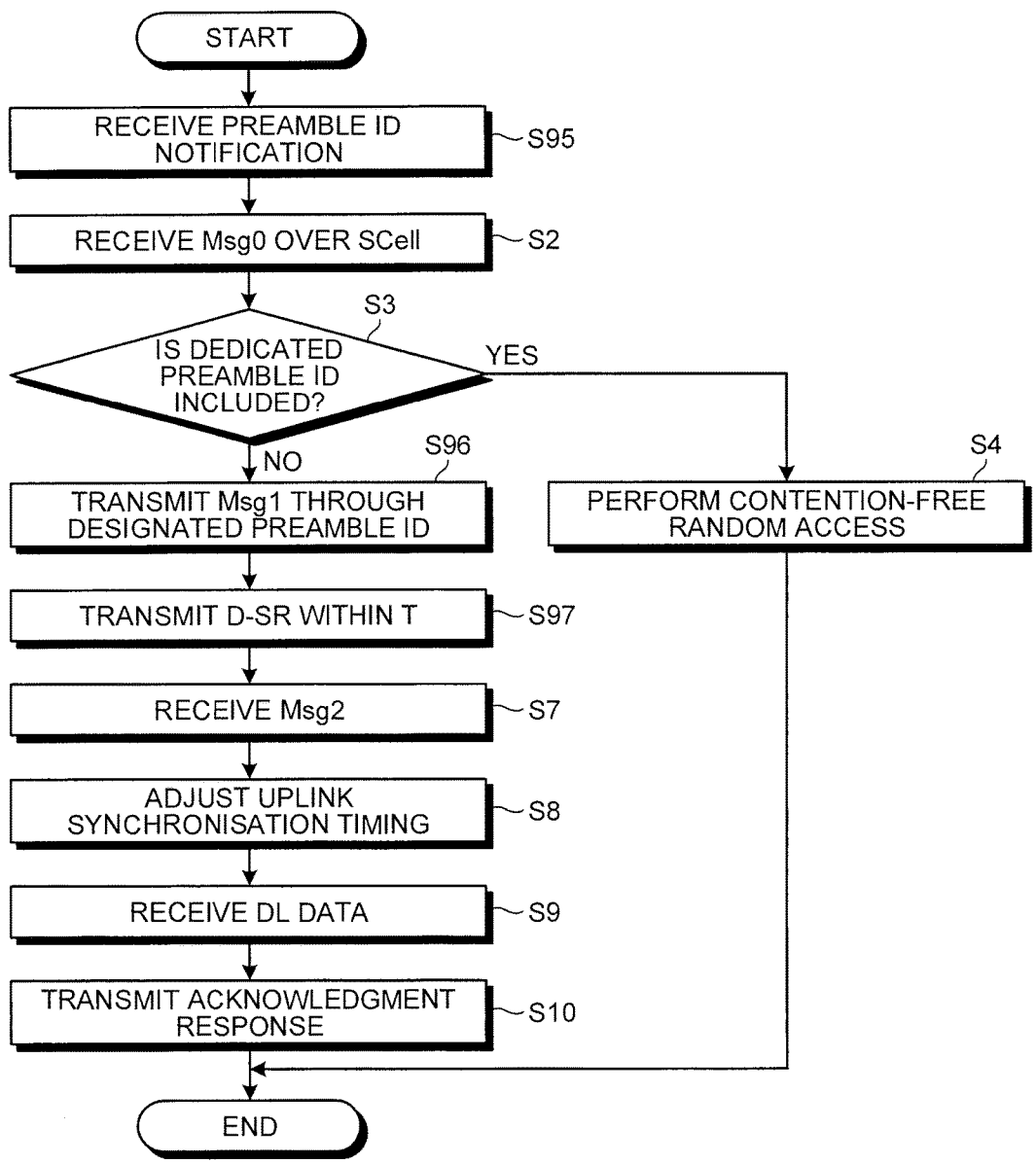
FIG. 54 is a flowchart illustrating an operation of a mobile station (receiving device) in the wireless communication method according to the eighth embodiment.

FIG. 54 is a flowchart illustrating an operation of the mobile station (receiving device) in the wireless communication method according to the eighth embodiment. Referring to FIG. 54, in the mobile station, the transmission/reception control unit 34 receives information (preamble ID notification) related to a preamble ID to be used through the transmitting/receiving unit 11 (S95).

Thereafter, when it is determined that the dedicated preamble ID is not included in Msg0 (No in S3), the RA managing unit 31 transmits Msg1 including the designated preamble ID through the PRACH over the SCell through the uplink transmitting unit 12 and the transmitting/receiving unit 11 (S96). Further, the D-SR managing unit 32 reads the parameter T from the storage unit 23, and transmits the D-SR including the designated preamble ID using the SR PUCCH set on the PCell through the uplink transmitting unit 12 and the transmitting/receiving unit 11 within the parameter T (S97). Alternatively, the D-SR including, for example, 3-bit information representing the designated preamble ID is transmitted (S97).

Figure 55:
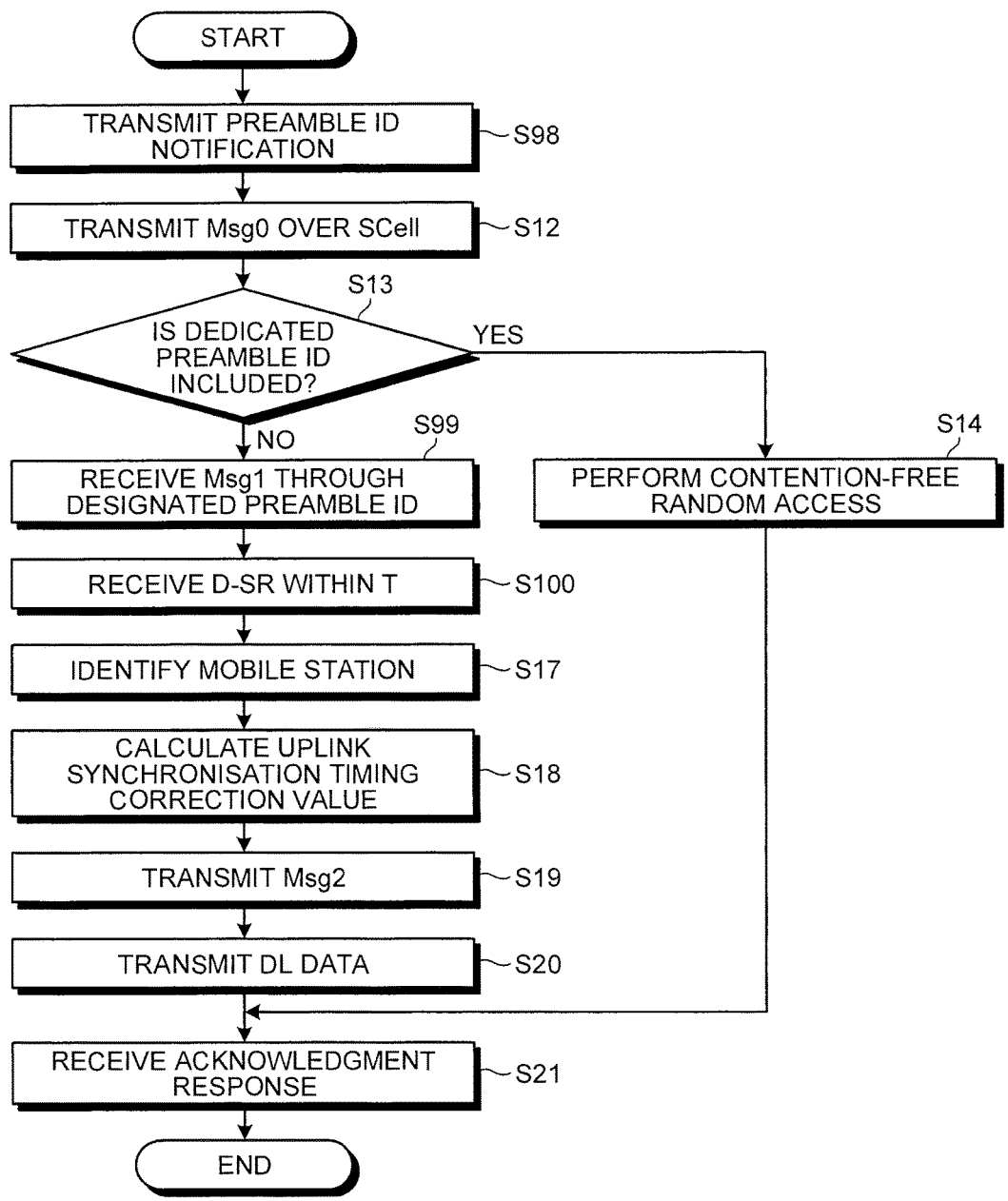
FIG. 55 is a flowchart illustrating an operation of a base station (transmitting device) in the wireless communication method according to the eighth embodiment.

FIG. 55 is a flowchart illustrating an operation of the base station (transmitting device) in the wireless communication method according to the eighth embodiment. Referring to FIG. 55, in the base station, the transmission/reception control unit 64 transmits information (preamble ID notification) related to a preamble ID to be used through the transmitting/receiving unit 43 (S98).

Thereafter, when it is determined that the dedicated preamble ID is not included in Msg0 (No in S13), the RA managing unit 61 receives Msg1 including the designated preamble ID which is transmitted through the PRACH over the SCell through the transmitting/receiving unit 43 (S99). Then, the D-SR managing unit 62 reads the parameter T from the storage unit 53, and receives the D-SR including the designated preamble ID which is transmitted through the SR PUCCH set on the PCell through the transmitting/receiving unit 43 within the parameter T (S100). Alternatively, the D-SR including, for example, 3-bit information representing the designated preamble ID is received within the parameter T (S100).

As described above, in the present embodiment, information of Msg1 (to be) transmitted can be included in the D-SR. As a result, the overlapping of Msg1 occurring in the third embodiment can be avoided.

According to an aspect of the wireless communication system according to the present disclosure, there is an effect by which high-speed communication can be implemented.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication system that performs wireless communication between a receiving device and a transmitting device using a plurality of radio carriers, the wireless communication system comprising:

the receiving device including:

a first random access managing unit that transmits a preamble, which is selected by the receiving device at random, through a random access channel of a first radio carrier among the plurality of radio carriers, for which an uplink synchronization between the receiving device and the transmitting device has not been obtained, wherein the preamble transmitted through the random access channel does not include information identifying the receiving device, and a first scheduling request managing unit that transmits a scheduling request through a control channel of a second radio carrier among the plurality of radio carriers, for which an uplink synchronization between the receiving device and the transmitting device has been obtained, before or after the random access channel of the first radio carrier, through which the preamble is transmitted by the first random access managing unit, wherein the scheduling request transmitted through the control channel includes the information identifying the receiving device; and the transmitting device including:
a second random access managing unit that receives the preamble transmitted through the first radio carrier, and
a second scheduling request managing unit that receives the scheduling request through the second radio carrier from the receiving device,
wherein the second random access managing unit of the transmitting device determines that the receiving device that has transmitted the scheduling request received through the second radio carrier has also transmitted the preamble through the first radio carrier, when the scheduling request received through the second radio carrier is received before transmitting a response to the preamble.

2. The wireless communication system according to claim 1, wherein the first scheduling request managing unit transmits the scheduling request through the control channel, the control channel and the random access channel through which the preamble has been transmitted falling within a prescribed time.

3. The wireless communication system according to claim 2, wherein
the second random access managing unit masks a control signal serving as a trigger causing the first random access managing unit to transmit the preamble by predetermined address information, and transmit the masked control signal, and
the first scheduling request managing unit determines whether the scheduling request is to be transmitted through the control channel based on the address information, the control channel and the random access channel through which the preamble has been transmitted falling within the prescribed time.

4. The wireless communication system according to claim 1, wherein the transmitting device further includes a timing managing unit that masks a synchronization signal used to obtain synchronization between devices by identification information of the identified receiving device, and transmits the masked synchronization signal.

5. The wireless communication system according to claim 1, wherein the second random access managing unit transmits a control signal serving as a trigger causing the first random access managing unit to transmit the preamble, and then transmits the control signal again when a plurality of preambles are received through the random access channel.

6. The wireless communication system according to claim 1, wherein the second random access managing unit transmits a control signal serving as a trigger causing the first random access managing unit to transmit the preamble, and then transmits a response signal including information representing difficulty of associating the scheduling request with the preamble when a plurality of preambles are received through the random access channel.

7. The wireless communication system according to claim 1, wherein the second random access managing unit transmits a control signal serving as a trigger causing the first random access managing unit to transmit the preamble, and then transmits the control signal again when the second scheduling request managing unit fails to receive the scheduling request.

8. The wireless communication system according to claim 1, wherein the second random access managing unit transmits a control signal serving as a trigger causing the first random access managing unit to transmit the preamble, and then transmits a response signal including information representing difficulty of associating the scheduling request with the preamble when the second scheduling request managing unit fails to receive the scheduling request.

9. The wireless communication system according to claim 1, wherein the first random access management unit of the receiving device transmits the preamble, which does not include information identifying the receiving device, only when receiving a message including no dedicated preamble through the first radio carrier before the uplink synchronization between the receiving device and the transmitting device is obtained.

10. The wireless communication system according to claim 1, wherein the first radio carrier and the second radio carrier are used for transmitting the preamble and the scheduling request, respectively, a connection between the receiving device and the transmitting device being established with the transmission of the preamble, the scheduling request, and a response to the preamble in this order.

11. A receiving device configured to receive data from a transmitting device using a plurality of radio carriers, the receiving device comprising:
a random access managing unit that transmits a preamble, which is selected by the receiving device at random, through a random access channel of a first radio carrier among the plurality of radio carriers, for which an uplink synchronization between the receiving device and the transmitting device has not been obtained, wherein the preamble transmitted through the random access channel does not include information identifying the receiving device; and
a scheduling request managing unit that transmits a scheduling request through a control channel of a second radio carrier among the plurality of radio carriers, for which an uplink synchronization between the receiving device and the transmitting device has been obtained, before or after the random access channel of the first radio carrier, through which the preamble is transmitted by the random access managing unit,
wherein the scheduling request transmitted through the control channel includes information identifying the receiving device, and the receiving device that has transmitted the scheduling request received through the second radio carrier is determined to have also transmitted the preamble through the first radio carrier, when the scheduling request received through the second radio carrier is received before a response to the preamble is transmitted from the transmitting device.

12. The receiving device according to claim 11, wherein the scheduling request managing unit transmits the scheduling request through the control channel, the control channel and the random access channel through which the preamble has been transmitted falling within a prescribed time.

13. The receiving device according to claim 12, wherein when a control signal that is used as a trigger to transmit the preamble and masked by predetermined address information serving as information representing whether the scheduling request is to be transmitted through the control channel, the control channel and the random access channel through which the preamble has been transmitted are received falling within the prescribed time, and the scheduling request managing unit determines whether the scheduling request is to be transmitted through the control channel based on the address information.

14. A transmitting device configured to transmit data to a receiving device using a plurality of radio carriers, comprising:
- a random access managing unit that receives a preamble through a random access channel of a first radio carrier among the plurality of radio carriers, for which an uplink synchronization between the receiving device and the transmitting device has not been obtained, wherein the preamble transmitted through the random access channel does not include information identifying a sender device of the preamble; and
- a scheduling request managing unit that receives a scheduling request through a control channel of a second radio carrier among the plurality of radio carriers, for which an uplink synchronization between the receiving device and the transmitting device has been obtained, before or after the random access channel of the first radio carrier, through which the preamble is received by the random access managing unit,
- wherein the scheduling request transmitted through the control channel includes information identifying the sender device of the scheduling request, and
- wherein the random access managing unit determines that the receiving device that has transmitted the scheduling request received through the second radio carrier has also transmitted the preamble through the first radio carrier, when the scheduling request received through the second radio carrier is received before transmitting a response to the preamble.

\* \* \* \* \*